US009582023B2

(12) United States Patent
Aoyagi et al.

(10) Patent No.: US 9,582,023 B2
(45) Date of Patent: Feb. 28, 2017

(54) OPERATION HANDLE MECHANISM AND LOAD SUPPORT MECHANISM

(71) Applicants: Tatsuzo Aoyagi, Yamanashi-ken (JP); Hiroto Akiyama, Yamanashi-ken (JP); Toru Ochiai, Yamanashi-ken (JP)

(72) Inventors: Tatsuzo Aoyagi, Yamanashi-ken (JP); Hiroto Akiyama, Yamanashi-ken (JP); Toru Ochiai, Yamanashi-ken (JP)

(73) Assignee: NISCA CORPORATION, Minamikoma-Gun, Yamanashi-Ken (JP)

( * ) Notice: Subject to any disclaimer, the term of this patent is extended or adjusted under 35 U.S.C. 154(b) by 0 days.

(21) Appl. No.: 14/511,745

(22) Filed: Oct. 10, 2014

(65) Prior Publication Data
US 2015/0293553 A1 Oct. 15, 2015

(30) Foreign Application Priority Data
Apr. 11, 2014 (JP) ................................ 2014-082358

(51) Int. Cl.
*F16M 11/00* (2006.01)
*G05G 1/02* (2006.01)
(Continued)

(52) U.S. Cl.
CPC ........... *G05G 1/025* (2013.01); *F16M 11/046* (2013.01); *F16M 11/42* (2013.01); *G05G 5/04* (2013.01);
(Continued)

(58) Field of Classification Search
USPC .............. 248/295.11, 297.31, 296.1, 297.11, 248/297.21, 297.51, 125.1, 125.2, 125.3,
(Continued)

(56) References Cited

U.S. PATENT DOCUMENTS 7,628,371 B2 * 12/2009 Gan ....................... F16M 11/04
248/162.1
7,845,607 B2 * 12/2010 Matthiessen ............. B23Q 1/28
248/229.12
(Continued)

FOREIGN PATENT DOCUMENTS

JP   H11-137362 A   5/1999
JP   2003-276953 A   10/2003

*Primary Examiner* — Steven Marsh
(74) *Attorney, Agent, or Firm* — Manabu Kanesaka

(57) ABSTRACT

Provided is an operation handle mechanism with which a handle can be conveniently operated to move a movable section, thereby ensuring smooth operation and movement at any time regardless of an operation position of the handle. An operation handle section 121 includes a handle lever 67, which is used to operate movement of a support frame section 23 capable of moving up and down, and left and right transmission rods 123a and 123b, which are joined to the handle lever. The transmission rods can only move a predetermined distance in a movement direction thereof relative to the support frame section, and start to move together with the support frame section after going beyond that distance. The left and right transmission rods are connected via rack sections 140a and 140b of the transmission rods and a gear train 134a, 134b, 135a, and 135b meshing with the rack sections in such a way as to enable transmission of part of an operation force coming from the handle lever from one transmission rod to the other and thereby allow the two transmission rods to simultaneously move only the same distance.

9 Claims, 37 Drawing Sheets

(51) Int. Cl.
  *G05G 5/04*    (2006.01)
  *F16M 11/42*   (2006.01)
  *F16M 11/04*   (2006.01)
(52) U.S. Cl.
  CPC . *F16M 2200/027* (2013.01); *F16M 2200/047* (2013.01)
(58) Field of Classification Search
  USPC .................................................. 248/917, 919
  See application file for complete search history.

(56) References Cited

U.S. PATENT DOCUMENTS

| | | | |
|---|---|---|---|
| 9,234,621 B2* | 1/2016 | Lee ...................... | F16M 11/046 |
| 2004/0188573 A1* | 9/2004 | Weatherly ............ | A47B 81/061 |
| | | | 248/125.1 |
| 2005/0109892 A1* | 5/2005 | Bober .................. | A47B 81/064 |
| | | | 248/125.2 |
| 2007/0152112 A1* | 7/2007 | Bober .................. | A47B 81/061 |
| | | | 248/125.2 |
| 2012/0256069 A1* | 10/2012 | Fallows ............... | F16M 11/046 |
| | | | 248/295.11 |

* cited by examiner

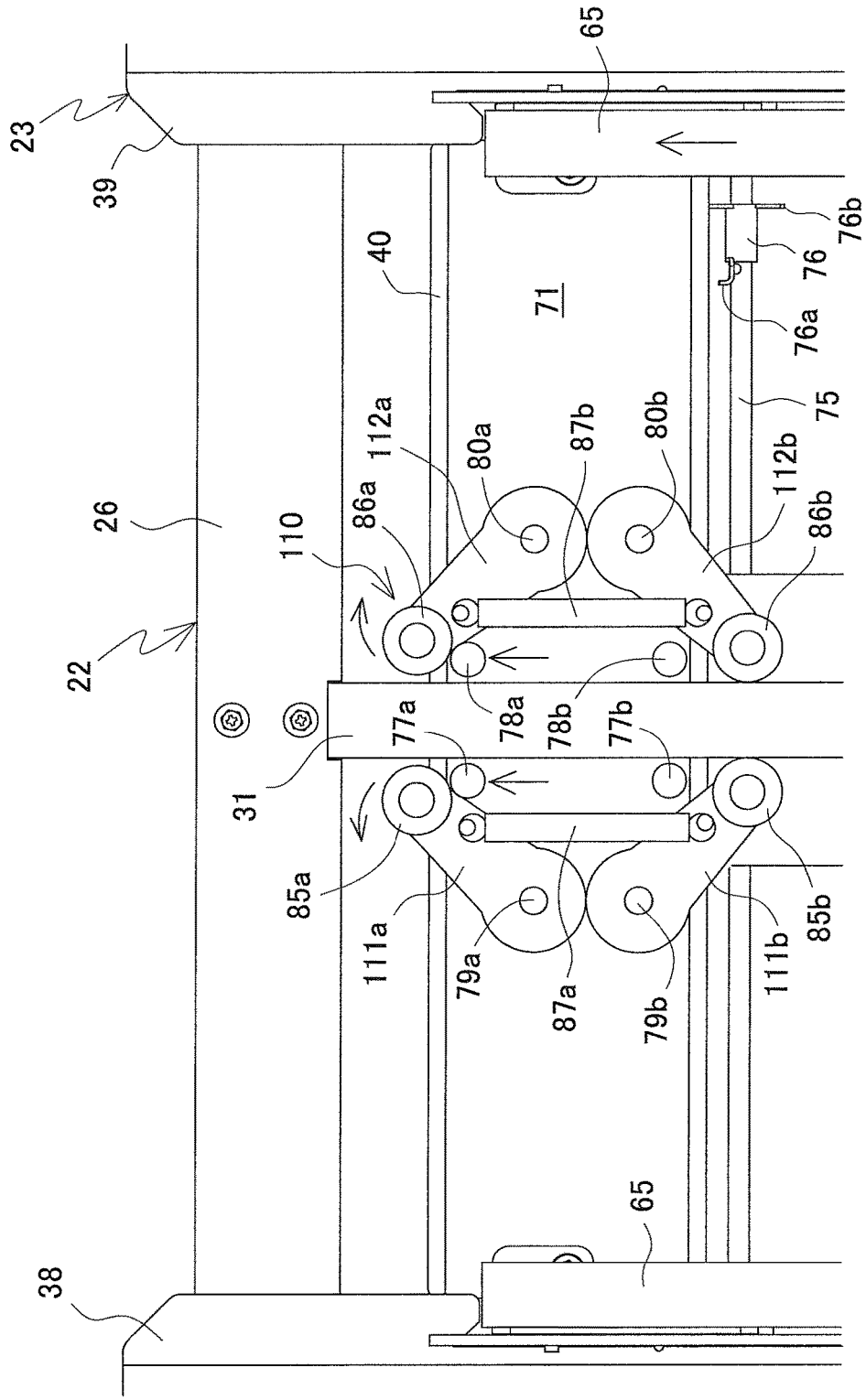

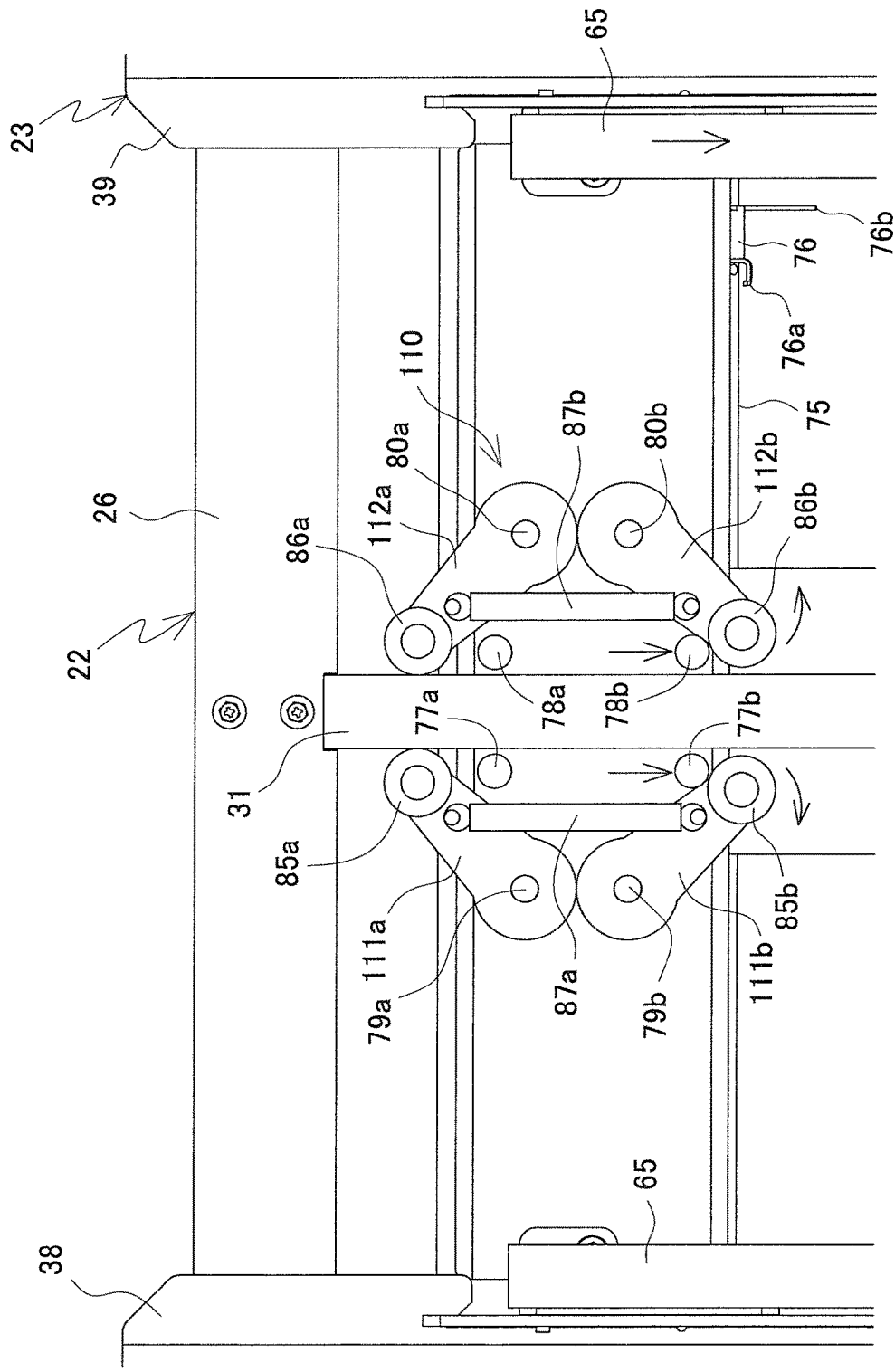

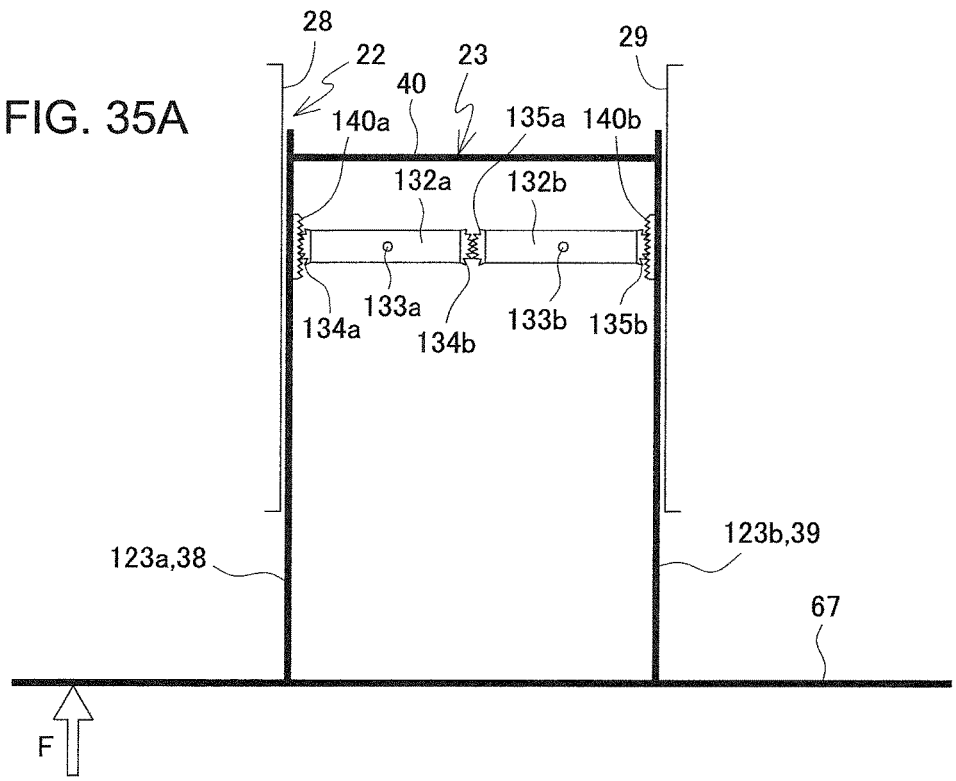
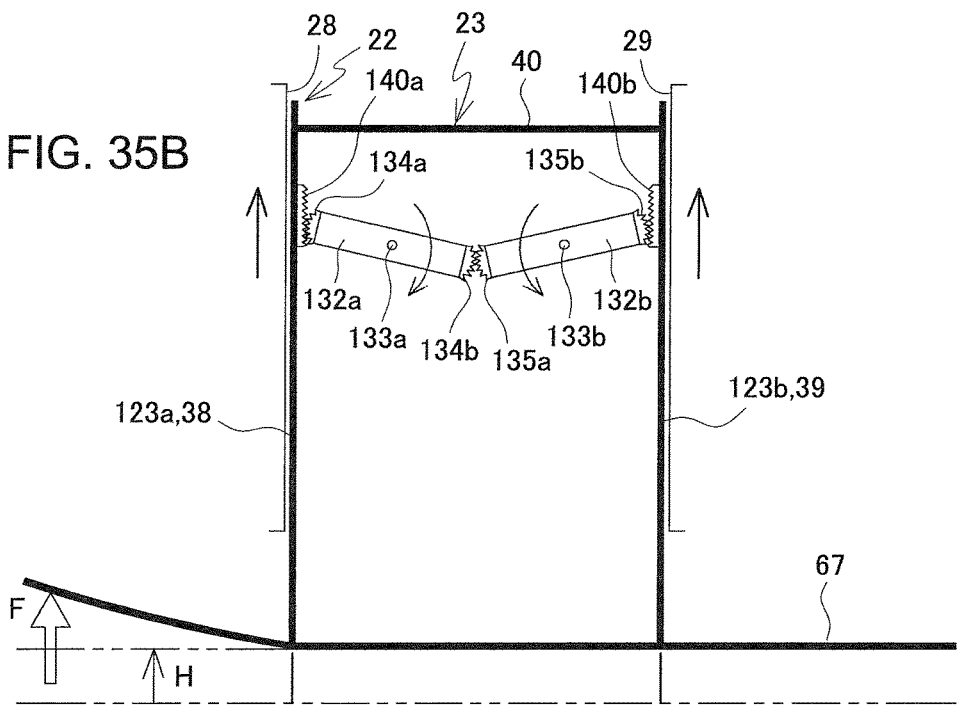

OPERATION HANDLE MECHANISM AND LOAD SUPPORT MECHANISM

BACKGROUND

Technical Field

The present invention relates to an operation handle mechanism for moving and operating a movable part, and, for example, to an operation handle mechanism suitably used to move and operate a load in a support mechanism, which supports the load such as articles in a movable manner, as well as to a load support mechanism.

Background Art

Conventionally, in a support mechanism that supports a computer, a television monitor device, and various other articles in such a way as to be able to move the articles up and down to a desired height position, an operation handle is often provided to manually operate the movement of the articles. For example, what is known is an elevating blackboard equipped with a pair of left and right manual handles for elevating, which are located around the left and right sides of the center in a horizontal lower portion of a support frame (Refer to Patent Document 1 [Jpn. Pat. Appln. Laid-Open Publication No. 11-137362], for example).

The blackboard disclosed in Patent Document 1 is held in such a way as to be able to move up and down, as vertical poles on the left and right sides of the support frame are inserted into up-down guide holes of a fixed frame. Furthermore, the left- and right-end areas of the lower portion of the support frame are supported in such a way as to be lifted up by two wires, which are connected to an outer periphery of a common drum, and by a spring means, which is connected to a cam of the drum. Accordingly, the support frame can be stopped at any given height, as the weight of the blackboard is absorbed.

A sheet supply device is also known (Refer to Patent Document [Jpn. Pat. Appln. Laid-Open Publication No. 2003-276953], for example): the sheet supply device supplies a sheet to an image formation device such as a copier by driving a lifting motor and thereby moving a sheet placement table up and down. In this device, a lifting gear that is fixed to a motor shaft of the lifting motor, and another lifting gear of the same shape that is engaged with the lifting gear, are engaged with left and right lifting racks that are provided on the sheet placement table. Therefore, the sheet placement table of a relatively large planar size can vertically move up and down while being in a horizontal state.

However, if a user stands by the left or right end portion of the above-described conventional elevating blackboard, the user needs to move to around the left and right sides of the center of the blackboard where the manual handles are provided each time the user tries to move the blackboard up and down. Therefore, this configuration is inconvenient. One of improvement measures would be to provide additional manual handles in the left- and right-end areas of the blackboard, if an article that is long in the left-right direction, such as an elevating blackboard, should be moved up and down.

However, if an operation force is applied only to either the left or right side of the support frame of the support mechanism of such an article, the support frame might be distorted or twisted due to the weight of the article, the structure or strength of the support frame, the magnitude of the operation force, and the like. The distortion or twisting of the support frame is not preferred as it can cause troubles such as backlash when the article is moved up or down and hamper a smooth movement operation and operation of lifting up and down.

Another improvement measure is to provide a handle that is long in the left-right direction. However, the problem is that, if the handle is a long rod-shaped handle that extends in a direction that crosses the operation direction or the direction in which the article is moved, and if the operation force is concentrated on one end portion, the handle would be easily bent in the operation direction unless the rigidity of the handle is sufficiently high. In this case, depending on which area of the handle is operated, the operation force would act on the support frame unevenly in the left-right direction, leading to similar distortion or twisting of the support frame and possibly unable to ensure a smooth movement operation and operation of lifting the article up and down.

SUMMARY

Therefore, the object of the present invention is to provide an operation handle mechanism that can conveniently operate a handle to move a movable part and ensure smooth operation and movement at any time regardless of an operation position of the handle.

Another object of the present invention is to ensure, at any time, smooth movement of a movable support section by conveniently operating the handle at any operation position in the same manner, in a load support mechanism that includes a fixed support section and the movable support section, which can move relative to the fixed support section, in order to support a load, such as that of an article, in such a way that the load remains in a stationary state and can be displaced.

An operation handle mechanism of the present invention includes: a movable section that can move in a predetermined direction; and an operation section that includes a handle used to operate movement of the movable section, and a first and a second transmission member connected to the handle, wherein the first and second transmission members are provided in such a way as to be able to only move a predetermined distance in a movement direction thereof relative to the movable section and to start to move together with the movable section after going beyond the predetermined distance, and the movable section includes a connection member that connects the first and second transmission members in such a way as to transmit part of an operation force of the handle between the first and second transmission members in response to movement of the first or second transmission member at a time when the handle is operated.

In this manner, the first and second transmission members of the operation section are connected via the connection member of the movable section. Therefore, when the handle is operated, regardless of the operation position thereof, the two transmission members can be moved in synchronization at any time. Moreover, after having relatively moved the predetermined distance, the first and second transmission members start to move together with the movable section. Therefore, even when a large load or any other kind of load is acting on the movable section, a user can smoothly move the movable section without feeling an abrupt increase in the load on the handle.

According to a certain embodiment, the operation handle mechanism further includes a braking part that carries out braking of movement of the movable section, wherein the braking part can carry out and/or release the braking depending on movement of the connection member. In this manner, the braking part that works in response to the movement of the connection member is provided. Therefore, the movable section can be reliably moved by one handle operation in such a way as to ensure safety.

According to another embodiment, the first and second transmission members each include a rack section, and the connection member includes a gear train that meshes with the two rack sections in a way that enables transmission of the operation force. In this manner, since the gear mechanism made up of the rack sections and the gear train is used, it is possible to easily realize transmission of the operation force between the first and second transmission members and synchronous operation of the two transmission members.

According to another embodiment, the first and second transmission members each include a rack section; the connection member includes a gear train that meshes with the two rack sections in a way that enables transmission of the operation force; and one of gears of the gear train is rotated to cause the braking part to carryout and/or release the braking. In this manner, since the gear mechanism and the braking part are used in combination, it is possible to realize transmission of the operation force between the first and second transmission members and synchronous operation of the two transmission members, as well as to safely and reliably move the movable section by one handle operation.

According to still another embodiment, the movable section includes a first and a second engagement portion that engage with the first and second transmission members at end portions that are the predetermined distance apart, in order to stop the first and second transmission members. In this manner, such a relatively simple mechanical configuration enables the first and second transmission members to move together with the movable section.

According to another embodiment, the movable section can move in both directions along the predetermined direction; the handle can be operated in both directions along an operation direction thereof based on a direction in which the movable section is moved; and the first and second transmission members can move in both directions relative to the movable section based on a direction in which the handle is operated. As a result, the versatility of the operation handle mechanism can be improved, and the operation handle mechanism can be applied to a wide range of applications with a higher degree of freedom.

According to another aspect of the present invention, a load support mechanism of the present invention includes: a fixed support section; a movable support section that can move relative to the fixed support section and receives a load; and an operation handle section that is used to operate movement of the movable support section, wherein the movable support section and the operation handle section are the movable section and the operation section of the above operation handle mechanism of the present invention, respectively.

In this manner, to the load support mechanism in which the movable support section, which receives a load, can be moved relative to the fixed support section as the operation handle section is operated, the above operation handle mechanism of the present invention is applied. Therefore, the handle can be conveniently operated at any operation position in the same way, and the movable support section can be moved smoothly and reliably at any time.

BRIEF DESCRIPTION OF THE DRAWINGS

FIG. 24 is a front view showing a moving-up release operation of a brake mechanism of FIG. 23;

FIG. 25 is a front view showing a moving-down release operation of a brake mechanism of FIG. 23;

FIGS. 35A and 35B are diagrams illustrating an operation of an operation handle section in an article support device of a second embodiment.

DETAILED DESCRIPTION

With reference to the accompanying drawings, preferred embodiments of the present invention will be described in detail. Incidentally, in the accompanying drawings, similar components throughout this specification are represented by the same reference symbols.

Figure 1:
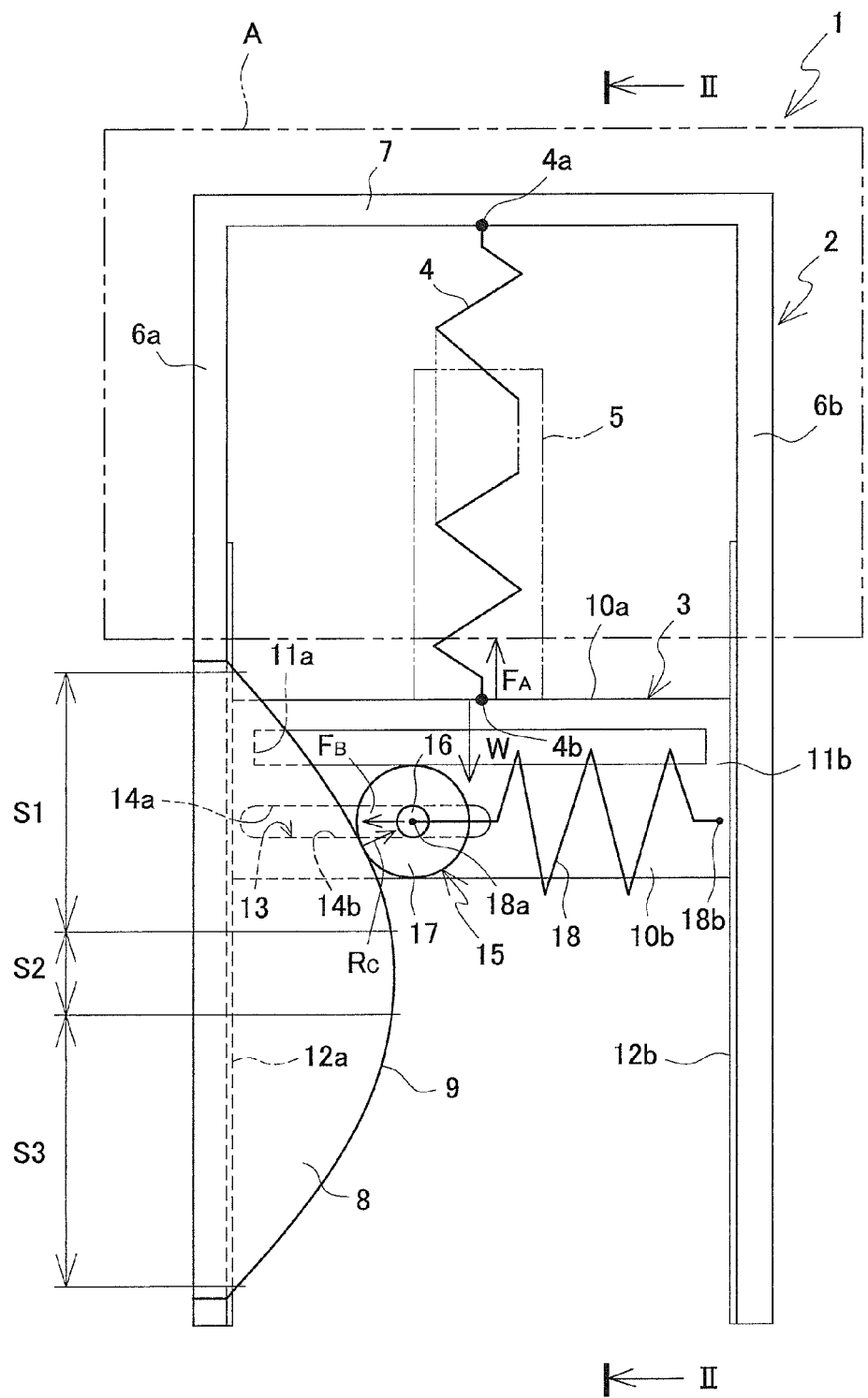
FIG. 1 is a front view showing the basic configuration of a load support mechanism according to the present invention.
Figure 2:
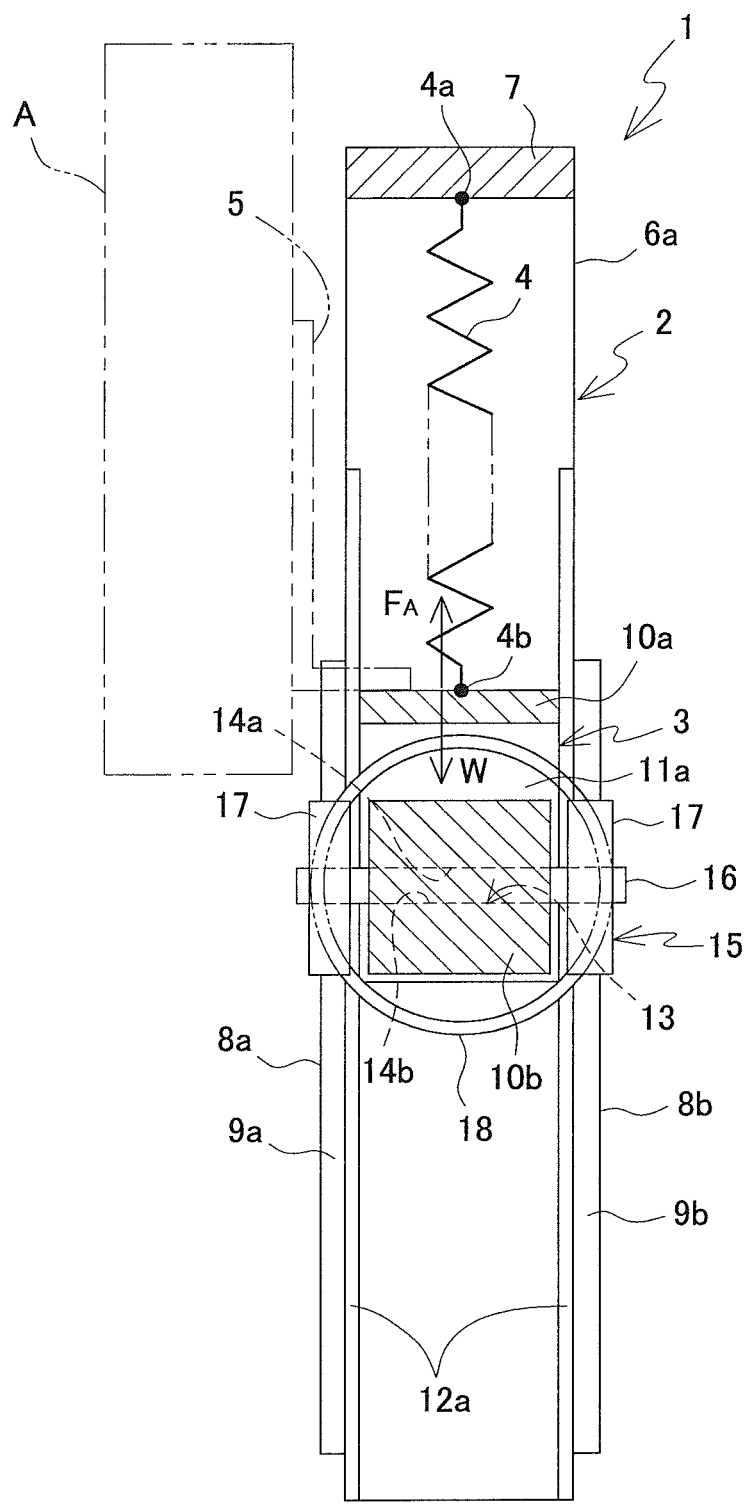
FIG. 2 is a view as seen in the direction of arrow along line II-II of FIG. 1.

FIGS. 1 and 2 conceptually show the basic configuration of a load support mechanism according to the present invention. As shown in the diagrams, a load support mechanism 1 includes a fixed support section 2, which is for example installed on a floor or a table; a movable support section 3, which receives a load of an article; and a first spring 4, which is for example an extension coil spring. For example, a television monitor device, or article A, can be supported by a mounting stay 5, which is provided on the movable support section 3, as the article A is attached to a front side of the load support mechanism 1.

According to the present embodiment, the fixed support section 2 has an outer frame structure, including left and right vertical frame members 6a and 6b, which extend vertically, and a lateral frame member 7, which is provided horizontally between upper ends of the two vertical frame members. On one vertical frame member 6a, a fixed cam 8, which extends from around an up-down-direction central position thereof to around a lower end, is provided integrally.

The fixed cam 8 includes a fixed cam surface 9: The fixed cam surface 9 is convex toward the right side of FIG. 1, or toward the other vertical frame member 6b, and the fixed cam surface 9 is curved in such a way that the slope of the tangent direction thereof is changed across the entire length from the upper end to the lower end or is changed partially. As shown in FIG. 2, one pair of fixed cams 8, 8 and fixed cam surfaces 9, 9 is preferably provided in a front side portion of the vertical frame member 6a, and another pair in a rear side portion of the vertical frame member 6a, in such a way as to be symmetric in the front-back direction.

According to the present embodiment, the movable support section 3 has a rectangular frame structure, including upper and lower lateral frame members 10a and 10b, which horizontally extend between the vertical frame members 6a and 6b of the fixed support section 2, and left and right vertical frame members 11a and 11b, which extend vertically. The vertical frame members 11a and 11b are provided in such a way as to be able to move up and down along inner-side guides 12a and 12b of the vertical frame members 6a and 6b of the fixed support section 2. After the article A is placed on the movable support section 3, the movable support section 3 can move in the up-down direction relative to the fixed support section 2 as the movable support section 3 is guided by the guides.

An upper end 4a of the first spring 4 is fixed to the lateral frame member 7 of the fixed support section 2. A lower end 4b of the first spring 4 is fixed to the upper lateral frame member 10a of the movable support section 3. The first spring 4 expands or contracts in the vertical direction, thereby generating a biasing force FA in a vertically upward direction. The biasing force FA of the first spring 4 helps to support the movable support section 3 and the article A in such a way that the movable support section 3 and the article A can move in the vertical direction.

Furthermore, the movable support section 3 includes, as a movable cam that moves together with the movable support section, a cam groove 13: The cam groove 13 passes through the lower lateral frame member 10b in the front-back direction, and extends in the horizontal direction or in a direction perpendicular to the direction in which the movable support section is moved. The cam groove 13 includes a first movable cam surface 14a, which is on the upper side and faces downwards; and a second movable cam surface 14b, which is on the lower side and faces upwards; the first movable cam surface 14a and the second movable cam surface 14b face each other and run parallel.

In the cam groove 13, a cam follower member 15 is provided. The cam follower member 15 includes a first cam follower 16, which has a straight rod shape or circular tube shape that is circular in cross section and passes through the cam groove 13 in the front-back direction; and second roller-shaped cam followers 17, 17, which are provided on the front and rear ends of the first cam follower 16 that protrudes from the cam groove in the front-back direction.

The outer peripheral surfaces of the first cam follower 16 are in contact with first and/or second movable cam surfaces 14a, 14b when the first cam follower 16 moves in the left-right direction in the cam groove 13 along the cam groove. The second cam followers 17 are preferably rotatable with respect to the two ends of the first cam follower 16; the second cam followers 17 each are disposed in such a way as to be in contact with the fixed cam surface 9 of a corresponding fixed cam 8.

Around the lower lateral frame member 10b of the movable support section 3, a second spring 18, which is a compression coil spring, is fitted. The fixed cam 8's side end portion 18a of the second spring 18 is fixed to the first cam follower 16. The other side end portion 18b is fixed to an appropriate area of the lateral frame member 10b that is on the opposite side from the fixed cam 8. The second spring 18 is provided in such a way as to press the cam follower member 15, so that the second cam followers 17 are constantly pressed against the fixed cam surfaces 9.

At this time, as described later, the biasing force FB of the second spring 18 generates a force in a vertically upward direction or downward direction for the second cam followers 17, depending on the slope of the fixed cam surface 9.

Due to the existence of the lateral frame member 10b, the second spring 18 is always compressed and kept straight without buckling.

According to the present embodiment, the cam groove 13 extends from an area near the fixed cam 8's side end portion of the lateral frame member 10b to the opposite side. Therefore, a range in which the cam follower member 15 can move in the horizontal direction in such a way that the second cam followers 17 remain in contact with the fixed cam surfaces 9, or horizontal stroke, can be set as large as possible. Accordingly, a range in which the biasing force FB of the second spring 18 can be used to press the second cam followers 17 against the fixed cam surfaces 9 can be made even wider.

When the article A is supported by the load support mechanism 1, the first spring 4 is stretched downward due to load W of the article A, and that force is conveyed via the movable support section 3, and the force acts in such a way that the downward-facing first movable cam surface 14a of the cam groove 13 pushes down the cam follower member 15. Meanwhile, the bias force FA of the first spring 4 is similarly conveyed via the movable support section 3, and the force acts in such a way that the upward-facing second movable cam surface 14b of the cam groove 13 pushes up the cam follower member 15.

According to the above configuration, as can be seen from FIG. 2, in a plane perpendicular to the movement direction of the movable support section 3 or in the horizontal plane, the first spring 4 and the second spring 18 can be disposed in such a way as to overlap at least partially in the up-down direction. This arrangement makes it possible to make the depth of the load support mechanism 1 smaller or design a thin load support mechanism 1, when the load support mechanism 1 is turned into an actual device. This arrangement is also effective for the case where a large biasing force of the first spring 4 and/or the second spring 18 is required as the load to be supported becomes heavier, and the larger springs are therefore required.

According to another embodiment, as the first spring 4, instead of an extension coil spring, a compression coil spring is used; the first spring 4 is disposed below the movable support section 3 in such a way as to push up the movable support section 3. According to still another embodiment, instead of the first spring of FIG. 1, an additional compression coil spring is provided below the movable support section 3 in such a way as to push up the movable support section 3. In either case, the depth of the load support mechanism 1 can be made smaller, when the load support mechanism 1 is turned into an actual device.

According to the present embodiment, as shown in FIG. 2, two fixed cams 8 and two second cam followers 17 are provided along the axis direction of the first cam follower 16; the two fixed cams 8 and the two second cam followers 17 are provided on the opposite sides of the lower lateral frame member 10b in such a way as to be symmetric in the front-back direction and form a pair. Due to this arrangement, the force that the fixed cams 8 exert on the cam follower member 15 spread symmetrically in the front-back direction and in a well-balanced manner along the axis direction of the first cam follower 16. Therefore, this configuration is suitable because the first cam follower is unlikely to be bent or deformed. The dispersion of the force reduces the load on each fixed cam 8, and the fixed cams 8 can be made thinner. As a result, the entire device can be made thinner and lighter.

Furthermore, on the first cam follower 16, the pressing force of each fixed cam 8 is concentrated on the contact position and acts in the same direction. If the axial-direction length thereof is too long, the first cam follower 16 could bend or deform excessively, or break. According to the present embodiment, any other component does not exist between the lateral frame member 10b, on which the cam groove 13 is provided, and the fixed cams 8. Therefore, the first cam follower 16 can be short in the axis-direction length and is advantageous.

An area of the fixed cam surface 9 that comes in contact with the second cam follower 17 is divided into the following three regions, depending the position thereof. A first region S1 is a region where the normal direction at a contact point with the second cam follower is upward relative to the horizontal direction. A second region S2 is a region where the normal direction at a contact point with the second cam follower is substantially horizontal. In other words, in the second region S2, the tangential direction at the contact point with the second cam follower is substantially vertical. Here, the term "substantially" means that the direction is slightly upward or downward compared to the exact horizontal direction, and the degree of deviation thereof is small enough to be negligible in terms of the operation and effects of the present invention, the operation of the present embodiment, or the function. Therefore, the direction can be considered to be horizontal. A third region S3 is a region where the normal direction at a contact point with the second cam follower is downward relative to the horizontal direction.

Figure 3:
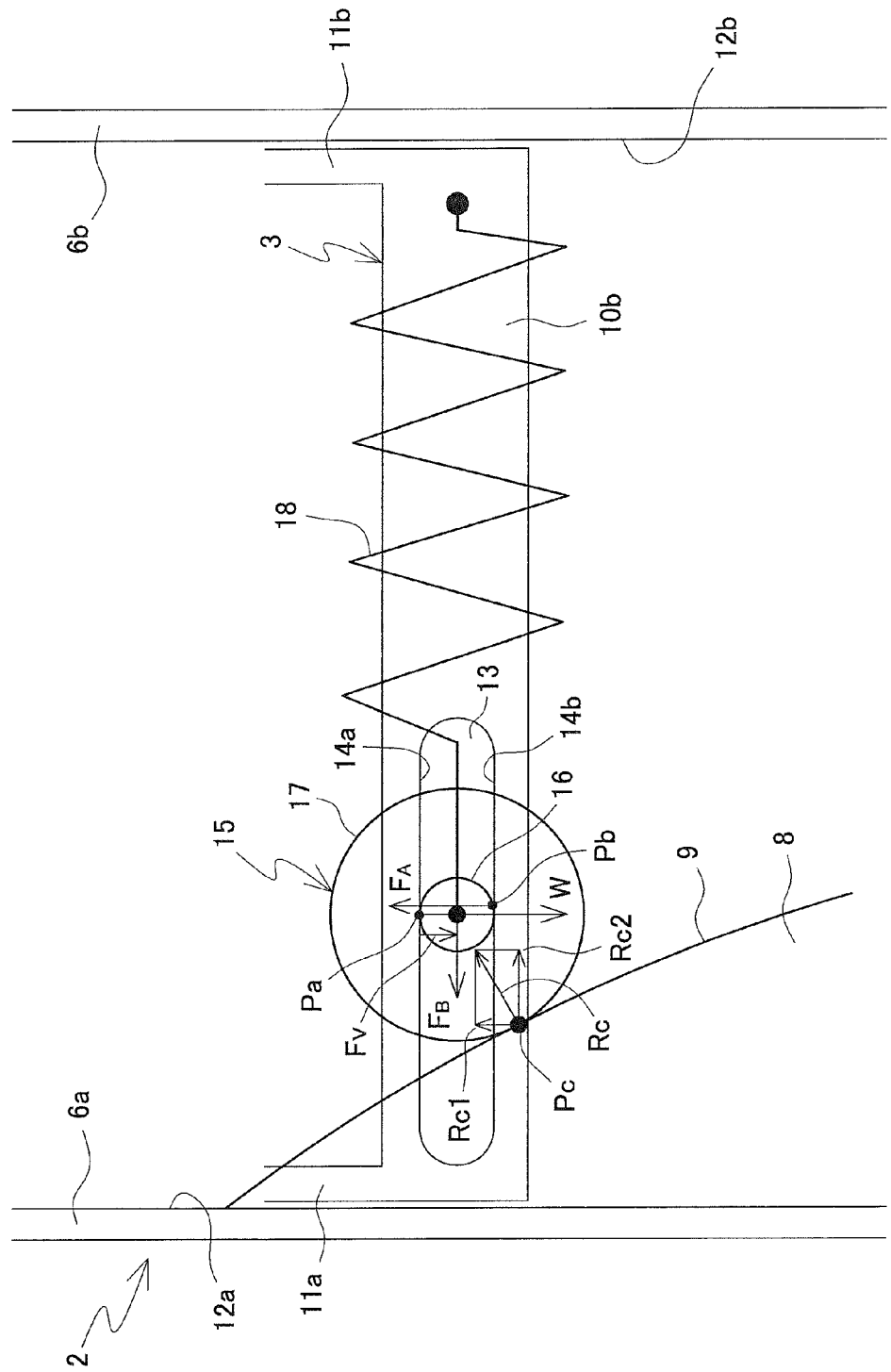
FIG. 3 is a diagram illustrating the relationship between major sections when a second cam follower is in a first region S1 of a fixed cam surface.

In FIGS. 1 and 2, the second cam follower 17 of the movable support section 3 carrying the article A remains still at an upper position that is within the first region S1 of the fixed cam surface 9. At this position, the amount of displacement of the first spring 4 is small, and the force FA of the spring is smaller than the load W. FIG. 3 schematically shows an equilibrium state of forces acting on a system made up of the cam follower member 15, the movable support section 3, and the fixed cam 8 at this stationary position.

Here, throughout this specification, the term "equilibrium" means that, when several external forces are applied to a certain object or member (e.g. second cam follower 17), the sum of those forces is zero, and that the object or the member therefore remains stationary. The external forces that are applied to that certain object or member include the load of that certain object or member itself, or its own weight; a frictional force that is generated between that certain object or member and another object or member; a frictional force or resistance that is generated on another object or member that exerts the external force on that certain object or member. In actual use, the frictional forces and the like can serve as forces to keep that certain object or member at the stationary position, when the weight of that certain object or member and the weight of another object or member are included among the above forces applied to the periphery of the cam follower and when the frictional forces and the like are equal to or larger than the sum of those forces.

For ease of explanation, the loads of the movable support section 3, second spring 18, and cam follower member 15, and the frictional forces between the guides 12a and 12b of the fixed support section 2 and the vertical frame members 11a and 11b of the movable support section 3, between the first cam follower 16 and the cam groove 13, and between the second cam follower 17 and the fixed cam 8 are omitted. Needless to say, those factors need to be taken into consideration in designing the actual device.

In this case, if the load or weight of the movable support section, second spring, and cam follower member is included among the forces acting on the system made up of the cam follower member, the movable support section, and the fixed cam, the equilibrium state is maintained when the sum of those forces is equal to or smaller than the frictional forces generated between the guides and the vertical frame members, between the first cam follower and the cam groove, and between the second cam follower and the fixed cam spring. When the movable support section 3 is in the equilibrium state and remains stationary at a certain position, the frictional forces help to keep the movable support section 3 at that stationary position.

For example, if a torque limiter is provided between the first cam follower 16 and the second cam follower 17, a force that keeps the movable support section at the stationary position may be a force that the torque limiter exerts between the two cam followers. If a contact surface of the second cam follower 17 with the fixed cam surface 9 is made of a material with a large friction coefficient such as rubber, the stationary-position holding force also can be obtained from a frictional force acting between the rubber surface and the fixed cam surface.

In general, the spring force F of a coil spring with a spring constant of k is represented by $F=k \cdot x$, with respect to the amount x of axis-direction displacement of the coil spring (or the amount of displacement from the free length of the spring or the length of the spring in an unloaded state; the compression direction is regarded as positive in this case). In order to support the article A in a stationary manner at an uppermost position of the movable support section 3, the first spring 4 already exerts an initial spring force ($FA0=kA \cdot xA0$) in the vertically upward direction as the first spring 4 is stretched in advance by a predetermined initial displacement amount xA0 from the free length. At the same time, the second spring 18 already exerts an initial spring force ($FB0=kB \cdot xB0$) in the vertically upward direction as the second spring 18 is similarly compressed in advance by a predetermined initial displacement amount xB0 from the free length.

In FIG. 3, between the first cam follower 16 and the cam groove 13, at contact point Pa with the first movable cam surface 14a, the load W of the article A acts on the first cam follower from the first movable cam surface in the vertically downward direction via the movable support section 3. In this state, ideally, the first cam follower 16 is assumed to be in contact not only with the first movable cam surface but also with the second movable cam surface 14b in such a way as to make the transmission of force possible. In such a case, at contact point Pb of the first cam follower 16 with the second movable cam surface 14b, the biasing force FA of the first spring 4 is considered to act on the first cam follower in the vertically upward direction.

Actually, it is difficult for the first cam follower 16 to come in contact with the second movable cam surface 14b in such a way as to make the transmission of force possible in such an ideal state. In this case, at the contact point Pb, the forces acting on each other do not exist. This situation is equivalent to the situation where, at the contact point Pa, from the first movable cam surface 14a to the first cam follower 16, a force Fv whose magnitude is calculated by subtracting the biasing force FA of the first spring 4 from the load W of the article A is being applied in the vertical downward direction. In either case, from the cam groove 13 to the first cam follower 16, the force Fv whose magnitude is calculated by subtracting the biasing force FA of the first spring 4 from the load W of the article A is substantially being applied in the vertical downward direction.

At contact point Pc between the second cam follower 17 and the fixed cam surface 9, the pressing force applied from the second cam follower to the fixed cam surface is balanced against reaction force Rc that is applied from the fixed cam surface in the normal direction thereof. The pressing force applied from the second cam follower to the fixed cam surface is the sum of the biasing force FB of the second spring 18 and the force Fv applied to the first cam follower 16 in the vertically downward direction as described above. The reaction force Rc of the fixed cam surface includes an upward vertical component Rc1 and a horizontal component Rc2.

When the second cam follower remains stationary at a certain position on the fixed cam surface, between the load W, the spring force FA of the first spring 4, and the vertical component Rc1 of the reaction force Rc, the following relation always holds theoretically, if the direction in which the force acts, or the vertically upward direction, is positive:

$$W+FA+Rc1=0$$

Incidentally, in the actual design, as described above, frictional forces are generated between the members. Even if the combined forces represented by this relational expression is not zero and has a small value, the equilibrium state would be maintained if the combined forces are less than the frictional forces between the members.

Between the biasing force FB of the second spring 18 and the horizontal component Rc2 of the reaction force Rc, the following relationship always holds theoretically, if the direction in which the force acts in the horizontal direction, or the direction toward the right side of the diagram, is positive:

$$FB+Rc2=0$$

Accordingly, the magnitude of the horizontal component Rc2 of the reaction force Rc is equal to that of the biasing force FB of the second spring 18. Based on the magnitude of the biasing force FB, the magnitude of the reaction force Rc and the magnitude of the vertical component Rc1 are determined.

In the case of FIG. 3, the spring force FA of the first spring 4 is smaller than the load W. Therefore, by applying the vertical component Rc1 of the reaction force Rc, which is applied from the fixed cam surface in the upward direction, as an assist force, the equilibrium with the load W in the vertical direction is achieved. In this state, if the movable support section 3 is pushed down or up, that force is added to the load W or the spring force FA, leading to the collapse of the equilibrium. Therefore, the article A can be easily lifted up or down by a relatively small force.

When the movable support section 3 is moved up or down, the cam follower member 15 moves downward or upward as the first cam follower 16 is shifted in the left-right direction along the cam groove 13 and as the second cam follower 17 is shifted in the left-right direction along the fixed cam surface 9. While the second cam follower is being located within the first region S1 of the fixed cam surface, the spring force FA of the first spring 4 is assisted by the upward vertical component Rc1 of the reaction force Rc in such a way as to achieve the equilibrium with the load W.

Inside the first region S1, as the movable support section 3 goes down and the amount of displacement of the first spring 4 increases, the spring force FA becomes larger accordingly. As a result, only a smaller assistance force is required from the vertical component Rc1 of the reaction force Rc. Therefore, the slope of the tangential direction of the fixed cam surface 9 relative to the vertical direction becomes smaller toward the lower second region S2.

Meanwhile, as the movable support section 3 goes down and the second cam follower 17 moves downward along the fixed cam surface 9, the amount of compression and displacement of the second spring 18 increases, leading to a rise in the spring force FB. As a result, the pressing force applied from the second cam follower to the fixed cam surface, i.e. the reaction force Rc, grows. The slope of the fixed cam surface 9 is preferably determined in such a way to gain an optimal assist force from the vertical component Rc1 of the reaction force Rc, by taking into consideration a change in the spring force FA of the first spring 4 as well as a change in the spring force FB of the second spring 18.

Figure 4:
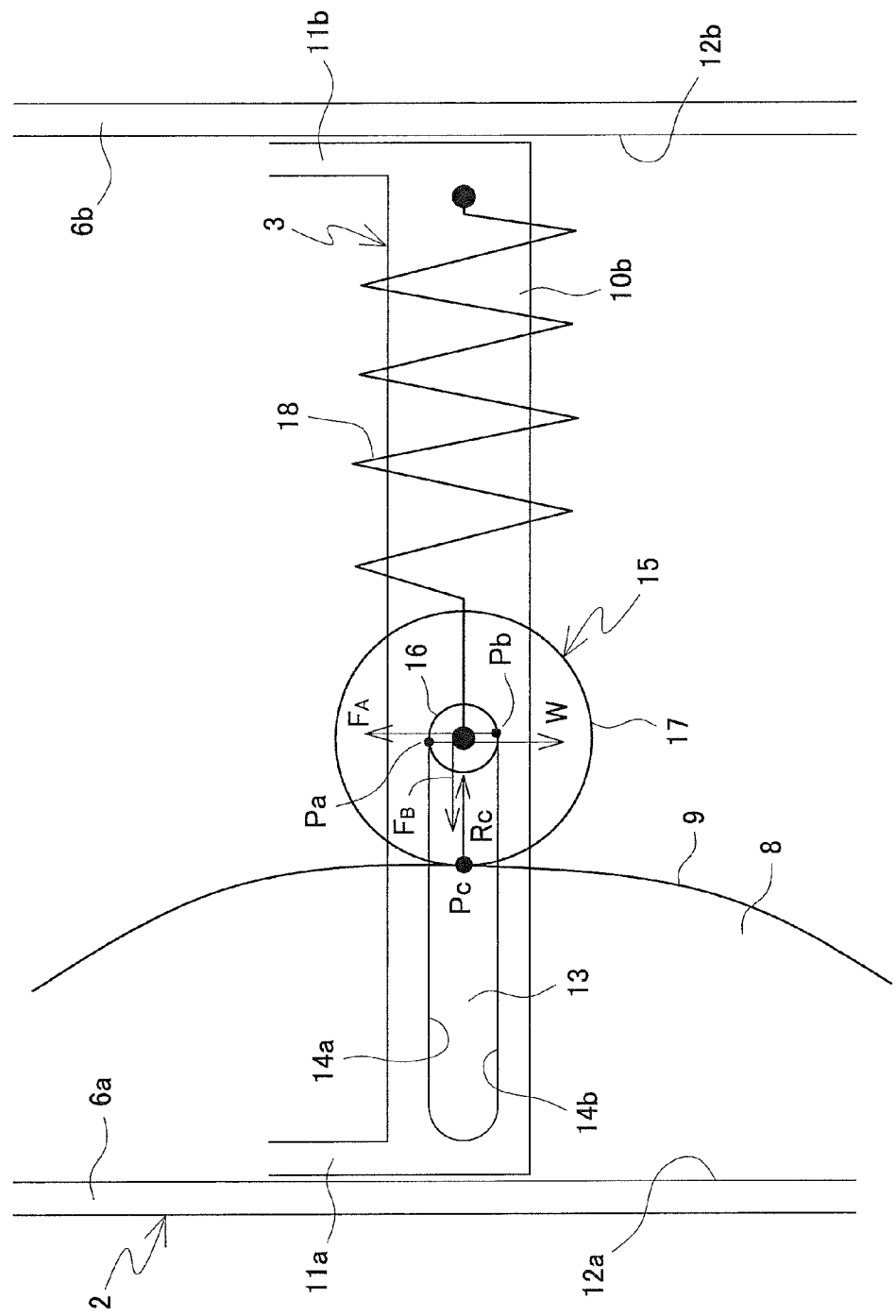
FIG. 4 is an explanatory diagram similar to FIG. 3 when a second cam follower is in a second region S2 of a fixed cam surface.

FIG. 4 schematically shows an equilibrium state of forces applied to the system made up of the cam follower member 15, the movable support section 3, and the fixed cam 8, when the movable support section 3 carrying the article A is pushed down from an upper position of FIG. 1 until the second cam follower 17 is stopped at a middle position within the second region S2 of the fixed cam surface 9 as indicated by imaginary line in FIG. 1. For ease of explanation, the loads of the movable support section 3, second spring 18, and cam follower member 15, and the frictional forces between the guides 12*a* and 12*b* of the fixed support section 2 and the vertical frame members 11*a* and 11*b* of the movable support section 3, between the first cam follower 16 and the cam groove 13, and between the second cam follower 17 and the fixed cam 8 are similarly omitted in the description below.

In this case, between the first cam follower 16 and the cam groove 13, in the vertical direction, the spring force FA of the first spring 4 is substantially balanced against the load W. Therefore, the spring force FA does not require an assist force from the reaction force Rc exerted by the fixed cam surface 9.

At contact point Pc between the second cam follower 17 and the fixed cam surface 9, the reaction force Rc from the fixed cam surface 9 is balanced against the biasing force FB that is applied to the second cam follower from the second spring 18, and does not contain a vertical component. Even in this state, if the movable support section 3 is pushed down or up, that force is added to the load W or the spring force FA, leading to the collapse of the equilibrium. Therefore, the article A can be easily lifted up or down with a relatively small force.

The movable support section 3 carrying the article A is further pushed down and is then stopped at a lower position where the second cam follower 17 is located within the third region S3 of the fixed cam surface 9 as indicated by imaginary line in FIG. 1. At this time, the amount of displacement of the first spring 4 further grows, and the spring force FA thereof becomes greater than the load W.

Figure 5:
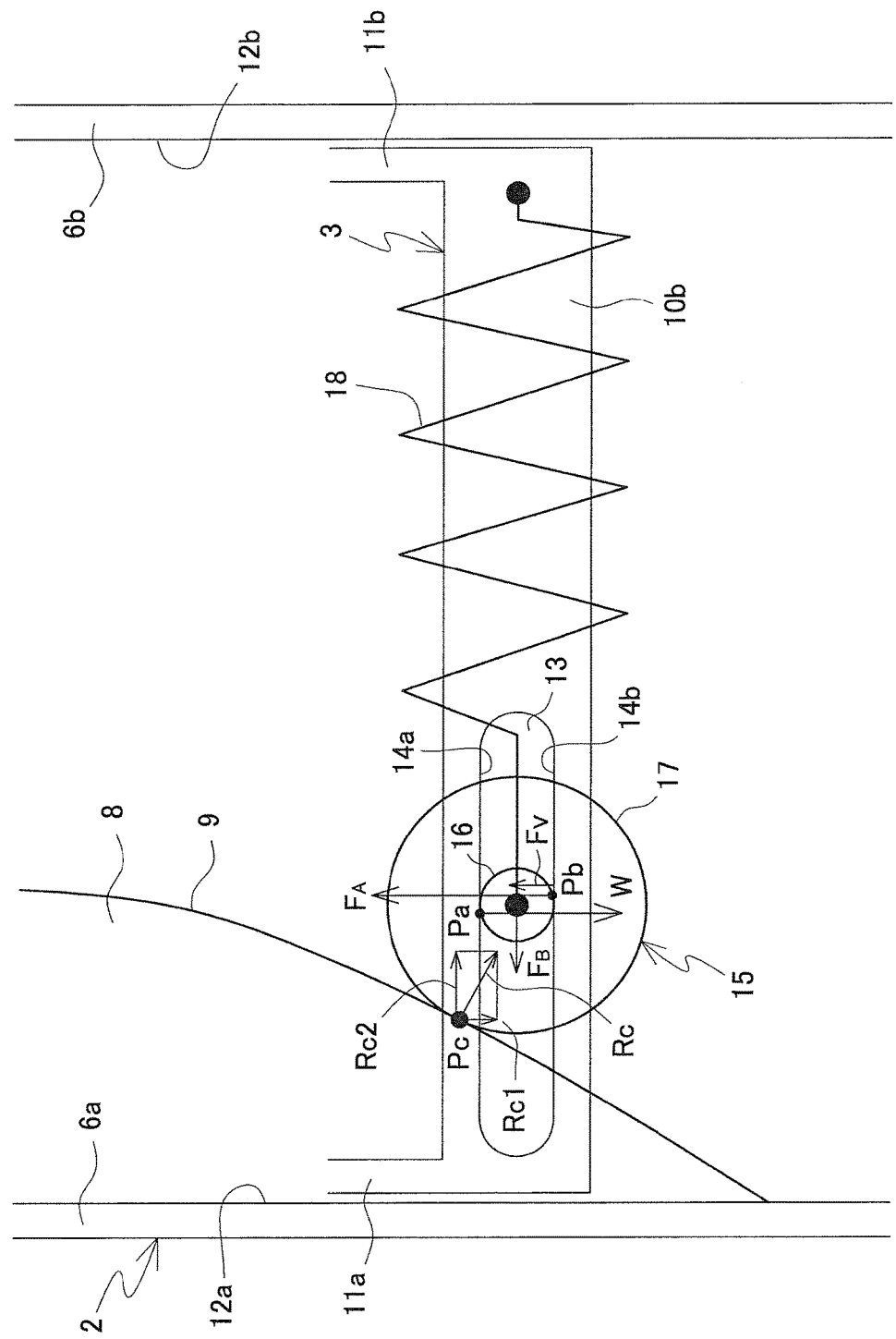
FIG. 5 is an explanatory diagram similar to FIG. 3 when a second cam follower is in a third region S3 of a fixed cam surface.

FIG. 5 schematically shows an equilibrium state of forces applied to the system made up of the cam follower member 15, the movable support section 3, and the fixed cam 8 at that stationary position. Similarly, for ease of explanation, the loads of the movable support section 3, second spring 18, and cam follower member 15, and the frictional forces between the guides 12*a* and 12*b* of the fixed support section 2 and the vertical frame members 11*a* and 11*b* of the movable support section 3, between the first cam follower 16 and the cam groove 13, and between the second cam follower 17 and the fixed cam 8 are omitted in the description below.

In the diagram, between the first cam follower 16 and the cam groove 13, at the contact point Pb with the second movable cam surface 14*b*, the biasing force FA of the first spring 4 is applied to the first cam follower in the vertically upward direction. In this state, ideally, the first cam follower 16 is assumed to be in contact not only with the second movable cam surface but also with the first movable cam surface 14*a* in such a way as to make the transmission of force possible. In such a case, at the contact point Pa of the first cam follower 16 with the first movable cam surface 14*a*, the load W of the article A is considered to act on the first movable cam surface in the vertically downward direction via the movable support section 3.

Actually, it is difficult for the first cam follower 16 to come in contact with the first movable cam surface 14*a* in such a way as to make the transmission of force possible in such an ideal state. In this case, at the contact point Pa, the forces acting on each other do not exist. This situation is equivalent to the situation where, at the contact point Pb, from the second movable cam surface 14*b* to the first cam follower 16, a force Fv whose magnitude is calculated by subtracting the load W of the article A from the biasing force FA of the first spring 4 is being applied in the vertical upward direction. In either case, to the first cam follower 16, the force Fv whose magnitude is calculated by subtracting the load W of the article A from the biasing force FA of the first spring 4 is substantially being applied in the vertical upward direction from the cam groove 13.

At contact point Pc between the second cam follower 17 and the fixed cam surface 9, the pressing force applied from the second cam follower to the fixed cam surface is balanced against the reaction force Rc that is applied from the fixed cam surface in the normal direction thereof. The pressing force applied from the second cam follower to the fixed cam surface is the sum of the biasing force FB of the second spring 18 and the vertically upward force Fv that is applied to the first cam follower 16 as described above. The reaction force Rc of the fixed cam surface contains a downward vertical component Rc1 and a horizontal component Rc2.

At the above lower position, the magnitude of the spring force FA of the first spring 4 is greater than the load W. Therefore, the vertical component Rc1 of the reaction force Rc that is applied from the fixed cam surface 9 in the downward direction works in a direction in which the upward biasing force of the spring force FA, or push-up force, is reduced. Accordingly, the equilibrium with the load W is achieved in the vertical direction. Even in this state, if the movable support section 3 is pushed down or up, that force is added to the load W or the spring force FA, leading to the collapse of the equilibrium. Therefore, the article A can be easily lifted up and down with a relatively small force.

When the movable support section 3 moves up or down, the cam follower member 15 moves downward or upward as the cam follower 16 is shifted in the left-right direction along the cam groove 13 and the cam follower 17 is shifted in the left-right direction along the fixed cam surface 9. When the second cam follower is being within the third region S3 of the fixed cam surface, the downward vertical component Rc1 of the reaction force Rc works in a direction in which the push-up force of the spring force FA of the first spring 4 is reduced, thereby achieving the equilibrium with the load W.

In the third region S3, when the amount of displacement of the first spring 4 becomes smaller as the movable support section 3 goes up, the spring force FA decreases accordingly. As a result, a smaller vertical component Rc1 of the reaction force Rc is required to reduce the push-up force of the spring force FA. Therefore, the slope of the tangential direction of the fixed cam surface 9 relative to the vertical direction becomes smaller toward the upper second region S2.

Meanwhile, the amount of compression and displacement of the second spring 18 grows as the movable support section 3 goes up and the second cam follower 17 moves up along the fixed cam surface 9, resulting in an increase in the spring force FB. As a result, the pressing force applied from the second cam follower to the fixed cam surface, or the reaction force Rc, becomes larger. The slope of the fixed cam surface 9 is preferably determined in such a way as to achieve an optimal reduction in the push-up force of the spring force FA, based not only on a change in the spring force FA of the first spring 4 but also on a change in the spring force FB of the second spring 18.

In that manner, according to the present embodiment, in the entire region of the fixed cam surface 9, an equilibrium between the load W of the article A acting on the system made up of the cam follower member 15, the movable support section 3, and the fixed cam 8, the spring force FA of the first spring 4, the spring force FB of the second spring 18, and the reaction force applied from the fixed cam 8 is achieved around the cam follower member 15. Therefore, in the up-down stroke range of the movable support section 3, the movable support section 3 carrying the article A can be stopped at a desired height position and kept at that position, or can be easily lifted up or down with a relatively small force.

The above-described basic configuration of the present invention may be changed or modified in various ways and embodied. For example, the lateral frame member 10b may be a tubular member, and the second spring 18 may be fitted into the tubular member. The movable support section 3 can take various configurations other than the above-described rectangular frame.

Furthermore, another set of the fixed cam 8, cam groove 13, cam follower member 15, and second spring 18 shown in FIG. 1 may be added and be disposed in mirror symmetry with respect to a left-right-direction center line of the fixed support section 2 and movable support section 3. In this case, it is preferred that the second springs be formed as one common compression spring, and that the cam follower members 15 be provided at both ends thereof. This left-right-direction symmetrical configuration reduces the load borne by the fixed cam, and can support a larger load in a well-balanced, stable manner in the left-right direction as a whole.

Figure 6:
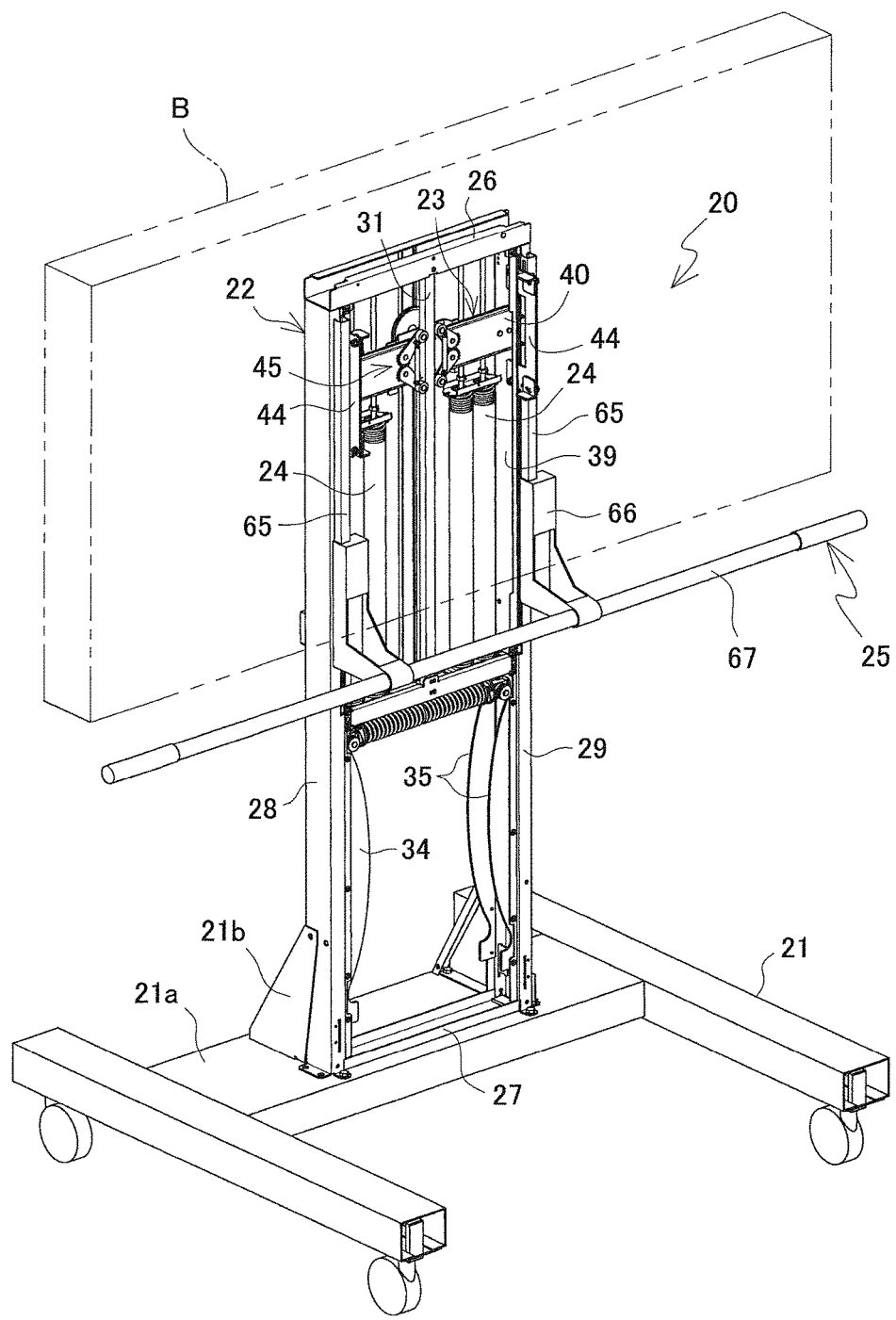
FIG. 6 is a perspective view of a first embodiment of an article support device to which the present invention is applied.
Figure 7:
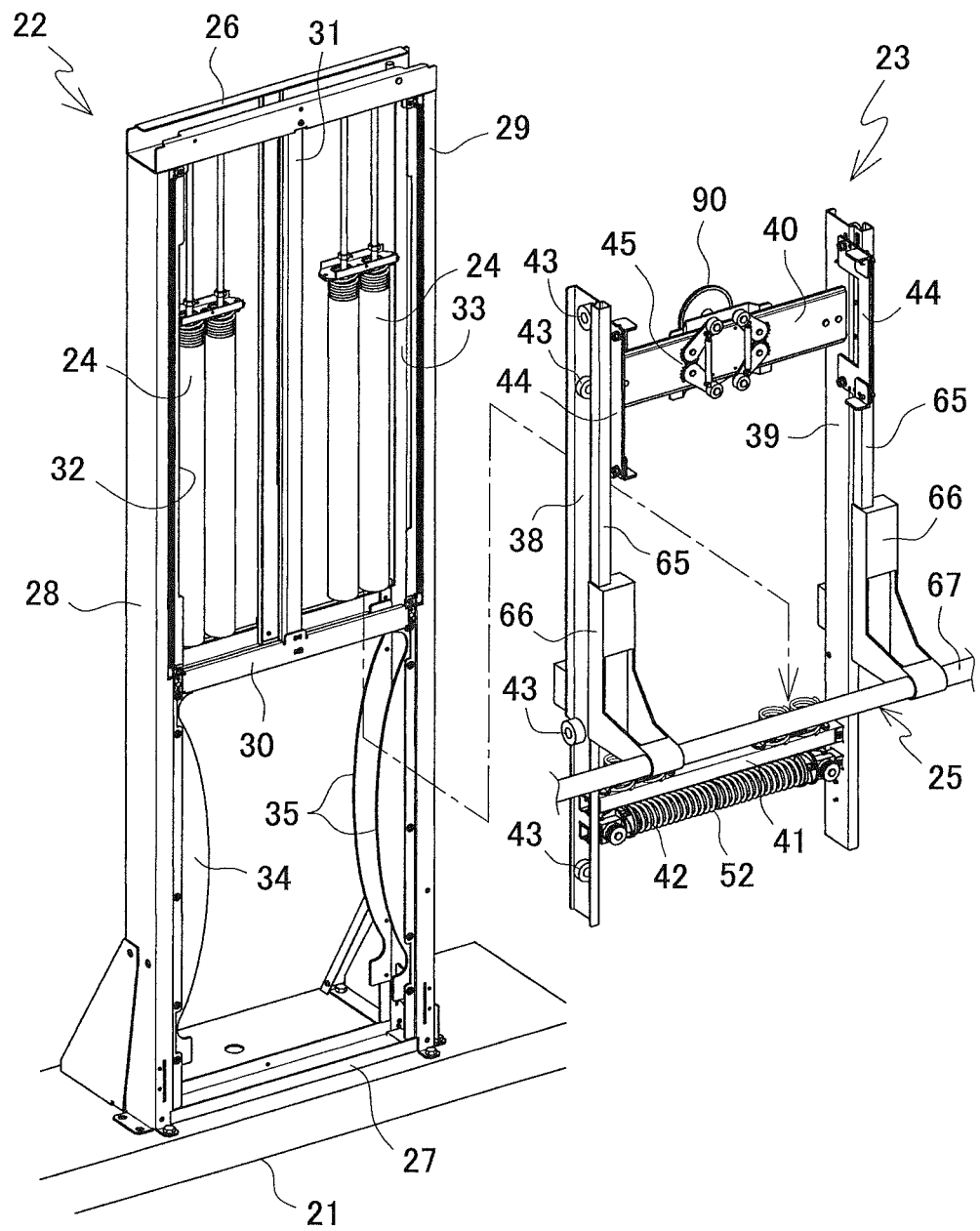
FIG. 7 is an exploded perspective view of the first embodiment of FIG. 6.
Figure 8:
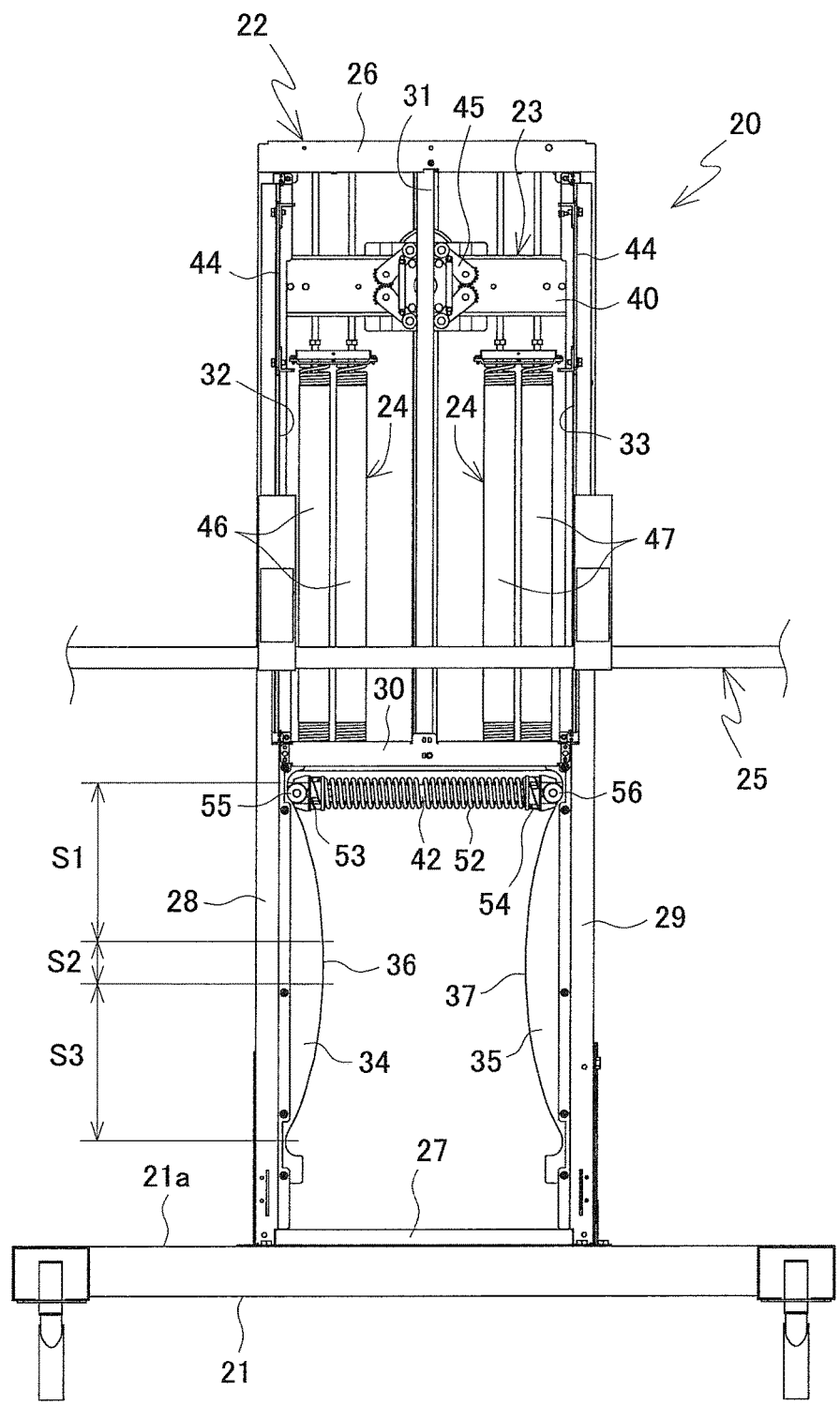
FIG. 8 is a front view of an article support device whose support frame section is at an uppermost position.

FIGS. 6 to 8 show a first embodiment of an article support device to which such a modified example of the present invention has been specifically applied. An article support device 20 of the present embodiment is designed to support a relatively heavy article B, such as a large-screen television monitor. The article support device 20 includes a base 21, which is placed on a floor surface or the like in a movable manner; a fixed frame section 22, which is fixed to the base; a support frame section 23, which is mounted on the fixed frame section in such a way as to be able to move up and down; a first sprint 24; and an operation handle section 25, which is used to move up or down the support frame section 23.

As described later, the article B is integrally attached to the support frame section 23 in a detachable manner. A lower portion of the fixed frame section 22 is erected and firmly fixed by stays 21b to an upper surface of a base plate 21a of the base 21.

The fixed frame section 22 is a roughly rectangular frame structure, including upper and lower frames 26 and 27, which extend horizontally, and left and right side frames 28 and 29, which extend vertically between the upper frame and the lower frame. Furthermore, at the center of the fixed frame section 22, a first brake rail 31 is provided in such a way as to extend vertically between the upper frame and an intermediate frame 30, which extends horizontally between the left and right side frames 28 and 29 and is substantially located at a mid-height position.

Figure 9A:
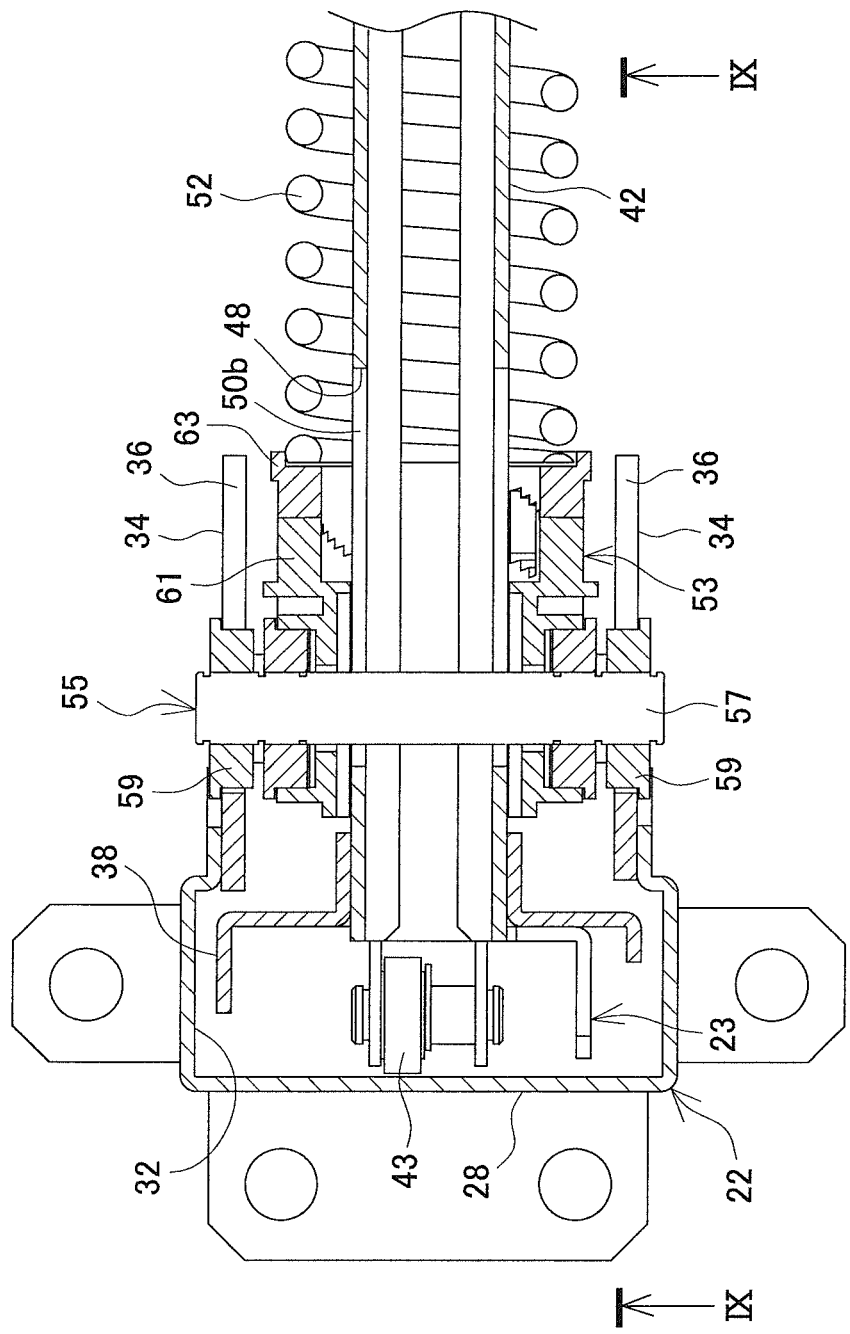
FIG. 9A is a partially enlarged vertical cross-sectional view of FIG. 8, with one cam follower being viewed from above.

FIG. 9A shows the cross-section of one side frame 28 of the fixed frame section 22. The other side frame 29 is formed exactly symmetrically to the side frame 28, and therefore is not shown in the diagram. As shown in FIG. 9A, in the side frame 28 or 29, a guide rail 32 or 33 is formed from an almost upper end of the side frame to a lower end: the guide rail 32 or 33 is U-shaped in cross-section and open to the inner side of the frame structure.

To the inner-side portion of the left or right side frame 28 or 29 of the fixed frame section 22 that is lower than the intermediate frame 30, a fixed cam member 34 or 35 is attached symmetrically in the left-right direction. The fixed cam member 34 or 35 includes two cam plates, which are long in the up-down direction and fixed to the front and back surfaces of the side frame 28 or 29 and which run parallel to each other. The fixed cam member 34 or 35 includes a fixed cam surface 36 or 37, which extends from around an upper end thereof to around a lower end. The fixed cam surface 36 or 37 forms a convex shape in a direction in which the fixed cam surfaces 36 and 37 face each other. The fixed cam surface 36 or 37 is provided in such a way that the slope of the tangential direction thereof is curved and is changed across the entire length from an upper end to a lower end or changed partially.

The support frame section 23 is a roughly rectangular frame structure, including left and right guide frames 38 and 39, which extend vertically, an upper frame 40, which extends horizontally between the two guide frames, and two lower frames 41 and 42, which are slightly separated in the up-down direction. The support frame section 23 is mounted on the fixed frame section 22 in such a way as to be able to move up and down along the guide rails, as the left and right guide frames 38 and 39 are fitted into the guide rail 32 and 33 of the corresponding left and right side frames 28 and 29 of the fixed frame section in a slidable manner.

On the left and right guide frames 38 and 39, a plurality of rollers 43 are mounted in such a way as to slide and roll on the inner surfaces of the guide rails; the rollers 43 are intended to reduce or eliminate a frictional force generated between the left and right guide frames 38 and 39 and the inner surfaces of the guide rails 32 and 33 when the left and right guide frames 38 and 39 slide inside the guide rails 32 and 33, and other kinds of resistance. Therefore, the support frame section 23 can smoothly move in the up-down direction without rattling or being displaced in the left-right direction with respect to the fixed frame section 22.

As described above, the support frame section 23 is mounted in such a way that the outer frame of the support frame section 23 is directly supported by the outer frame of the fixed frame section 22. Therefore, the structural strength of the support frame section 23 itself and the entire device is improved. As a result, the article support device 20 that can bear a high load and has a high strength structure can be realized: the article support device 20 can handle a heavier article B.

On the support frame section 23, a pair of left and right mounting stays 44 are provided in such a way as to extend vertically just ahead of the guide frames; the mounting stays 44 are used to fix the article B. Furthermore, in the support frame section 23, at the center of the upper frame 40, a brake device 45 is provided. As described later, as the operation handle section 25 is operated, the brake device causes a brake shoe (described later) to engage with a brake rail or cancels that engagement.

The first spring 24 includes two extension coil springs 46 just near the inner side of the left guide frame 38 of the support frame section 23, and two extension coil springs 47 just near the inner side of the right guide frame 39; the extension coil springs 46 and 47 are disposed symmetrically in the left- and right direction and in parallel in the left-right direction. An upper end of each of the extension coil springs 46 and 47 is fixed to the upper frame 26 of the fixed frame section 22 in such a way that each of the extension coil springs 46 and 47 hangs vertically; a lower end of each of the extension coil springs 46 and 47 is fixed to the upper-side lower frame 41 of the support frame section 23.

Figure 9B:
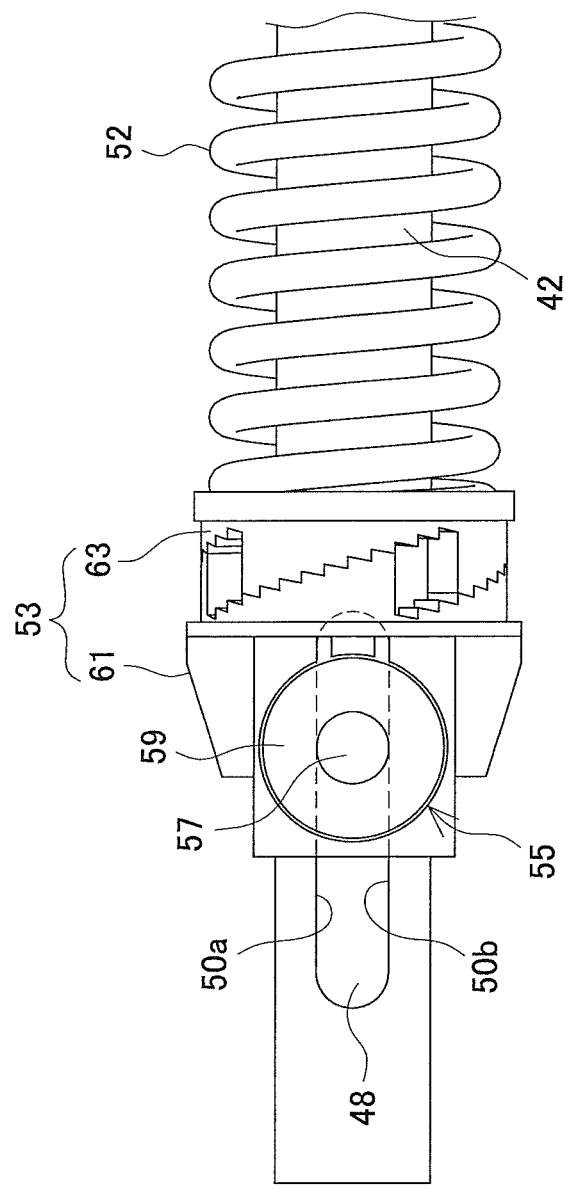
FIG. 9B is a view as seen in the direction of arrow along line IX-IX of FIG. 9A, with a fixed cam member omitted.
Figure 10:
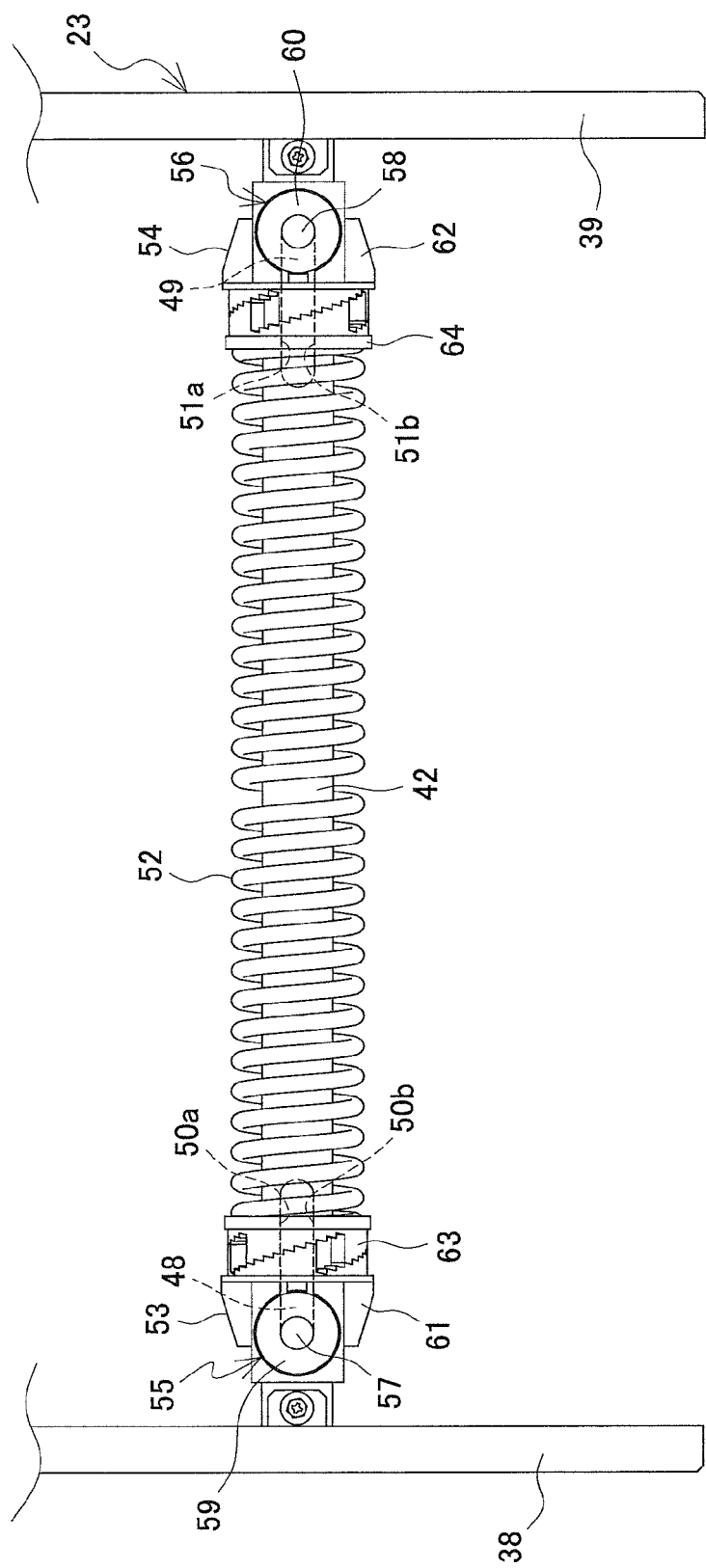
FIG. 10 is an enlarged view showing a lower frame below a support frame section, and a second spring.

As shown in FIG. 10, on the lower-side lower frame 42 of the support frame section 23, two cam grooves 48 and 49 are so provided as to be symmetrical in the left-right direction; the two cam grooves 48 and 49 pass through the lower frame in the front-back direction. As for the cam groove 48 which is shown in the left section of the diagram, as shown in FIGS. 9A and 9B, each cam groove 48 or 49 includes a first movable cam surface 50a or 51a, which extends horizontally a predetermined distance from around a left or right end of the lower frame 42 toward the opposite side and which is located on the upper side and faces downward; and a second movable cam surface 50b or 51b, which is located on the lower side and faces upward. The first movable cam surface 50a or 51a and the second movable cam surface 50b or 51b face each other and run parallel to each other.

Onto the lower frame 42, a second spring 52, which is a compression coil spring, is fitted. In this manner, the second spring 52 is fitted onto the straight lower frame 42, which is part of the support frame section 23. This configuration can reliably prevent buckling, which could occur due to the compression of the second spring 52. According to another example, the second spring 52 may be fitted into a tubular lower frame 42.

On the left and right sides of the second spring 52, via cam follower holders 53 and 54, into which the lower frame 42 is inserted in such a way as to allow the cam follower holders 53 and 54 to freely slide, cam follower members 55 and 56 are provided. As for the cam follower member 55 shown in the left section of the diagram, as shown in FIG. 9A, the cam follower member 55 or 56 includes a straight, rod-shaped first cam follower 57 or 58, which is circular in cross-section and passes through the cam groove 48 or 49 in the front-back direction. Furthermore, the cam follower member 55 or 56 includes roller-shaped second cam followers 59 or 60, which are provided on the front and rear ends of the first cam follower 57 or 58 that protrudes from the cam groove in the front-back direction.

The first cam follower 57 or 58 can move in the left-right direction in the cam groove 48 or 49 along the cam groove, as the outer peripheral surface of the first cam follower 57 or 58 is being in contact with the first movable cam surface 50a or 51a and the second movable cam surface 50b or 51b. The second cam followers 59 or 60 may be mounted in a rotatable manner with respect to the two ends of the first cam follower 57 or 58, for example, via a rolling bearing.

The second cam followers 59 or 60 are disposed in such a way as to be in contact with the fixed cam surface 36 or 37 of the corresponding fixed cam member 34 or 35. The second cam followers 59 or 60 are pressed by the second spring 52 in a horizontally outward direction, against the fixed cam surface 36 or 37 of the corresponding fixed cam member 34 or 35.

As for the cam follower holder 53 shown in the left section of the diagram, as shown in FIG. 9B, the cam follower holder 53 or 54 includes an outer-side first holder member 61 or 62, which extends along the axis direction of the second spring 52; and an inner-side second holder member 63 or 64. For example, the first holder member holds the first cam follower 57 or 58 in a rotatable manner via a bearing. The second holder member is a spring receiver, an end surface of which receives an end portion of the second spring 52.

The first holder member 61 or 62 and the second holder member 63 or 64 each includes an abutting surface on which a plurality of steps are provided in a terraced manner in the circumferential direction in such a way as to be complementarily engageable; the first holder member 61 or 62 and the second holder member 63 or 64 form a meshing joint when being joined together. The first holder member 61 or 62 and the second holder member 63 or 64 are rotated in the circumferential direction relative to each other, so that the abutting position of the members is changed. In this manner, the axis-direction length of the cam follower holder 53 or 54 can be changed.

As shown in FIG. 9A, the two cam plates of the fixed cam member 34 are disposed along the axis direction of the cam follower member 55 in such a way as to be symmetric in the front-back direction. Therefore, the each cam plate's force to press the cam follower member 55 is dispersed along the axis direction, and acts symmetrically in the front-back direction. Although not shown in the diagrams, in the other cam follower member 56, the pressing force that each cam plate of the fixed cam member 35 exerts is similarly dispersed along the axis direction, and acts symmetrically in the front-back direction. Accordingly, the cam follower members 55 and 56 are kept in the cam grooves 48 and 49 stably and horizontally. The dispersion of the force reduces the burden on each cam plate of the fixed cam member 35. Therefore, the cam plates can be made thinner. As a result, the entire device can be made thinner and lighter.

Moreover, between each cam plate of the fixed cam member 34 or 35 and the lower frame 42 of the support frame section 23 on which the cam groove 48 or 49 is provided, another component does not exist, allowing those parts to be placed at smaller intervals in the front-back direction. As a result, the axis-direction length of the first cam followers 57 and 58 of the cam follower members 55 and 56 can be made shorter, eliminating in advance the risk of being excessively bent, deformed, or broken, which the device could have faced if the first cam followers were too long.

Figure 11:
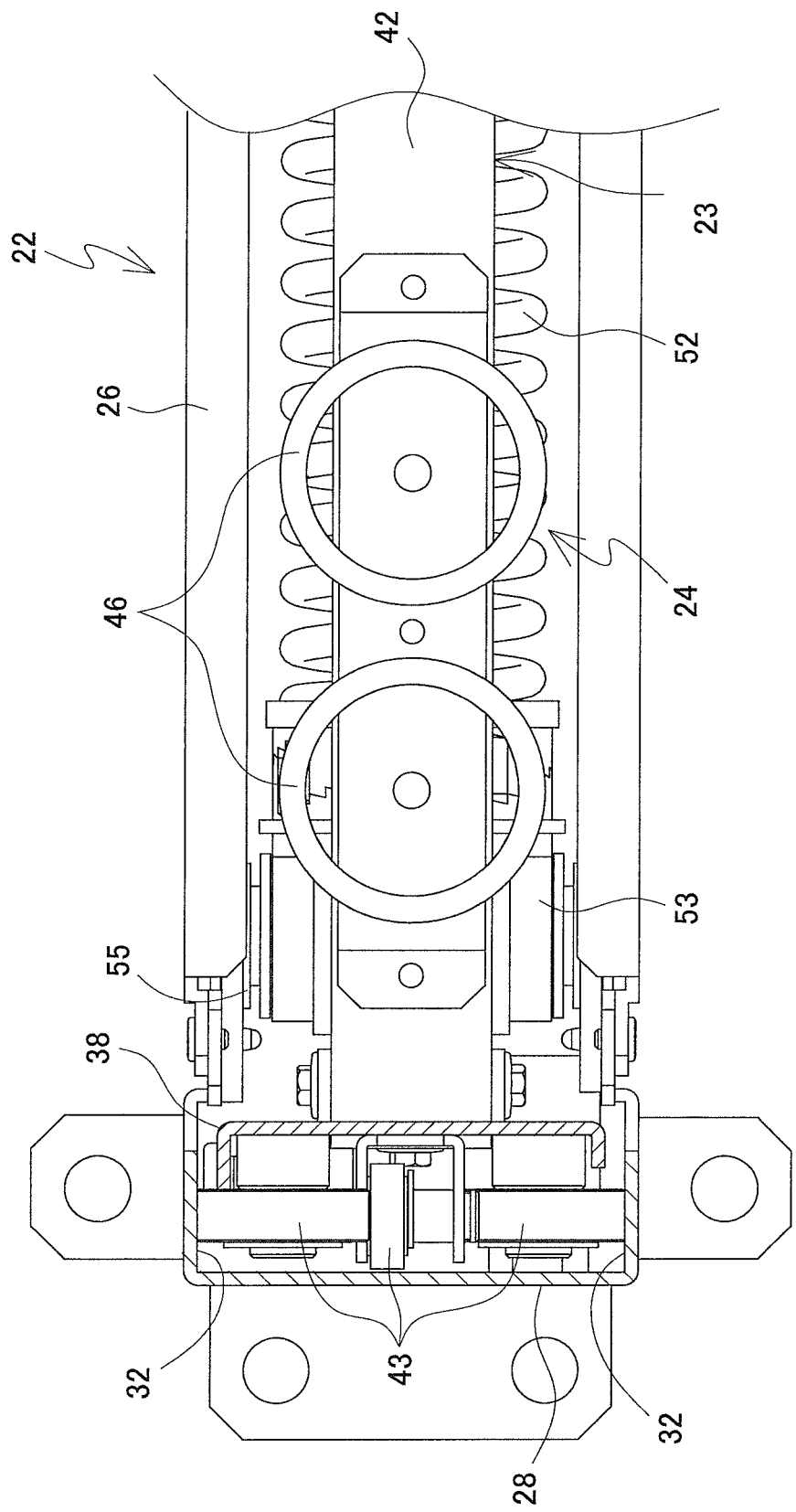
FIG. 11 is a partially enlarged view of a support frame section as viewed from above in a planar manner.

FIG. 11 is a partially enlarged view of the left portion in the diagram of the support frame section 23 as seen from above in planar view. As shown in the diagram, in the article support device 20 of the present embodiment, the almost entire extension coil springs 46 of the first spring 24 are disposed on a plane in such a way as to overlap with the second spring 52 in the up-down direction. Although not shown in the diagram, the almost entire extension coil springs 47 on the other side are similarly disposed on a plane in such a way as to overlap with the second spring 52 in the up-down direction. This arrangement helps to minimize the depth of the article support device 20 and thereby make the article support device 20 thinner even if the outer diameters of the first spring 24 and/or the second spring 52 become larger.

As shown in FIG. 8, as described above in relation to FIG. 1, the fixed cam surface 36 or 37 is divided into the following three regions, depending on the contact position with the second cam follower 59 or 60. A first region S1 is a region where the normal direction at a contact point with the second cam follower is upward relative to the horizontal direction. A second region S2 is a region where the normal direction at a contact point with the second cam follower is substantially horizontal; that is, the second region S2 is a region in which the tangential direction is substantially vertical. As described above, the term "substantially" means that the direction is slightly upward or downward compared to the exact horizontal direction, and the degree of deviation thereof is small enough to be negligible in terms of the operation and effects of the article support device 20, or the operation of the article support device 20, or the function. Therefore, the direction can be considered to be horizontal. A third region S3 is a region where the normal direction at a contact point with the second cam follower is downward relative to the horizontal direction.

The operation handle section 25 includes left and right vertical transmission rods 65, which are mounted on front portions of the left and right guide frames 38 and 39 of the support frame section 23 in such a way as to be able to move and slide within a predetermined small range in the up-down direction relative to the front portions. To a lower portion of each transmission rod 65, an almost L-shaped connection stay 66 is joined. Tip end portions of the two connection stays 66 that protrude forward hold a handle lever 67, which is long and extends in the left-right direction. The handle lever 67 is grabbed by hands to operate the operation handle section 25 and thereby lift up or down the support frame section 23 and the article B.

Figure 12:
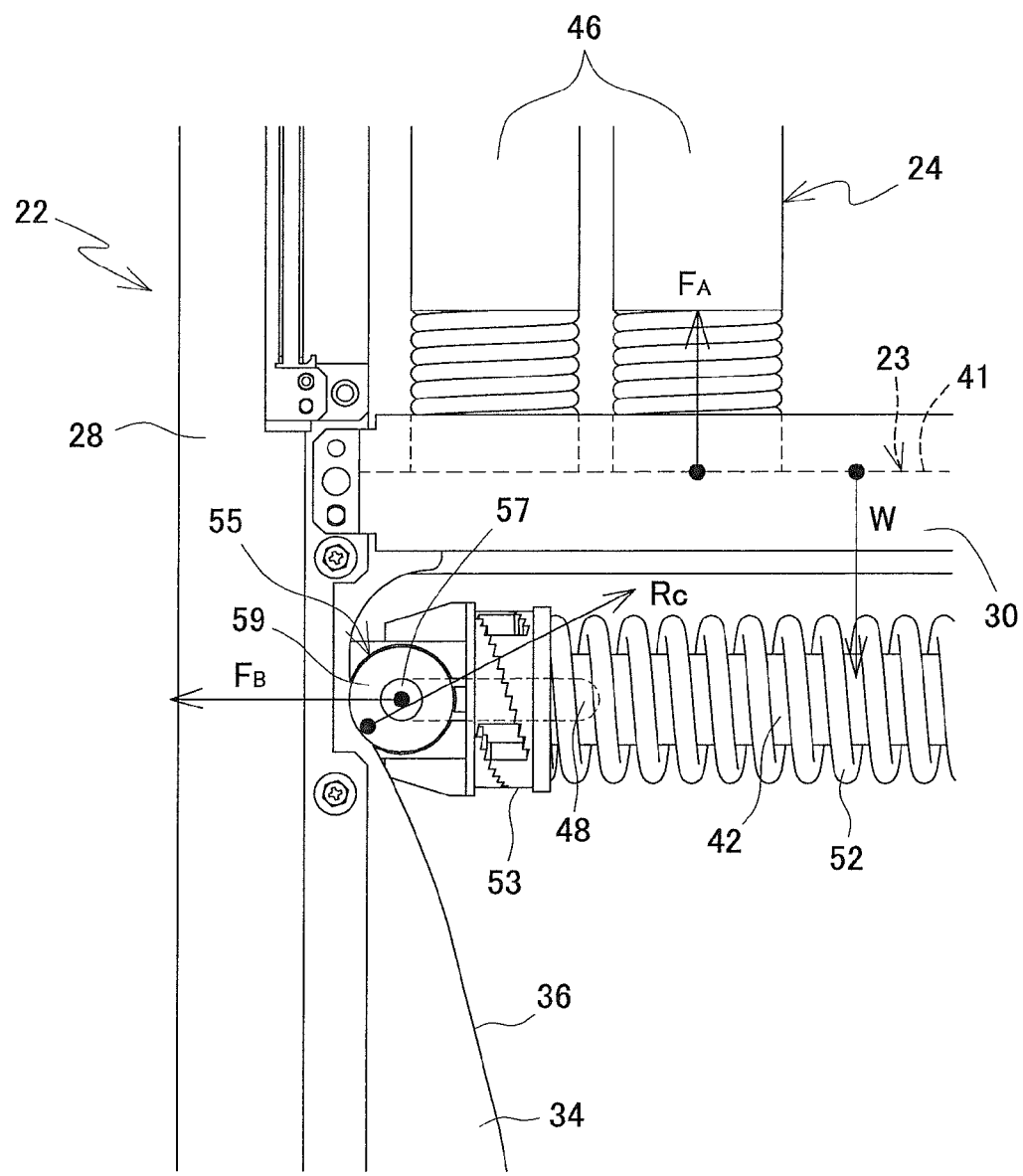
FIG. 12 is a partially enlarged view showing a fixed cam surface of FIG. 8 and a cam follower member.

FIGS. 8 and 12 show the case where the support frame section 23 on which the article B is mounted is located at an uppermost position of a movement range thereof. The second cam followers 59 and 60 remain stationary at the upper ends of the first regions S1 of the fixed cam surfaces 36 and 37. At this position, the load W of the article B acting on the system made up of the cam follower members 55 and 56, the fixed frame section 22, and the support frame section 23, the spring force FA of the first spring 24, the spring force FB of the second spring 52, and the reaction force applied from the fixed cam surfaces are balanced against each other around the cam follower members.

In the first region S1, the amounts of displacement of the extension coil springs 46 and 47 of the first spring 24 are small, and that spring force FA is smaller than the load W of the article B. The reaction force Rc that is applied to the second cam follower 59 from the fixed cam surface 36 contains an upward vertical component. Therefore, this component is used as an assist force and is added to the spring force FA of the first spring 24. As a result, an equilibrium with the load W is achieved in the vertical direction.

Figure 13:
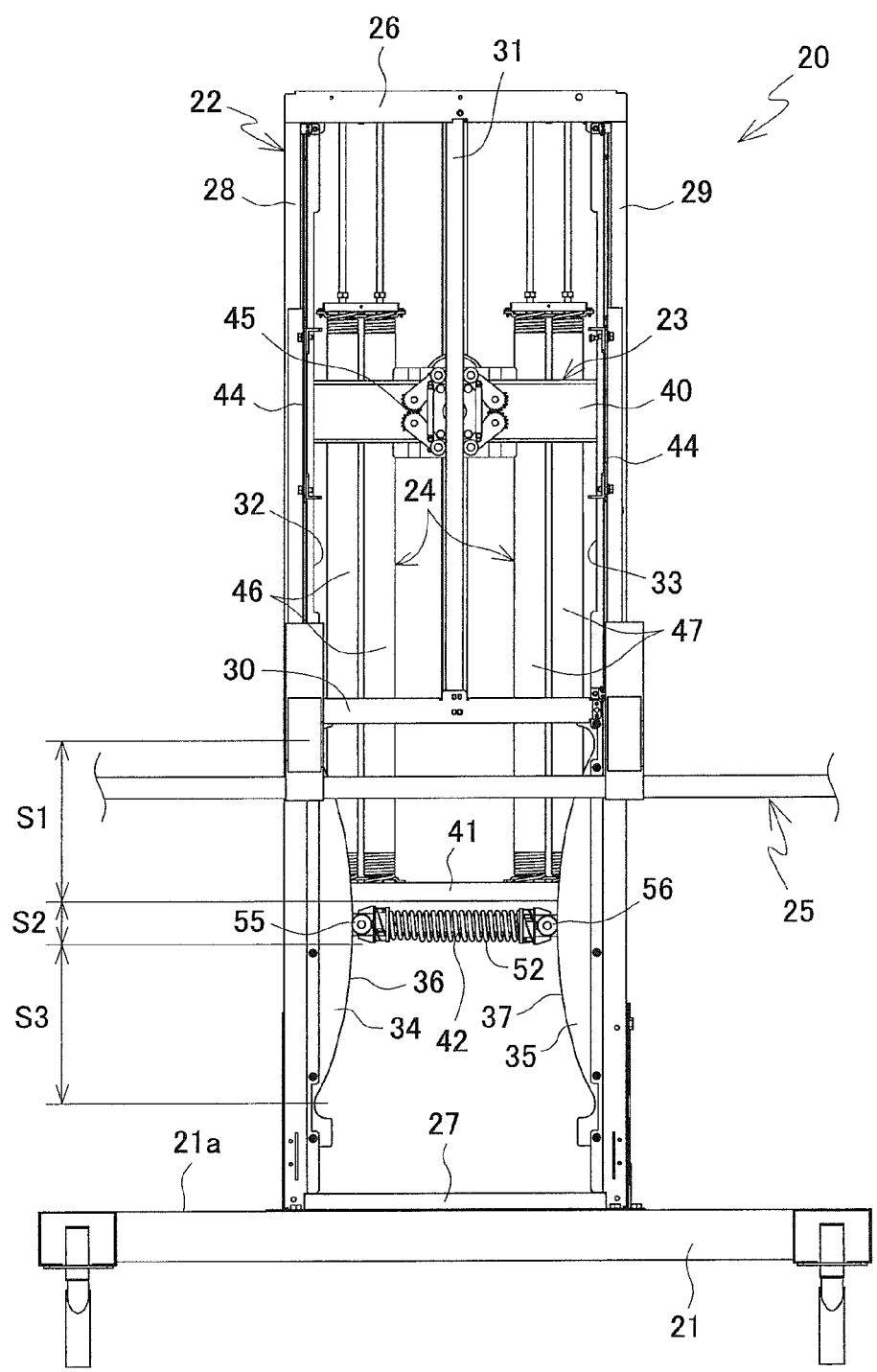
FIG. 13 is a front view similar to FIG. 8 when a support frame section is at a middle position.
Figure 14:
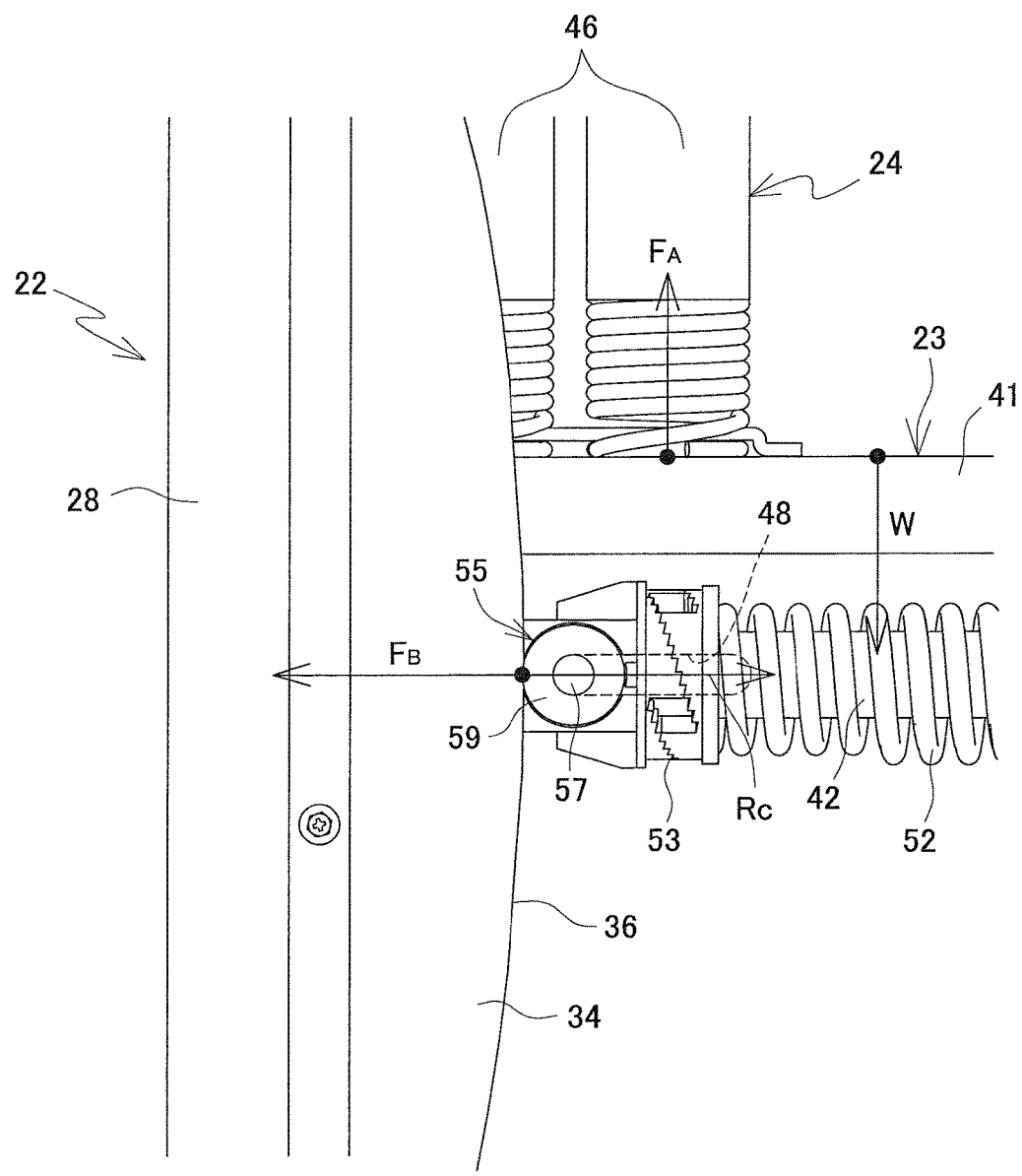
FIG. 14 is a partially enlarged view showing a fixed cam surface of FIG. 12 and a cam follower member.

FIGS. 13 and 14 show the case where the support frame section 23 on which the article B is mounted is located at a middle position of the movement range thereof. The second cam followers 59 and 60 remain stationary at a position inside the second region S2 of the fixed cam surfaces 36 and 37. Even at this middle position, the load W of the article B acting on the system made up of the cam follower members, the fixed frame section, and the support frame section, the spring force FA of the first spring, the spring force FB of the second spring, and the reaction force applied from the fixed cam surfaces are balanced against each other around the cam follower members.

In the second region S2, the spring force FA of the first spring 24 is substantially balanced against the load W. In effect, the reaction force Rc applied from the fixed cam surfaces 36 and 37 only contains a horizontal component, and is balanced against the spring force FB of the second spring 52, and does not include a vertical component.

Figure 15:
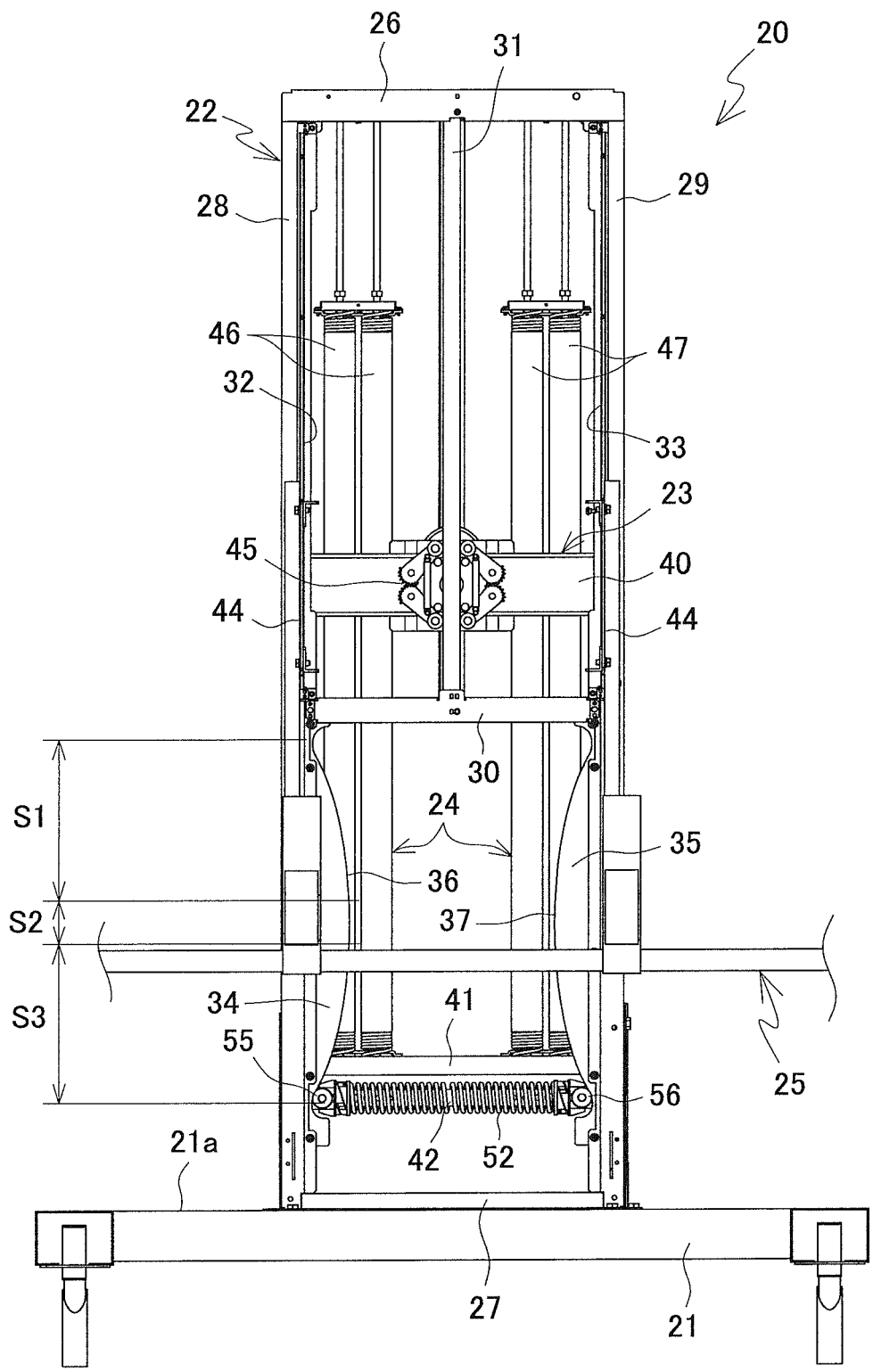
FIG. 15 is a front view similar to FIG. 8 when a support frame section is at a lowermost position.
Figure 16:
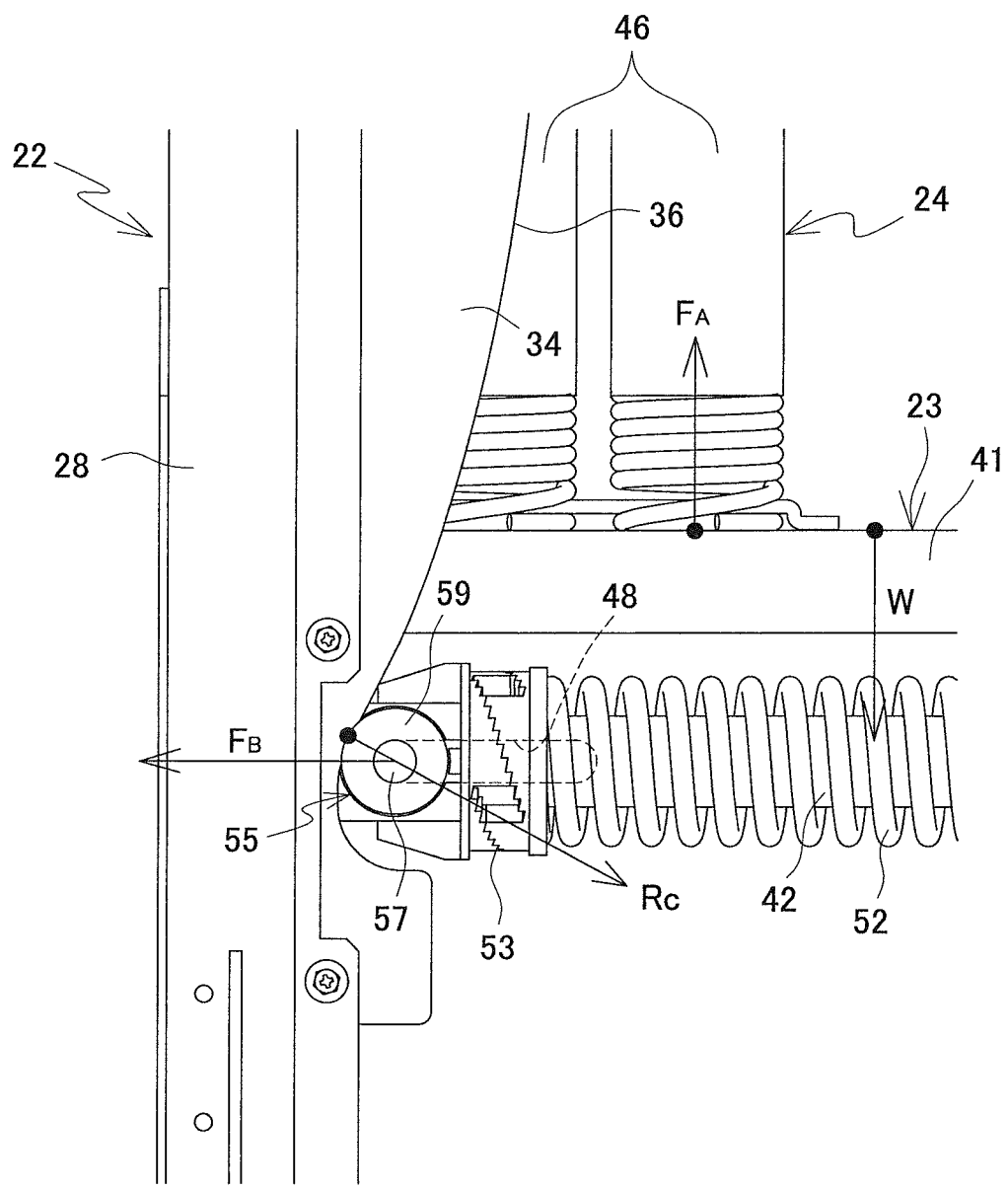
FIG. 16 is a partially enlarged view showing a fixed cam surface of FIG. 15 and a cam follower member.

FIGS. 15 and 16 show the case where the support frame section 23 on which the article B is mounted is located at a lowermost position of the movement range thereof. The second cam followers 59 and 60 remain stationary at the lower end of the third region S3 of the fixed cam surfaces 36 and 37. Even at this lower-end position, the load W of the article B acting on the system made up of the cam follower members, the fixed frame section, and the support frame section, the spring force FA of the first spring, the spring force FB of the second spring, and the reaction force applied from the fixed cam surfaces are balanced against each other around the cam follower members.

In the third region S3, the amounts of displacement of the extension coil springs 46 and 47 of the first spring 24 are large, and the spring force FA thereof is larger than the load W of the article B. The reaction force Rc that is applied to the second cam follower 59 from the fixed cam surface 36 contains a downward vertical component, which acts in a direction in which the push-up force of the spring force FA of the first spring 24 is reduced. As a result, the force is balanced against the load W in the vertical direction.

If the load W of the article B becomes smaller, the spring force FA of the first spring 24 becomes relatively larger because the first spring 24 remains the same. Therefore, in the first region S1, the assist force added to the spring force FA from the fixed cam surface needs to be smaller; in the third region S3, the force that is applied downward to reduce the push-up force of the spring force FA needs to be larger.

If the load W of the article B becomes larger, the spring force FA of the first spring 24 becomes relatively smaller. Therefore, in the first region S1, the assist force added to the spring force FA from the fixed cam surface needs to be larger; in the third region S3, the force that is applied downward to reduce the push-up force of the spring force FA needs to be smaller.

In the article support device 20, the axis-direction length of the cam follower holders 53 and 54 are changed to adjust the amount of compression and displacement of the second spring 52. In this manner, the adjustment is made in such a way as to increase or decrease the biasing force FB of the second spring 52 that is at the same height position of the support frame section 23, or the reaction force Rc applied from the fixed cam surface. If the load W is small, the axis-direction length of the cam follower holders is shortened to reduce the biasing force FB of the second spring 52, thereby decreasing the reaction force Rc applied from the fixed cam surface and the vertical component thereof. If the load W is large, the axis-direction length of the cam follower holders is increased to boost the biasing force FB of the second spring 52, thereby increasing the reaction force Rc applied from the fixed cam surface and the vertical component thereof.

In the article support device 20, since the forces are balanced in the vertical direction at the stationary position, the article B can easily be moved with a relatively small force from any height position to another height position. However, if the mass of the article is increased, an inertial force acting on the moving article increases accordingly, and it might be difficult to stop at a desired position. In the worst case scenario, the support frame section 23 carrying the article B could violently hit the fixed frame section 22 at the upper or lower end of the movement range or of the up-down stroke.

As a means to solve the above problem, in general, what is known is an elastic body, such as a damper, shock absorber or rubber, which works to attenuate or absorb kinetic energy. For example, if a gas spring or an oil damper, which makes use of fluid resistance, is used, it becomes difficult to handle the device and the device becomes expensive, as the device as a whole becomes complicated, larger, and heavier. The elastic body such as rubber may not always be sufficiently effective.

The article support device 20 of the present embodiment includes a cushioning mechanism of an effective, simple configuration to slow down the movement of the support frame section 23 at the upper and lower ends of the up-down stroke of the support frame section 23 and thereby stop the support frame section 23 without a large shock. The cushioning mechanism is realized in an effective manner based on the basic technical concept of the present invention by applying a new, novel idea to the cam plates of the fixed cam members 34 and 35 that drive the second cam followers 59 and 60, as described below.

Figure 17:
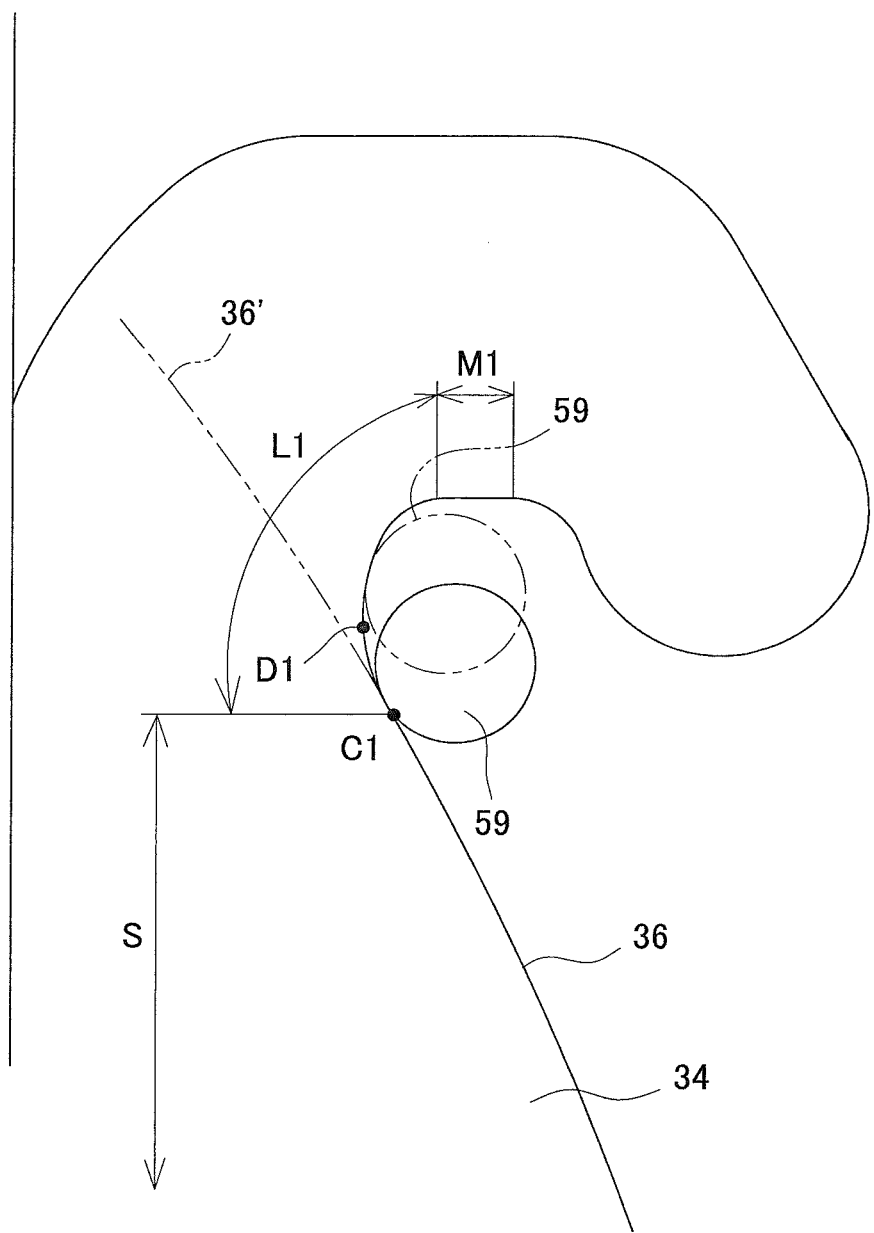
FIG. 17 is a partially enlarged view showing an area around an upper end of a fixed cam surface.

FIG. 17 is an enlarged view of an area around the upper end of the fixed cam surface 36 of the fixed cam member 34 shown in the left section of the diagram. In the diagram, a contact point of the second cam follower 59 with the fixed cam surface 36, indicated by solid line, is an upper-limit position C1 of an effective region S of the fixed cam surface where the function of causing the support frame section 23 on which the article B is mounted to stop at a desired height position is demonstrated. The fixed cam surface 36 further extends upward from the upper-limit position C1, and an upper cushioning area L1 and an upper stopper area M1 are successively provided.

The upper cushioning area L1 is significantly curved in a direction opposite to a virtual fixed cam surface extension section 36' indicated by imaginary line in the diagram. The upper cushioning area L1 is curved in such a way as to pass through a point D1, where the tangential direction thereof is vertical, on the way to the upper stopper area M1. The upper stopper area M1 is a horizontal surface that faces downward to completely stop the upward movement of the second cam follower 59.

In the upper cushioning area L1, from the upper-limit position C1 to the point D1, the slope of the tangential direction relative to the vertical direction becomes rapidly smaller. Accordingly, an upward vertical component of the reaction force applied from the fixed cam surface 36 to the second cam follower 59 rapidly decreases, and drops to zero at point D1. As a result, the assist force added from the fixed cam surface 36 to the biasing force FA of the first spring 24 is rapidly lost, significantly slowing the upward movement of the article B and the support frame section 23.

In the range extending from the point D1 to the upper stopper area M1, the reaction force applied from the fixed cam surface 36 to the second cam follower 59 generates a downward vertical component, thereby pushing down the second cam follower 59. As a result, the upward movement of the article B and the support frame section 23 is further slowed down.

Due to such a downward deceleration action, the guide frames 38 and 39 of the support frame section 23 do not collide with the upper end of the guide rail 31 of the fixed frame section 22, and the second cam follower 59 is stopped in the upper cushioning area L1. Even if the second cam follower 59 is not stopped, the second cam follower 59 enters the upper stopper area M1 at a relatively low speed before being stopped there. At this stop position, the weight of the article B and the support frame section 23 combined is greater than the push-up force of the first spring 24. Therefore, after being stopped very temporarily, the article B and the support frame section 23 start gradually and slightly going down due to their own weight, and the second cam follower 59 is stopped after returning to an area near the upper-limit position C1.

Figure 18:
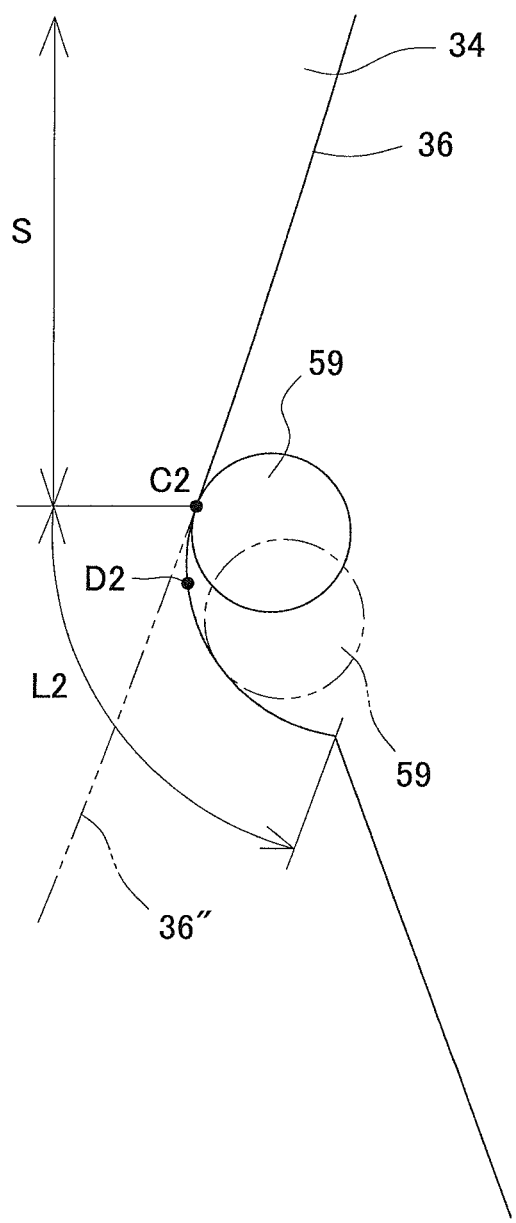
FIG. 18 is a partially enlarged view showing an area around a lower end of a fixed cam surface.

FIG. 18 is an enlarged view of an area around the lower end of the fixed cam surface 36. In the diagram, a contact point of the second cam follower 59 with the fixed cam surface 36, indicated by solid line, is a lower-limit position C2 of the effective region S of the fixed cam surface. The fixed cam surface 36 further extends downward from the lower-limit position C2, and a lower cushioning area L2 is provided.

The lower cushioning area L2 is significantly curved in a direction opposite to a virtual fixed cam surface extension section 36" indicated by imaginary line in the diagram. The middle of the lower cushioning area L2 is further curved after passing through a point D2, where the tangential direction thereof is vertical. From the lower-limit position C2 to D2, the slope of the tangential direction relative to the vertical direction becomes rapidly smaller. Accordingly, a downward vertical component of the reaction force applied from the fixed cam surface 36 to the second cam follower 59 rapidly decreases, and drops to zero at point D2. As a result, the force of pushing down the support frame section 23 against the biasing force of the first spring 24 is rapidly lost, significantly slowing the downward movement of the article B and the support frame section.

In the range beyond the point D2, the reaction force applied from the fixed cam surface 36 to the second cam follower 59 generates an upward vertical component, thereby pushing up the second cam follower 59. As a result, the downward movement of the article B and the support frame section 23 is further slowed down.

Due to such an upward deceleration action, the guide frames 38 and 39 of the support frame section 23 do not collide with the lower end of the guide rail 31 of the fixed frame section 22, and the second cam follower 59 is stopped in the lower cushioning area L2. At this stop position, the push-up force of the first spring 24 is greater than the weight of the article B and the support frame section 23 combined. Therefore, after being stopped very temporarily, the article B and the support frame section 23 go up slightly due to the biasing force of the first spring, and the second cam follower 59 is stopped after returning to an area near the lower-limit position C2 of the fixed cam surface 36.

FIGS. 17 and 18 only show the fixed cam member 34, which is shown in the left sections of the diagrams. In the right fixed cam member 35, the upper cushioning area L1, the upper stopper area M1, and the lower cushioning area L2 may be similarly provided. Needless to say, those areas may be provided in either the fixed cam member 34 or 35. Moreover, either a set of the upper cushioning area L1 and upper stopper area M1 or the lower cushioning area L2 may be provided.

According to the present embodiment, in order to slow and/or stop the support frame section 23 at the upper and lower ends of the up-down stroke, the fixed cam surface 36 is extended above and below the effective region S, and the cushioning areas in which the forces acting around the cam follower member 55 will not be balanced are provided.

According to another embodiment, a region in which the forces acting around the cam follower member 55 will not be balanced may be provided between regions where the forces acting around the cam follower member will be balanced, or may be provided within the effective region S of the fixed cam surface 36.

For example, in the first region S1 of the fixed cam surface 36, a non-equilibrium region with a slope that reduces the upward assist force more than an equilibrium state, and a non-equilibrium region with a slope that brings the assist force back to the original level, may be successively provided between an equilibrium region and an equilibrium region. In the third region S3 of the fixed cam surface 36, a non-equilibrium region with a slope that reduces a downward force of reducing the biasing force of the spring more than an equilibrium state, and a non-equilibrium region with a slope that brings that force back to the original level, may be successively provided between an equilibrium region and an equilibrium region.

In such a case, the moving support frame section 23 would cause a temporary change in the traveling speed and suffer a mild shock associated with the change, as the support frame section 23 gets into a non-equilibrium region from an equilibrium region and goes back to the equilibrium region. Therefore, a user who is manually operating the handle lever 67 of the operation handle section 25 can recognize the height position of the moving support frame section 23.

In a non-equilibrium region, the forces acting around the cam follower member 55 are balanced against each other at a position where the direction of the slope is changed. Therefore, if this position is preset, the support frame section 23 can be easily stopped at a desired height position. Such a height position may be a middle position of the up-down stroke of the support frame section 23, for example.

According to the above-described embodiment of FIGS. 1 to 6, the cam grooves 13, 48, and 49 are provided in such a way as to horizontally extend on the lateral frame member 10b or the lower frame 42. According to another embodiment, depending on the structure and purpose of the support mechanism, design conditions, and the like, the cam grooves 13, 48, and 49 may be provided diagonally, or may be provided in a cross direction that is not perpendicular to the movement direction of the movable support section or support frame section.

The first movable cam surface and the second movable cam surface in the cam groove 13, 48, or 49 may not be provided in parallel. All that is required is for the first movable cam surface and the second movable cam surface to be disposed in such a way as to face each other, with one of the movable cam surfaces coming in contact with the cam follower member to make it possible to transmit the load and the spring force of the first spring therebetween.

Furthermore, the article support device 20 of the present embodiment includes the brake mechanism that can keep the support frame section 23 at a desired height position even when an external force, such as vibration or shock, is applied, and can easily move or stop the support frame section 23 through a simple operation. The brake mechanism includes the brake device 45 of the support frame section 23 and the first brake rail 31 of the fixed frame section 22. As the handle lever 67 of the operation handle section 25 is operated, the brake device 45 is activated via the transmission rods 65 or is released.

Figure 19:
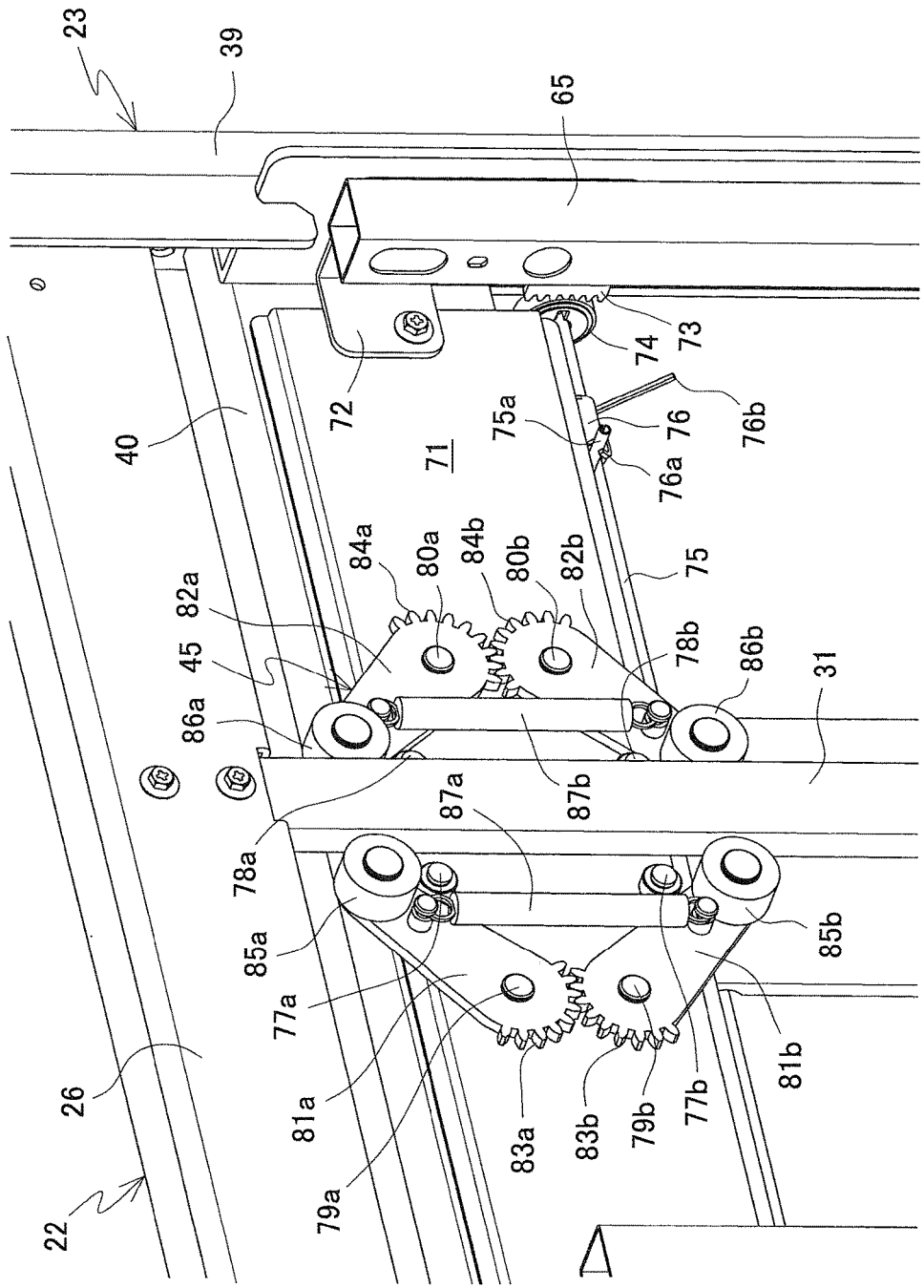
FIG. 19 is a partially enlarged perspective view showing a brake mechanism of a first embodiment.

As shown in FIG. 19, the brake device 45 is disposed just ahead of the upper frame 40 of the support frame section 23 in such a way as to be slightly separated therefrom and run parallel to the upper frame 40; and is disposed right behind the first brake rail 31 of the fixed support frame section 22. The brake device 45 includes a transmission plate 71 that extends in the left-right direction. The left and right end portions of the transmission plate 71 is mounted integrally and fixed to the upper end portions of the left and right transmission rods 65 via appropriate stays 72, for example.

The transmission rods 65 are mounted in such a way as to be able to move up and down relative to the left and right guide frames 38 and 39 of the adjacent support frame section 23 within a predetermined small range. More specifically, the transmission rods 65 and the transmission plate 71 can move up and down between a home position shown in FIG. 20, an upward release position shown in FIG. 21, and a downward release position shown in FIG. 22.

On at least one transmission rod 65, a rack 73 is provided integrally; a pinion 74, which meshes with the rack, is mounted integrally and coaxially with a spring shaft 75, which is horizontally stretched between the two guide frames and is provided in the axis direction and in a rotatable manner. Around the spring shaft 75, a return spring 76, which is a coil spring for example, is gently wound, and is used to push up the transmission rod 65 via the pinion 74 and the rack 73. One end 76a of the return spring 76 is fastened to a claw 75a on the spring shaft 75 in a direction in which the transmission rod 65 is pressed upward. The other end 76b is provided in such a way as to be freely engaged with or detached from an engagement portion (not shown) of the guide frame depending on a rotation position of the spring shaft 75.

Figure 20:
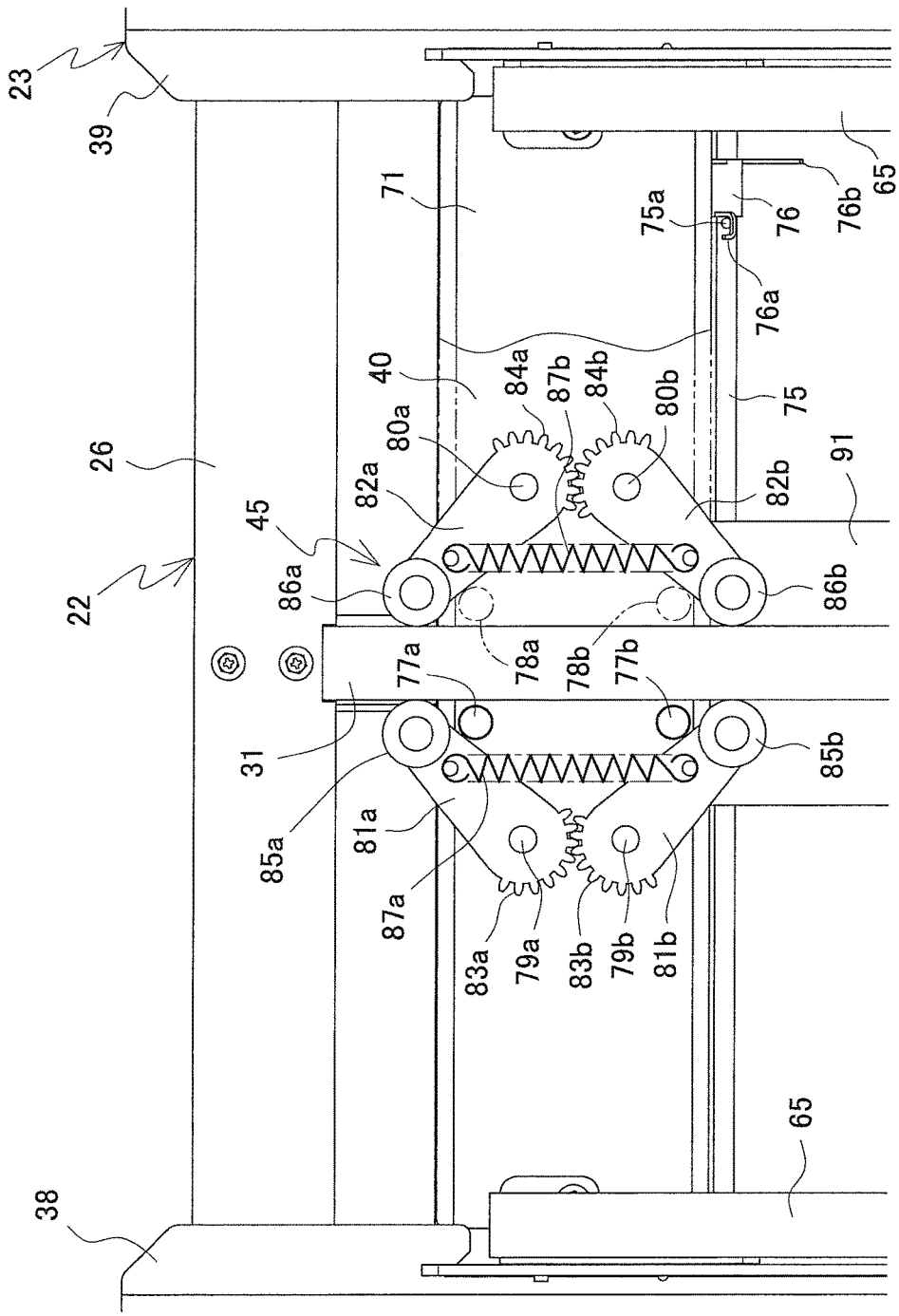
FIG. 20 is a front view of a brake mechanism of FIG. 19.

At the home position shown in FIG. 20, the other end 76b of the return spring 76 engages with the engagement portion and presses the transmission rod 65 and the transmission plate 71 upward. When the operation handle section 25 is manually pushed down to move the transmission rod and the transmission plate from the home position to the downward release position of FIG. 22, the other end 76b of the return spring 76 still remains engaged with the engagement portion. After that, once a user gets his/her hands off the operation handle section, the transmission rod and the transmission plate start to move upward due to the biasing force of the return spring 76 and return to the home position.

Figure 21:
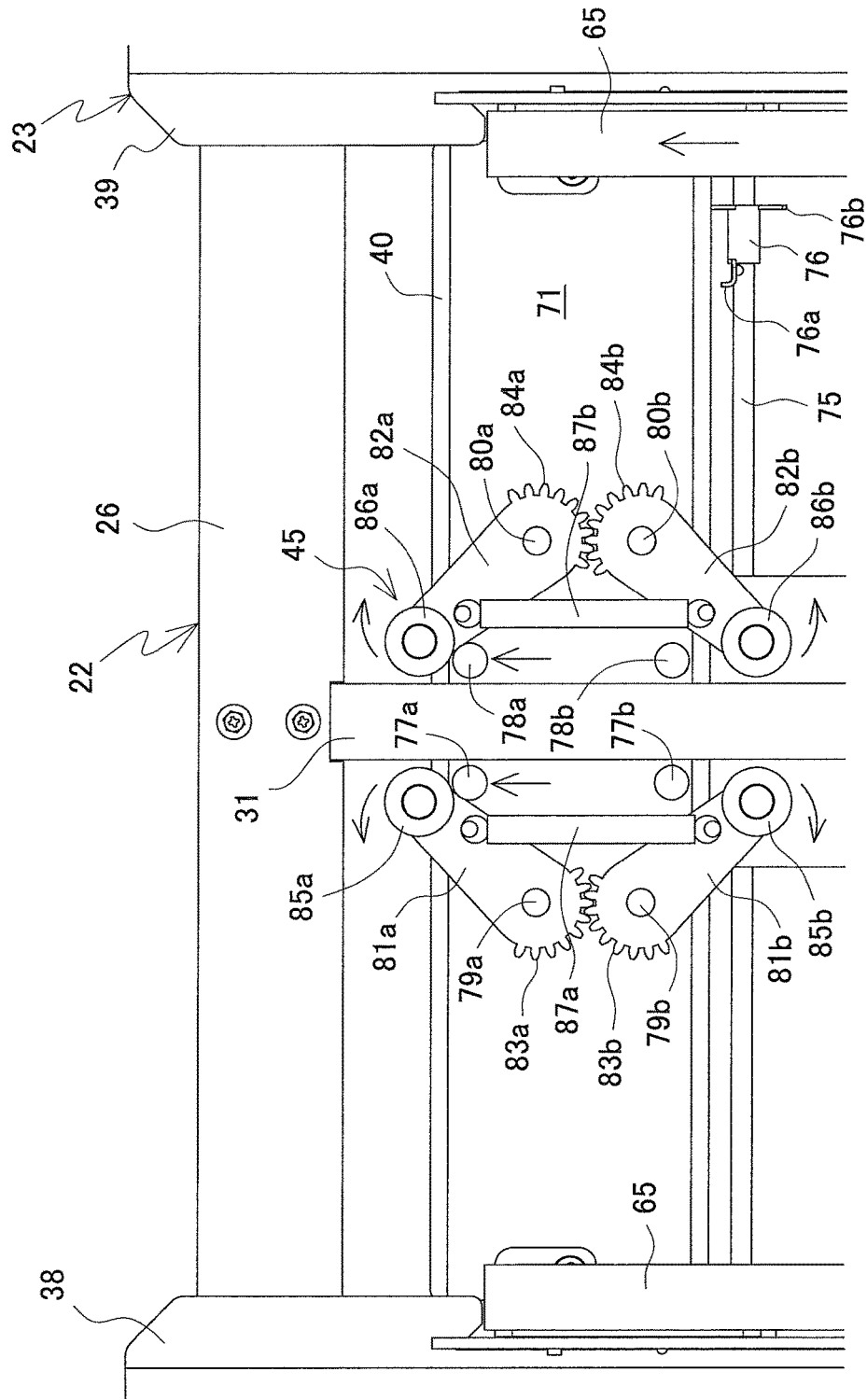
FIG. 21 is a front view showing a moving-up release operation of a brake mechanism of FIG. 19.

When the operation handle section 25 is manually pushed up to move the transmission rod and the transmission plate from the home position to the upward release position of FIG. 21, the other end 76b of the return spring 76 is released from the engagement portion, and the biasing force of the return spring is lost. After that, once a user gets his/her hands off the operation handle, the transmission rod and the transmission plate go down due to their own weight and return to and stop at the home position where the biasing force of the return spring is restored.

On the transmission plate 71, on the left and right sides of the first brake rail 31, pairs of transmission pins 77a, 77b, 78a, and 78b are provided integrally and symmetrically in the left-right direction in such a way as to protrude forward. The transmission pins 77a, 77b, 78a, and 78b are disposed just outside of the first brake rail 31 in such a way that the pairs are separated from each other in the up-down direction with a certain distance therebetween.

On the upper frame 40 of the support frame section 23, pairs of support shafts 79a, 79b, 80a, and 80b are provided on both sides of the first brake rail 31 in such a way as to be closer to the outer sides than the transmission pins; the support shafts 79a, 79b, 80a, and 80b are provided integrally and symmetrically in the left-right direction in such a way as to protrude forward. The upper support shafts 79a and 80a are disposed below the upper transmission pins 77a and 78a. The lower support shafts 79b and 80b are disposed above the lower transmission pins 77b and 78b. The tip of each support shaft is inserted into a release hole (not shown) that is made in the transmission plate 71, and extends from the front side of the transmission plate. The release holes of the transmission plate 71 are large enough not to obstruct the up-down movement of the transmission plate when the operation handle section 25 is operated as described above.

On the tips of the support shafts 79a, 79b, 80a, and 80b that protrude from the front side of the transmission plate 71, brake arms 81a, 81b, 82a, and 82b are pivotally mounted in a rotatable manner along a plane of the transmission plate 71, respectively. The upper brake arms 81a and 82a are disposed above the upper transmission pins 77a and 78a, which are adjacent to the tip portions of the upper brake arms 81a and 82a. The lower brake arms 81a and 82b are disposed below the lower transmission pins 77b and 78b, which are adjacent to the tip portions of the lower brake arms 81a and 82b.

On base end portions of the brake arms, gear sections 83a, 83b, 84a, and 84b are formed on the outer peripheries of the brake arms. The gear sections of the brake arms 81a and 81b that are paired in the up-down direction mesh with one another, and the gear sections of the brake arms 82a and 82b that are paired in the up-down direction mesh with one another. Therefore, in each pair of brake arms, as one is rotated, the other starts to rotate in the opposite direction.

Between the gear sections 83a and 83b and 84a and 84b that mesh with one another, there is backlash. Accordingly, as for the brake arms 81a and 81b and 82a and 82b that are paired in the up-down direction, as one starts to rotate, the other starts to rotate with a short delay. Therefore, the brake arm on the side to which the support frame section 23 is to be moved is released from the engagement with the side surface of the first brake rail 31, before the other-side brake arm is released from the engagement with the side surface of the first brake rail. During the period in which the release is delayed, the support frame section 23 is held in such a way as not to move to the side opposite to the direction in which the section is supposed to move.

On the tips of the brake arms, brake shoes 85a, 85b, 86a, and 86b are provided. Between the tip portions of the brake arms 81a and 81b and 82a and 82b that are paired in the up-down direction, extension springs 87a and 87b are placed to press the brake arms toward each other. Due to the biasing force of the extension springs 87a and 87b, each of the brake shoes is pressed against the side surface of the first brake rail 31 at the home position of FIG. 22. The spring strength of each extension spring is set in such a way as to exert frictional resistance or braking force strong enough to make it difficult for the support frame section 23 on which the article B is mounted to move from the stationary position, between the brake shoes and the side surfaces of the first brake rail 31.

The upper brake arms 81a and 82a are designed to exert a larger braking force for the upward movement of the support frame section 23 than for the downward movement, or to exert a larger braking force in the downward direction than in the upward direction. The lower brake arms 81b and 82b are designed to exert a larger braking force for the downward movement of the support frame section 23 than for the upward movement, or to exert a larger braking force in the upward direction than in the downward direction. The reason, as described later, is that the upper brake arms 81a and 82a are disposed obliquely in such a way that the fulcrums or support shafts 79a and 80a are positioned below the contact points of the brake shoes 85a and 86a with the side surfaces of the first brake rail 31, and that the lower brake arms 81b and 82b are disposed obliquely in such a way that the fulcrums or support shafts 79b and 80b are positioned above the contact points of the brake shoes 85b and 86b with the side surfaces of the first brake rail 31.

When the operation handle section 25 is lifted up to move the transmission plate 71 to the upward release position shown in FIG. 21, the upper transmission pins 77a and 78a come in contact with side edges of the upper brake arms 81a and 82a, thereby turning the upper brake arms 81a and 82a in an upward outward direction against the biasing forces of the extension springs 87a and 87b. In response, the lower brake arms 81b and 82b are turned in the downward outward direction. As a result, the brake shoes are released from the engagement with the side surfaces of the first brake rail 31, allowing a user to keep pushing up the operation handle section 25 and freely move the support frame section 23 upward.

Figure 22:
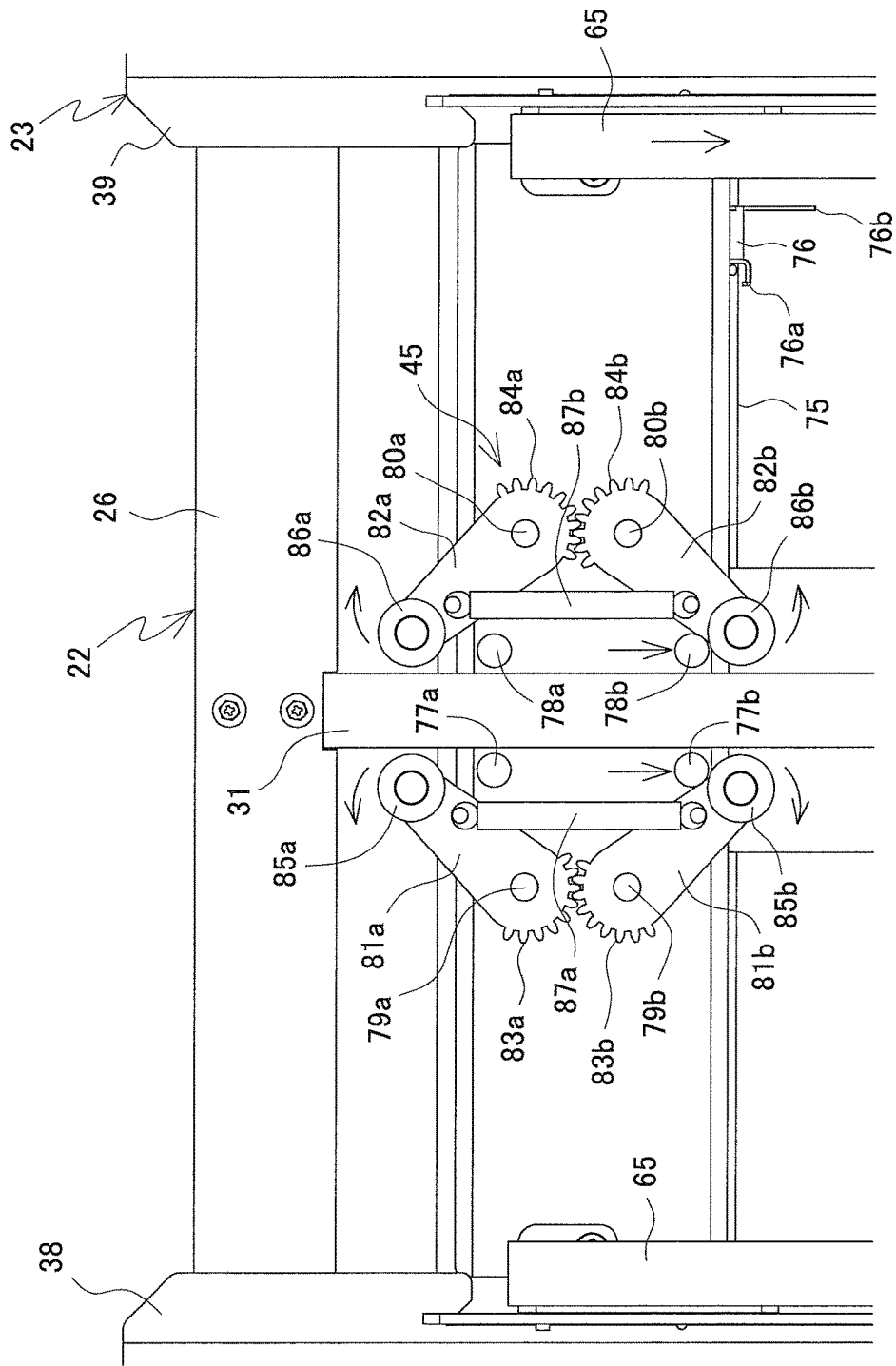
FIG. 22 is a front view showing a moving-down release operation of a brake mechanism of FIG. 19.

When the operation handle section 25 is pulled down to move the transmission plate 71 to the lower release position shown in FIG. 22, the lower transmission pins 77b and 78b come in contact with side edges of the lower brake arms 81b and 82b, thereby turning the lower brake arms 81b and 82b in a downward outward direction against the biasing forces of the extension springs 87a and 87b. In response, the upper brake arms 81a and 82a are turned in an upward outward direction. As a result, the brake shoes are released from the engagement with the side surfaces of the first brake rail 31, allowing a user to continue pushing down the operation handle section 25 and freely move the support frame section 23 downward.

Figure 23:
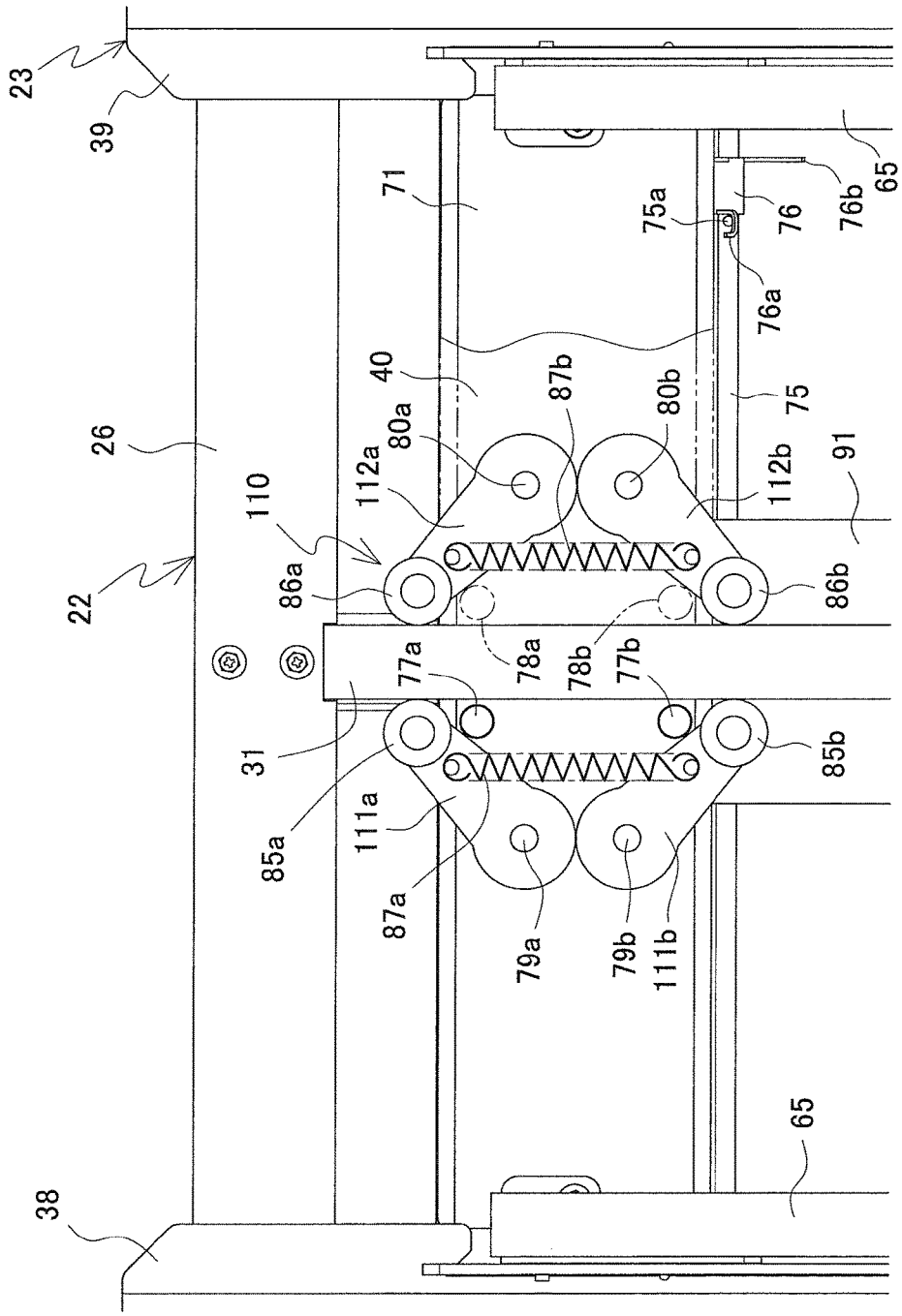
FIG. 23 is a front view showing a modified example of a brake mechanism of FIG. 19.

FIG. 23 shows a brake device 110 as a modified example of the brake device 45 of the first embodiment of FIG. 19. Incidentally, in the description below and accompanying drawings pertaining to the brake device 110, the same components as those of the brake device 45 of FIG. 19 are represented by the same reference symbols.

The brake device 110 is different from the brake device 45 of FIG. 19 in that, on the outer peripheries of the base end portions of brake arms 111a, 111b, 112a, and 112b, gear sections are not provided. The brake arms 111a and 111b and 112a and 112b that are paired in the up-down direction are able to rotate independently.

In FIG. 23, brake shoes 85a, 85b, 86a, and 86b of the tips of the brake arms 111a, 111b, 112a, and 112b are pressed against the side surfaces of the first brake rail 31 by the biasing forces of the extension springs 87a and 87b. As a result, the support frame section 23 remains in a braking state and stationary at a desired height position.

FIG. 24 shows the situation where the transmission plate 71 is moved to the upward release position shown in the diagram as the operation handle section 25 is lifted up. As in the case of the brake device 45 of FIG. 19, the upper transmission pins 77a and 78a come in contact with side edges of the upper brake arms 111a and 112a, thereby turning the upper brake arms 111a and 112a in an upward outward direction against the biasing forces of the extension springs 87a and 87b. At this time, due to the biasing forces of the extension springs 87a and 87b, the brake shoes 85b and 86b of the lower brake arms 111b and 112b remain pressed against the side surfaces of the first brake rail 31.

As a result, in the brake device 110, only the braking forces of the upper brake arms 111a and 112a are released, while there still remain the braking forces of the lower brake arms 111b and 112b. As described above in relation to the brake device 45 of FIG. 19, the lower brake arms are disposed obliquely in such a way that the support shafts 79b and 80b are positioned above the contact points of the brake shoes 85b and 86b with the side surfaces of the first brake rail 31. That is, the lower brake arms are provided in such a way as to extend downward and obliquely from the support shafts 79b and 80b toward the side surfaces of the first brake rail 31. Therefore, the lower brake arms exert a larger braking force in the upward direction than in the downward direction, or exert a larger braking force for the downward movement than for the upward movement.

Therefore, when the operation handle section 25 is lifted up, the frictional resistance applied from the lower brake shoes 85b and 86b is relatively small, thereby requiring a larger operation force than in the brake device 45 of FIG. 19. However, the support frame section 23 can be similarly moved upward. On the other hand, a relatively large braking force occurs in the downward direction. Therefore, this configuration effectively prevents the support frame section 23 from unexpectedly going down due to an external force or the like, contributing to improving the safety.

FIG. 25 shows the situation where the transmission plate 71 is moved to the downward release position shown in the diagram as the operation handle section 25 is pulled down. As in the case of the brake device 45 of FIG. 19, the lower transmission pins 77b and 78b come in contact with side edges of the lower brake arms 111b and 112b, thereby turning the lower brake arms 111b and 112b in a downward outward direction against the biasing forces of the extension springs 87a and 87b. At this time, due to the biasing forces of the extension springs 87a and 87b, the brake shoes 85a and 86a of the upper brake arms 111a and 112a remain pressed against the side surfaces of the first brake rail 31.

As a result, in the brake device 110, only the braking forces of the lower brake arms 111b and 112b are released, while there still remain the braking forces of the upper brake arms 111a and 112a. The upper brake arms are disposed obliquely in such a way that the support shafts 79a and 80a are positioned below the contact points of the brake shoes 85a and 86a with the side surfaces of the first brake rail 31. That is, the upper brake arms are provided in such a way as to extend upward and obliquely from the support shafts 79a and 80a toward the side surfaces of the first brake rail 31. Therefore, the upper brake arms exert a larger braking force in the downward direction than in the upward direction, or exert a larger braking force for the upward movement than for the downward movement.

Therefore, when the operation handle section 25 is pulled down, the frictional resistance applied from the upper brake shoes 85a and 86a is relatively small, thereby requiring a larger operation force than in the brake device 45 of FIG. 19. However, the support frame section 23 can be similarly moved downward. On the other hand, a relatively large braking force occurs in the upward direction. Therefore, this configuration effectively prevents the support frame section 23 from unexpectedly going up due to an external force or the like, contributing to improving the safety.

The description of the brake arms of the present embodiment that have directional properties in the braking forces will be supplemented with FIG. 26. FIG. 26 shows the braking action of a pair of one-side brake arms 81a and 81b of the brake device 45 of FIG. 19, using an example in which the support frame section 23 is moved upward. For ease of explanation, each of the brake arms 81a and 81b will be schematically described as one straight line, and suppose that the end portions Ta and Tb of the extension spring 87a are attached to points on straight lines extending from contact points Qa and Qb of the brake shoes 85a and 85b with the side surface of the first brake rail 31 to the support shafts 79a and 79b of the brake arms.

Figure 26A:
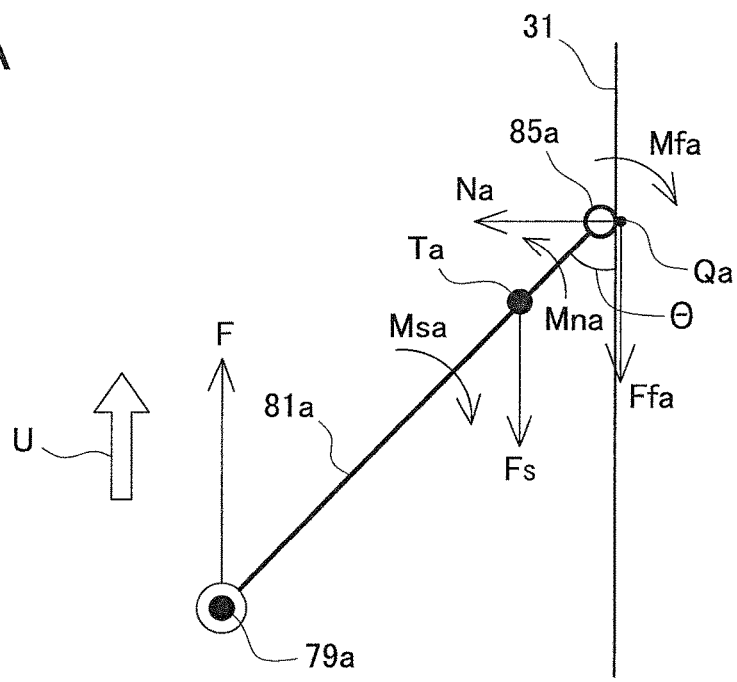
FIGS. 26A and 26B are schematic diagrams illustrating the concept of a braking action of a brake device of a present embodiment.

As shown in FIG. 26A, the upper brake arm 81a is disposed and tilted at angle θ to the side surface of the first brake rail in such a way that the fulcrum or support shaft 79a is positioned below the contact point Qa with the side surface of the first brake rail 31, or is positioned on the side opposite to the movement direction U of the support frame section 23. To the brake arm 81a, the biasing force Fs of the extension spring 87a is constantly applied in the vertically downward direction.

When the support frame section 23 is being moved upward, an upward external force F acts on the support shaft 79a of the brake arm 81a. Right before the brake shoe 85a starts to slide on the side surface of the first brake rail 31 due to the external force F, a maximum static frictional force Ffa is acting in the downward direction between the brake shoe and the side surface of the first brake rail 31 against the external force F. The reaction force that is applied to the brake shoe from the side surface of the first brake rail 31 in the normal direction is represented by Na.

At this time, moments around the support shaft 79a are being balanced as follows:

$$Mfa + Msa - Mna = 0$$

Here, if the distance from the support shaft 79a to the contact point Qa is represented by d1, and the distance to the end portion Ta of the extension spring is represented by d2, the following equations are obtained:

$$Msa = Fs \cdot \sin\theta \times d2$$

$$Mfa = Fsa \cdot \sin\theta \times d1$$

$$Mna = Na \cdot \cos\theta \times d1$$

Figure 26B:
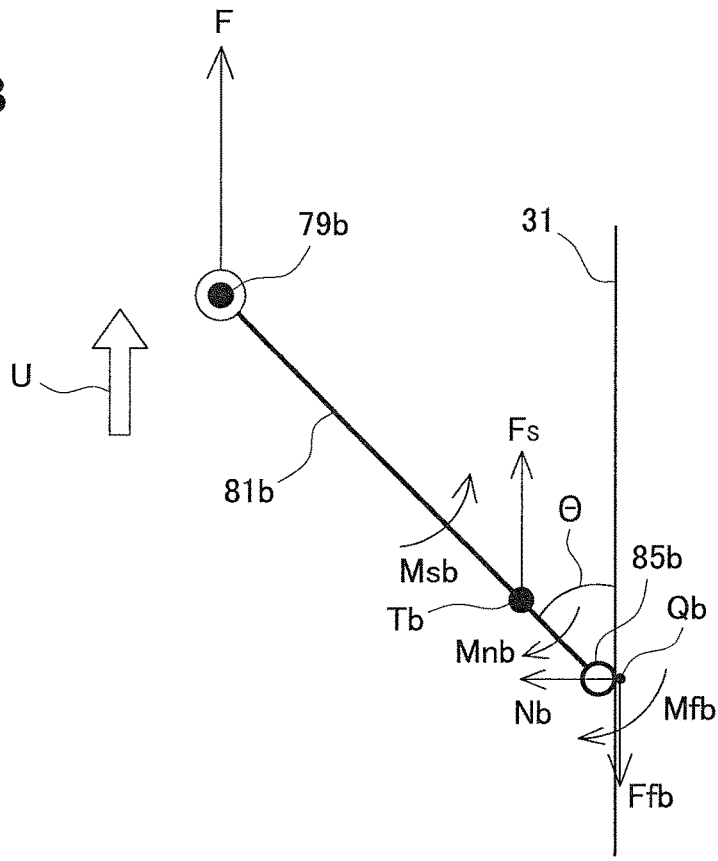

As shown in FIG. 26B, the lower brake arm 81b is disposed and tilted at angle θ to the side surface of the first brake rail in such a way that the fulcrum or support shaft 79b is positioned above the contact point Qb with the side surface of the first brake rail 31, or is positioned on the same side as the movement direction U of the support frame section 23. To the brake arm 81b, the biasing force Fs of the extension spring 87a is constantly applied in the vertically upward direction.

When the support frame section 23 is being moved upward, an upward external force F acts on the support shaft 79b of the brake arm Bib. Right before the brake shoe 85b starts to slide on the side surface of the first brake rail 31 due to the external force F, a maximum static frictional force Ffb is acting in the downward direction between the brake shoe and the side surface of the first brake rail 31 against the external force F. The reaction force that is applied to the brake shoe from the side surface of the first brake rail 31 in the normal direction is represented by Nb.

At this time, moments around the support shaft 79b are being balanced as follows:

$$Mfb - Msb + Mnb = 0$$

Here, similarly, if the distance from the support shaft 79b to the contact point Qb is represented by d1, and the distance to the end portion Tb of the extension spring is represented by d2, the following equations are obtained:

$$Msb = Fs \cdot \sin\theta \times d2$$

$$Mfb = Fsb \cdot \sin\theta \times d1$$

$$Mnb = Nb \cdot \cos\theta \times d1$$

The magnitude of the moments Mna and Mnb associated with the reaction forces Na and Nb that are applied to the brake shoes 85a and 85b from the side surface of the first brake rail 31 are: Mna=Msa+Mfa and Mnb=Msb−Mfb. Since Msa=Msb, Mna>Mnb. If the static friction coefficient between the brake shoes and the side surface of the first brake rail is represented by μ, Na=μ·Fsa and Nb=μ·Fsb. Accordingly, Fsa>Fsb. In this manner, if the support shafts 79a and 79b of the brake arms 81a and 81b are disposed in such a way as to be tilted to one side with respect to the contact points of the brake arms with the side surface of the first brake rail 31, a larger braking force is generated toward the tilted side than the opposite side.

The support frame section 23 can be lifted up or down with a relatively small force. If a user operates the operation handle section 25 with a strong force by accident, the operation handle section 25 might move so fast that the operation handle section 25 cannot be stopped at a desired position, or that a sufficient deceleration cushioning effect cannot be achieved even by the cushioning mechanism. To solve this problem, the article support device 20 of the present embodiment further includes a speed limiter mechanism to curb or limit the movement speed of the support frame section 23.

Figure 27:
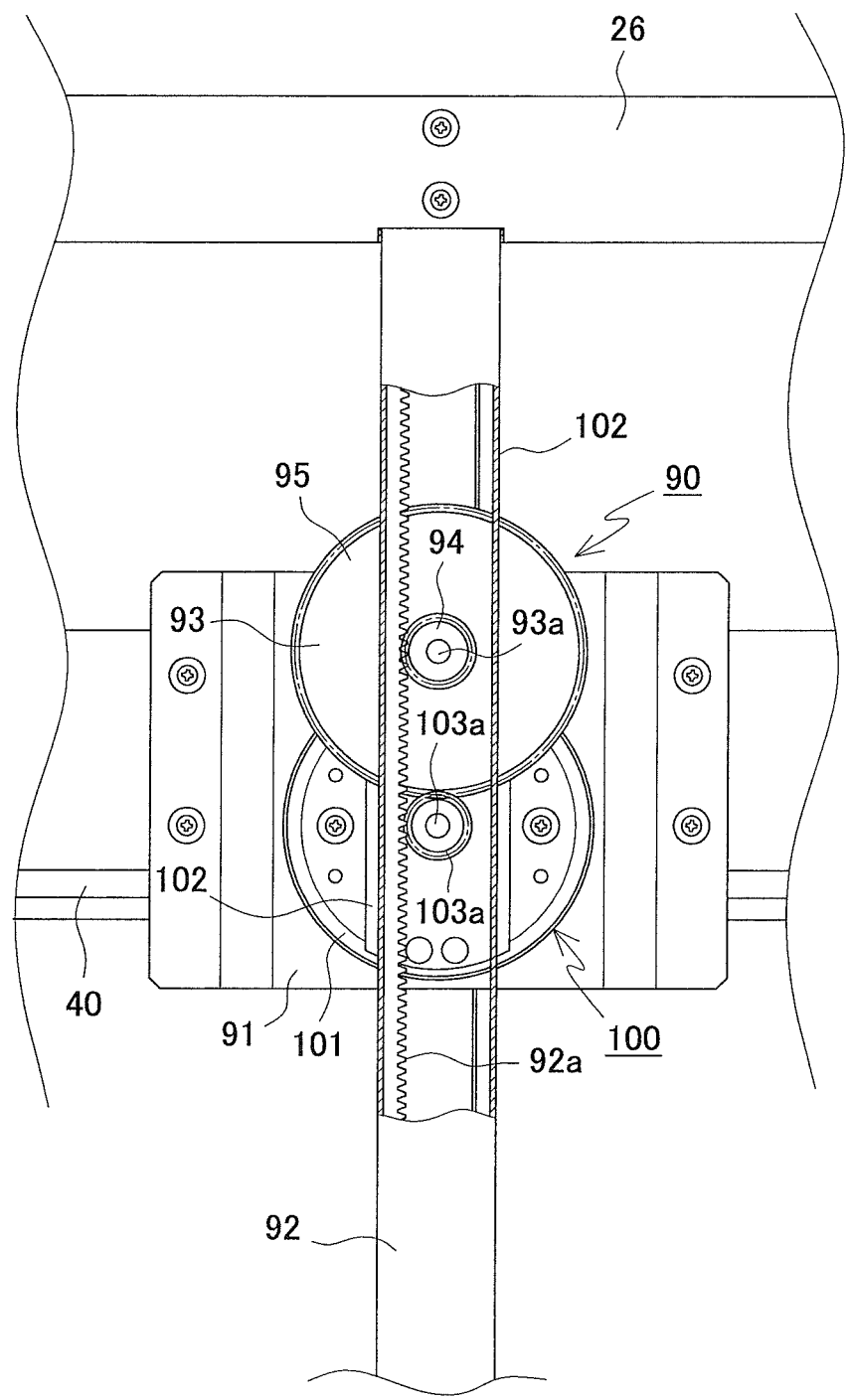
FIG. 27 is a partially crushed enlarged view of a speed limiter mechanism as seen from a back side of an article support device.

As shown in FIG. 27, a speed limiter mechanism 90 of the present embodiment includes a centrifugal brake device 100, which is provided in the support frame section 23; and a second brake rail 92, which is provided in the fixed frame section 22. The second brake rail 92 is disposed on the rear side of the first brake rail 31 of the fixed frame section, and extends vertically downward from the center of the upper frame 26, and is long enough to sufficiently cover the up-down stroke of the support frame section. The second brake rail 92 is U-shaped in cross-section in such a way as to be open to the front side. On one internal surface thereof, a rack 92a, which extends in the vertical direction, is formed integrally.

The centrifugal brake device 100 is disposed between a center plate 91, which is fixed to the center of the back surface of the upper frame 40 of the support frame section 23, and the second brake rail 92. The centrifugal brake device 100 includes a circular frame 101, which is fixed to the back surface of the center plate 91; and a rotation plate 102, which is supported within the circular frame in such a way as to freely rotate around a center shaft 103a thereof. The rotation plate 102 includes a pair of parallel long sides and a pair of arc-shaped short sides. At the center thereof, a small gear 103 is provided integrally and concentrically with the center shaft 103a of the circular frame.

Figure 28:
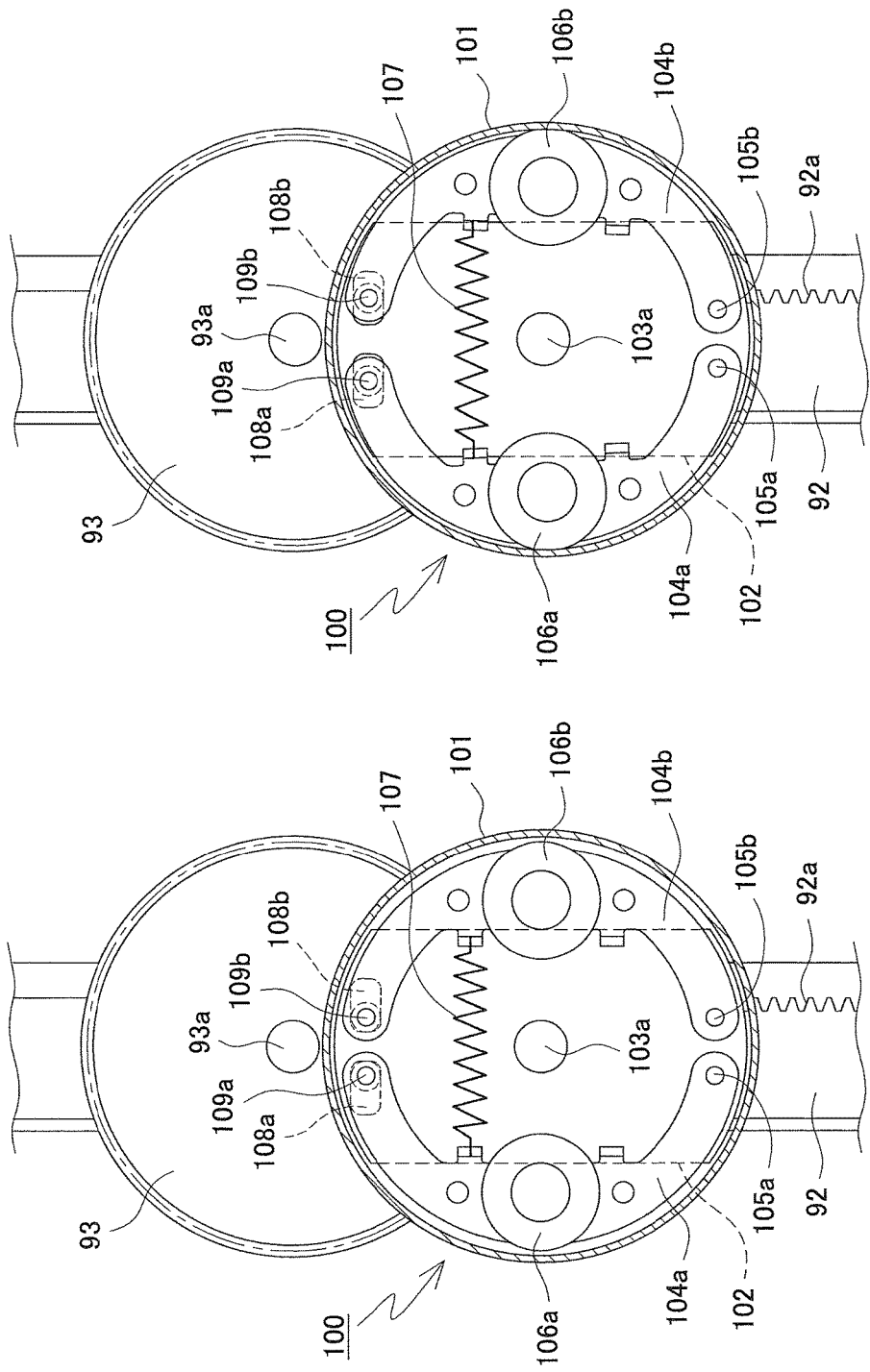
FIGS. 28A and 28B are partially crushed enlarged front views of a centrifugal brake mechanism when the mechanism is not operated and is operated.

As shown in FIG. 28A, on one of the short sides of the rotation plate 102, a pair of brake arms 104a and 104b is attached; at base end portions of the brake arms 104a and 104b, the brake arms 104a and 104b can swing around support shafts 105a and 105b, and are mounted symmetrically in the left-right direction with respect to the longitudinal direction of the rotation plate. The brake arms 104a and 104b each have a semicircular arc shape, and are bent in such a way as to extend along the inner peripheral surface of the circular frame 101. An extension spring 107, which is provided between the brake arms 104a and 104b, presses the brake arms 104a and 104b toward each other. Pins 109a and 109b are provided at free ends of the brake arms 104a and 104b in such a way as to protrude; the pins 109a and 109b are inserted into long holes 108a and 108b, which are formed in the rotation plate 102. The long holes 108a and 108b limit the swingable range.

On the brake arms 104a and 104b, brake shoes 106a and 106b are mounted in such a way that at least portions of the brake shoes 106a and 106b protrude from the outer peripheral edges of the brake arms toward the inner peripheral surface of the circular frame 101. The brake shoes 106a and 106b are disposed in such a way as to be not in contact with the inner peripheral surface of the circular frame 101 as shown in FIG. 28A at a time when the centrifugal brake device 100 is not working, or to be engaged with the inner peripheral surface of the circular frame as shown in FIG. 28B at a time when the centrifugal brake device is working.

As shown in FIG. 27, between the centrifugal brake device 100 and the second brake rail 92, a gear member 93 is provided in such a way as to freely rotate around a central shaft 93b, which is fixed to the center plate 91. The gear member 93 includes a pinion 94, which is a small gear provided concentrically with the central shaft 93b, and a large gear 95, which is provided along the outer periphery. The gear member 93 is mounted in such a way that the pinion 94 meshes with the rack 92a of the second brake rail 92, and that the large gear 95 meshes with the small gear 103 of the rotation plate 102.

As the support frame section 23 is moved up or down, the gear member 93 is rotated by the rack 92a and the pinion 94. As a result, the rotation plate 102 starts to rotate at high speeds depending on the gear ratio of the large gear 95 and the small gear 103. The rotation speed of the rotation plate 102 increases or decreases depending on the speed at which the support frame section 23 is moved up or down.

When the support frame section 23 is stationary or is moving at a very slow speed, the brake arms 104a and 104b of the centrifugal brake device 100 do not swing at all from the position shown in FIG. 28A due to the biasing force of the extension spring 107. Therefore, the brake shoes do not come in contact with the inner peripheral surface of the circular frame 101. As a result, the support frame section 23 can continue to move at slow speed.

As the movement speed of the support frame section 23 becomes faster, the brake arms 104a and 104b start to move away against the biasing force of the extension spring 107. When the movement speed of the support frame section is relatively low, and when the swinging of the brake arms is small, the brake shoes similarly do not come in contact with the inner peripheral surface of the circular frame 101. Therefore, the support frame section 23 can continue to move.

After the movement speed of the support frame section 23 exceeds a certain level, the brake arms are significantly separated against the biasing force of the extension spring 107, and the brake shoes are coming in contact with the inner peripheral surface of the circular frame as shown in FIG. 28B. Therefore, the movement of the support frame section 23 is slowed down depending on the magnitude of friction between the brake shoes and the inner peripheral surface of the circular frame. After the movement of the support frame section 23 is decelerated to a certain degree, the brake arms start to come close to each other due to the extension spring 107, and the brake shoes are released from their contact with the inner peripheral surface of the circular frame. Therefore, the support frame section 23 can smoothly move at the decelerated speed.

As the movement speed of the support frame section 23 becomes even faster, the brake arms are separated to a maximum extent against the biasing force of the extension spring 107, and the brake shoes are therefore strongly pressed against the inner peripheral surface of the circular frame. As a result, the support frame section 23 is significantly decelerated and can be stopped in some cases. After the movement of the support frame section 23 is decelerated to a certain degree or stopped, the brake arms similarly start to come close to each other due to the extension spring 107, and the brake shoes are released from their contact with the inner peripheral surface of the circular frame. As a result, the support frame section 23 can smoothly move at the decelerated speed, or can move again.

In that manner, according to the present embodiment, the above speed limiter mechanism 90 curbs or limits the movement speed of the support frame section 23, thereby eliminating in advance the risk of being unable to control the moving or stopping of the support frame section through a user's careless or accidental operation. Therefore, especially in the case where a heavy object such as a large television monitor is supported, this configuration further improves safety.

Figure 29:
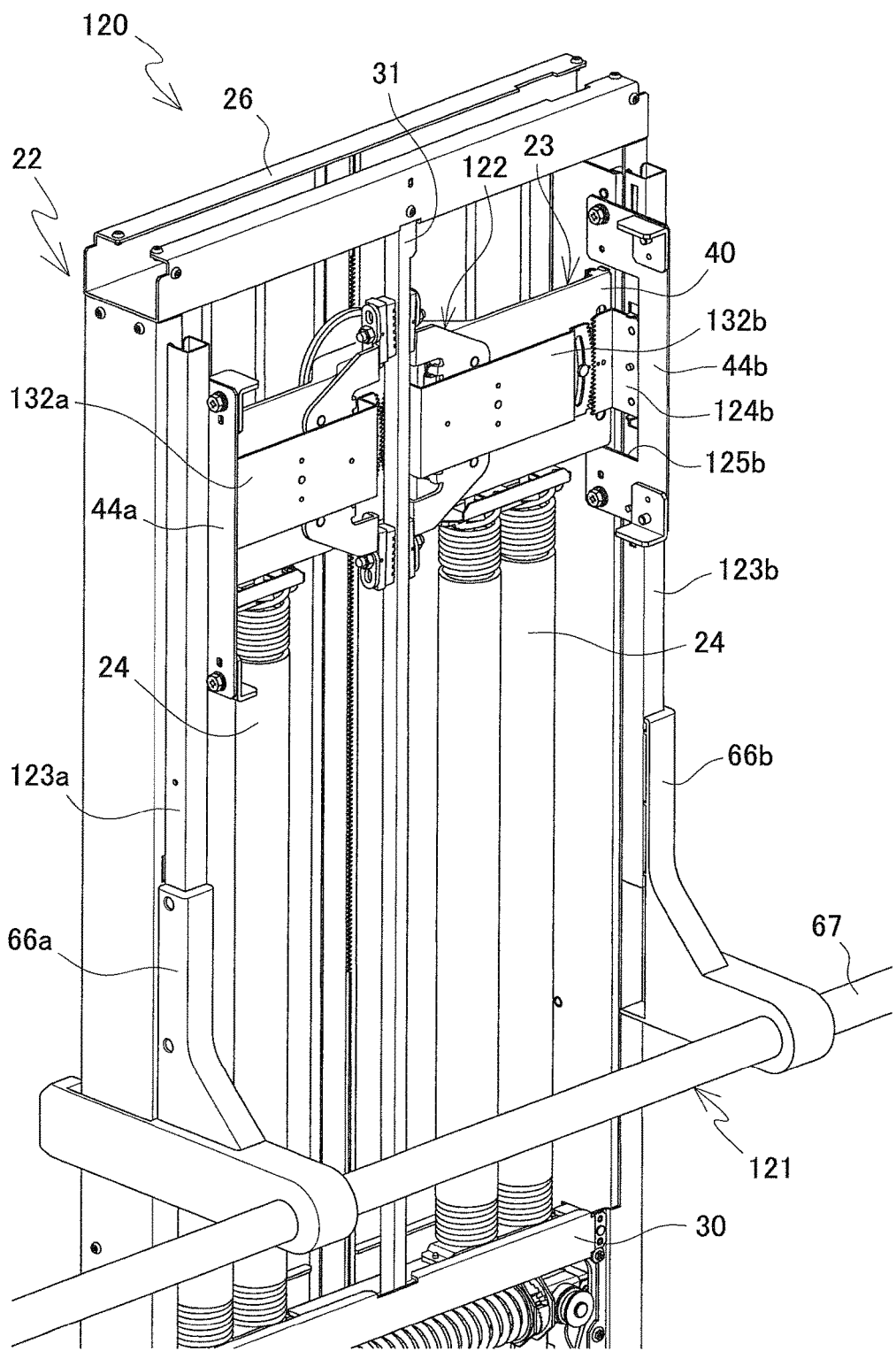
FIG. 29 is a perspective view of an upper half of a second embodiment of an article support device to which the present invention is applied.

FIG. 29 shows a second embodiment of an article support device to which the present invention has been applied. In the article support device 120 of the present embodiment, a brake mechanism and an operation handle section are different from those of the article support device 20 of the first embodiment. The rest of the configuration is substantially identical to that of the article support device 20 of the first embodiment, and therefore will not be detailed. Incidentally, in the description below and accompanying drawings pertaining to the article support device 120, the same components as those of the brake device 45 of FIG. 19 are represented by the same reference symbols.

As in the case of the article support device 20 of the first embodiment, in order to support an article such as a large-screen television monitor, the article support device 120 includes a base, which is placed on a floor surface or the like; a fixed frame section 22, which is fixed to the base; a support frame section 23, which is mounted on the fixed frame section in such a way as to be able to move up and down; a first sprint 24; and an operation handle section 121, which is used to move up or down the support frame section 23.

The fixed frame section 22 is a roughly rectangular frame structure, including upper and lower frames 26 and 27, which extend horizontally, and left and right side frames 28 and 29, which extend vertically between the upper frame and the lower frame. Furthermore, at the center of the fixed frame section 22, a first brake rail 31 is provided in such away as to extend vertically between the upper frame and an intermediate frame 30, which extends horizontally between the left and right side frames 28 and 29 and is substantially located at a mid-height position.

The support frame section 23 is a roughly rectangular frame structure, including left and right guide frames 38 and 39, which extend vertically, an upper frame 40, which extends horizontally between the two guide frames, and two lower frames 41 and 42, which are slightly separated in the up-down direction. The support frame section 23 is mounted on the fixed frame section 22 in such a way as to be able to move up and down along the guide rails, as the left and right guide frames 38 and 39 are fitted into the guide rails of the corresponding left and right side frames 28 and 29 of the fixed frame section in a slidable manner.

On the support frame section 23, a pair of left and right mounting stays 44a and 44b are provided in such a way as to extend vertically just ahead of the guide frames; the mounting stays 44a and 44b are used to fix the article. Furthermore, in the support frame section 23, at the center of the upper frame 40, a brake device 122 is provided.

A brake mechanism of the present embodiment includes the brake device 122 and the first brake rail 31 of the fixed frame section 22. In the brake device 122, the operation handle section 121 causes brake pads 145 and 146 to engage with the first brake rail 31 or be released from the engagement.

The operation handle section 121 includes left and right vertical transmission rods 123a and 123b, which are mounted on the front sides of the left and right guide frames 38 and 39 of the support frame section 23 and on the outer sides of the mounting stays 44a and 44b in such a way as to be adjacent to those components. To a lower portion of each transmission rod, an almost L-shaped connection stay 66a or 66b is joined. Tip end portions of the two connection stays that protrude forward hold a handle lever 67, which is long and extends in the left-right direction. The handle lever 67 is grabbed by hands to operate the operation handle section 122 and thereby lift up or down the support frame section 23 and the article.

Figure 30:
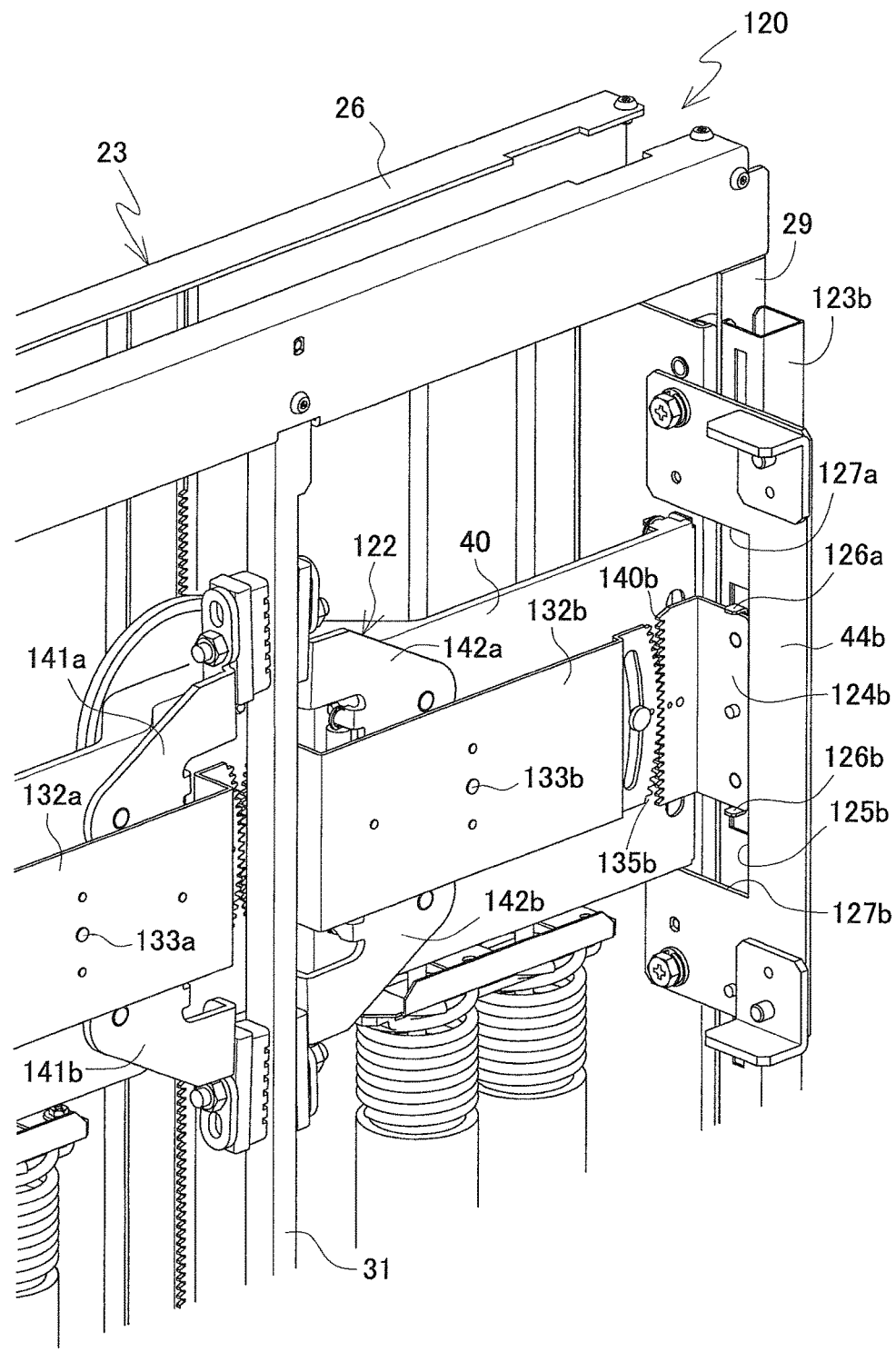
FIG. 30 is a partially enlarged perspective view showing a brake mechanism of a second embodiment from a front side.

As shown in FIG. 30, to the upper inner portions of the transmission rods 123a and 123b, connection members 124a and 124b are fixed. The connection members 124a and 124b are L-shaped in the up-down-direction cross-section and have a certain length in the up-down direction. The mounting stays 44a and 44b are U-shaped, and guide holes 125a and 125b are defined inside in such a way as to extend in the up-down direction.

The transmission rods 123a and 123b are provided in such a way as to be able to move up and down relatively along the front surfaces of the left and right guide frames 38 and 39 and the outer surfaces of the mounting stays 44a and 44b, as the connection members 124a and 124b are inserted into the guide holes 125a and 125b from outside the mounting stays 44a and 44b. At the upper and lower ends of the connection members 124a and 124b, stopper pieces 126a and 126b are provided. At the upper and lower ends of the guide holes, engagement portions 127a and 127b are provided.

The connection members 124a and 124b can move up and down in a range in which the stopper pieces 126a and 126b can be stopped by engaging with the engagement portions 127a and 127b, as guided by the guide holes 125a and 125b. The range in which the connection members can move up and down inside the guide holes determines a vertical-distance range in which the transmission rods 123a and 123b can move relative to the support frame section 23.

Figure 31:
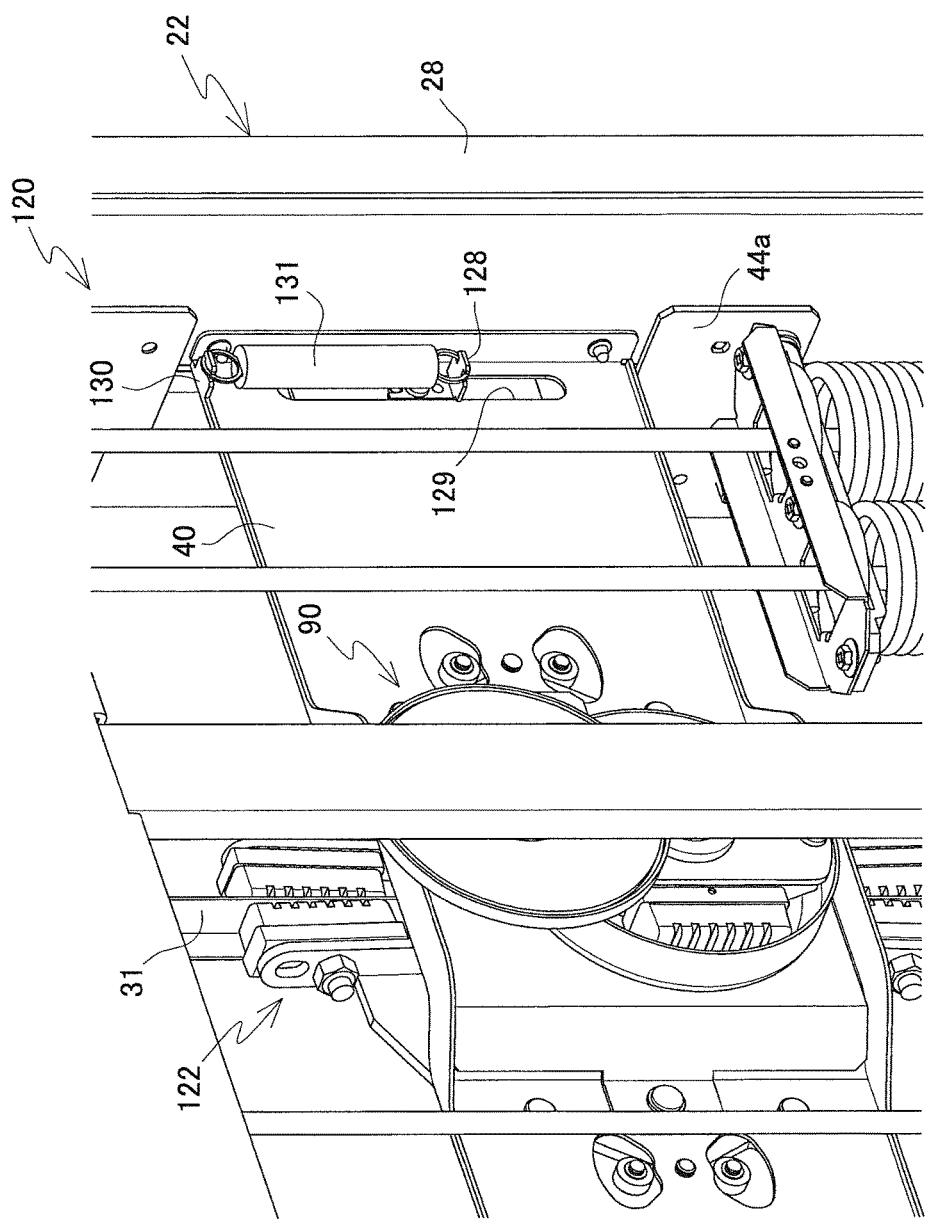
FIG. 31 is a partially enlarged perspective view showing a brake mechanism of FIG. 30 from a back side.

As shown in FIG. 31, behind the connection member 124b (124a), a hook piece 128 is provided in such a way as to extend backward. On the upper frame 40 of the support frame section 23, an opening section 129 is provided right behind the connection member 124b (124a) in such a way as to pass through and extend in the up-down direction. Right above the opening section 129 and in the end portion of the upper frame 40, a hook piece 130 is similarly provided in such a way as to extend backward. Between the hook piece 128 of the connection member 124b (124a) and the hook piece 130 of the upper frame 40, an extension coil spring 131 is hooked up. The extension coil spring 131 is constantly lifting up the transmission rods 123a and 123b via the connection members.

Figure 32:
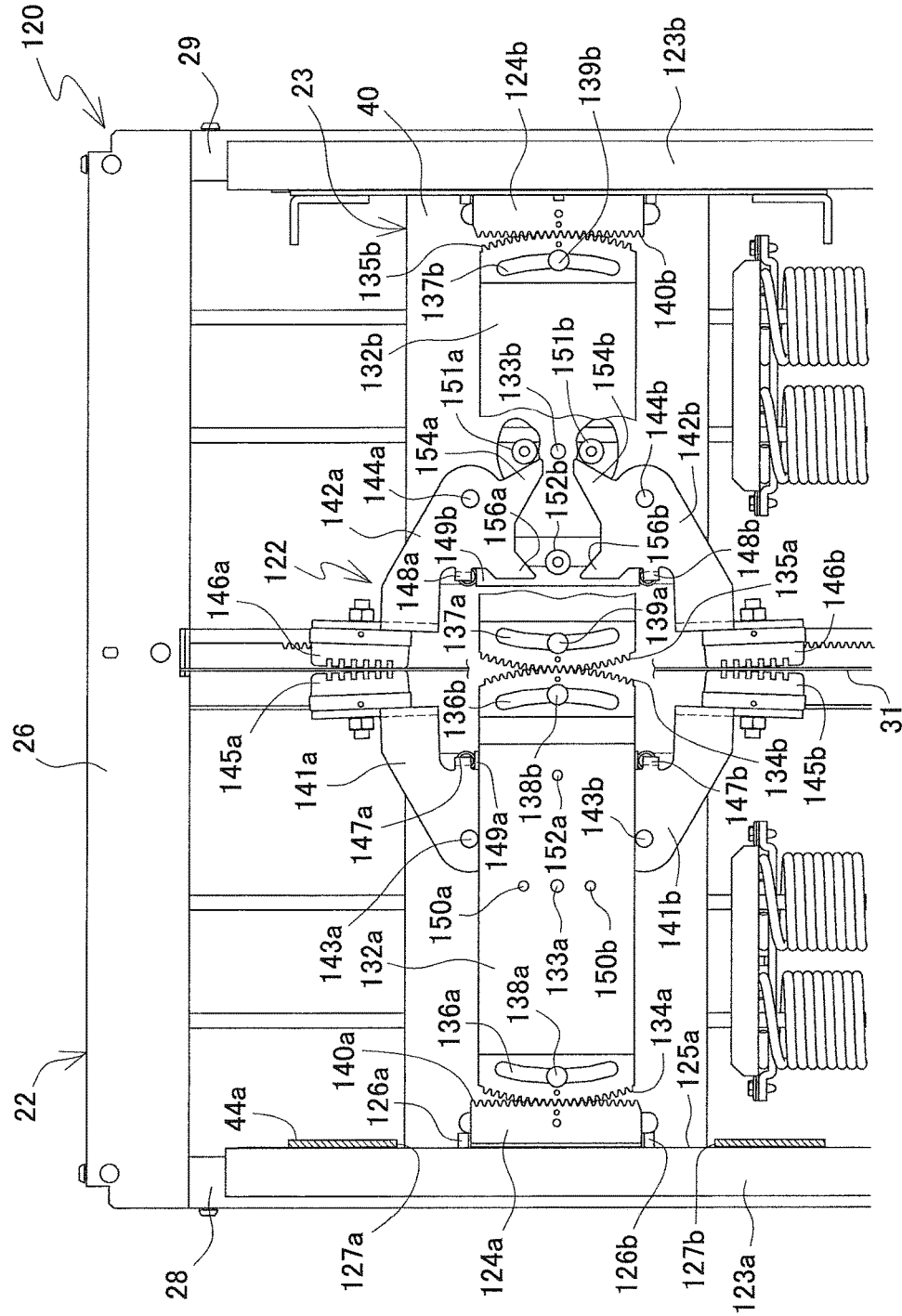
FIG. 32 is a front view showing a braking state of a brake mechanism of FIG. 30.

As shown in FIG. 32, between the left and right connection members 124a and 124b, a pair of left and right connection plates 132a and 132b is provided. The connection plates 132a and 132b each has a long plate-like shape in the left-right direction as a whole. The centers of the connection plates 132a and 132b are attached through pivot shafts 133a and 133b, which are provided on the front surface of the upper frame 40 of the support frame section 23 in such a way as to protrude; the connection plates 132*a* and 132*b* therefore can freely rotate along the plane of the upper frame 40.

The left and right end portions of the connection plates 132*a* and 132*b* are bent backward in such a way as to have a crank shape. At the edges of the connection plates 132*a* and 132*b*, gear sections 134*a*, 134*b*, 135*a*, and 135*b* are formed. In the left and right end portions of the connection plates 132*a* and 132*b*, arc-shaped guide grooves 136*a*, 136*b*, 137*a*, and 137*b* are provided close to the inner sides of the gear sections in such a way as to pass therethrough. Into the guide grooves 136*a*, 136*b*, 137*a*, and 137*b*, guide pins 138*a*, 138*b*, 139*a*, and 139*b*, which are provided on the front surface of the upper frame 40 of the support frame section 23 in such a way as to protrude, are inserted. Accordingly, the connection plates 132*a* and 132*b* can rotate around the pivot shafts 133*a* and 133*b* in both directions within a range in which the guide pins remain engaged between the two ends of the guide grooves.

On the up-down direction inner edges of the connection members 124*a* and 124*b*, rack sections 140*a* and 140*b* are formed. The connection plates are disposed in such a way that the inner-side gear sections 134*b* and 135*b* mesh with one another, and that the outer-side gear sections 134*a* and 135*a* mesh with the rack sections 140*a* and 140*b* of the corresponding connection members 124*a* and 124*b*. In this manner, the left and right transmission rods 123*a* and 123*b* of the operation handle section 121 are connected to each other through a gear train made up of the rack sections 140*a* and 140*b* and the gear sections 134*a*, 134*b*, 135*a*, and 135*b*.

Figure 33:
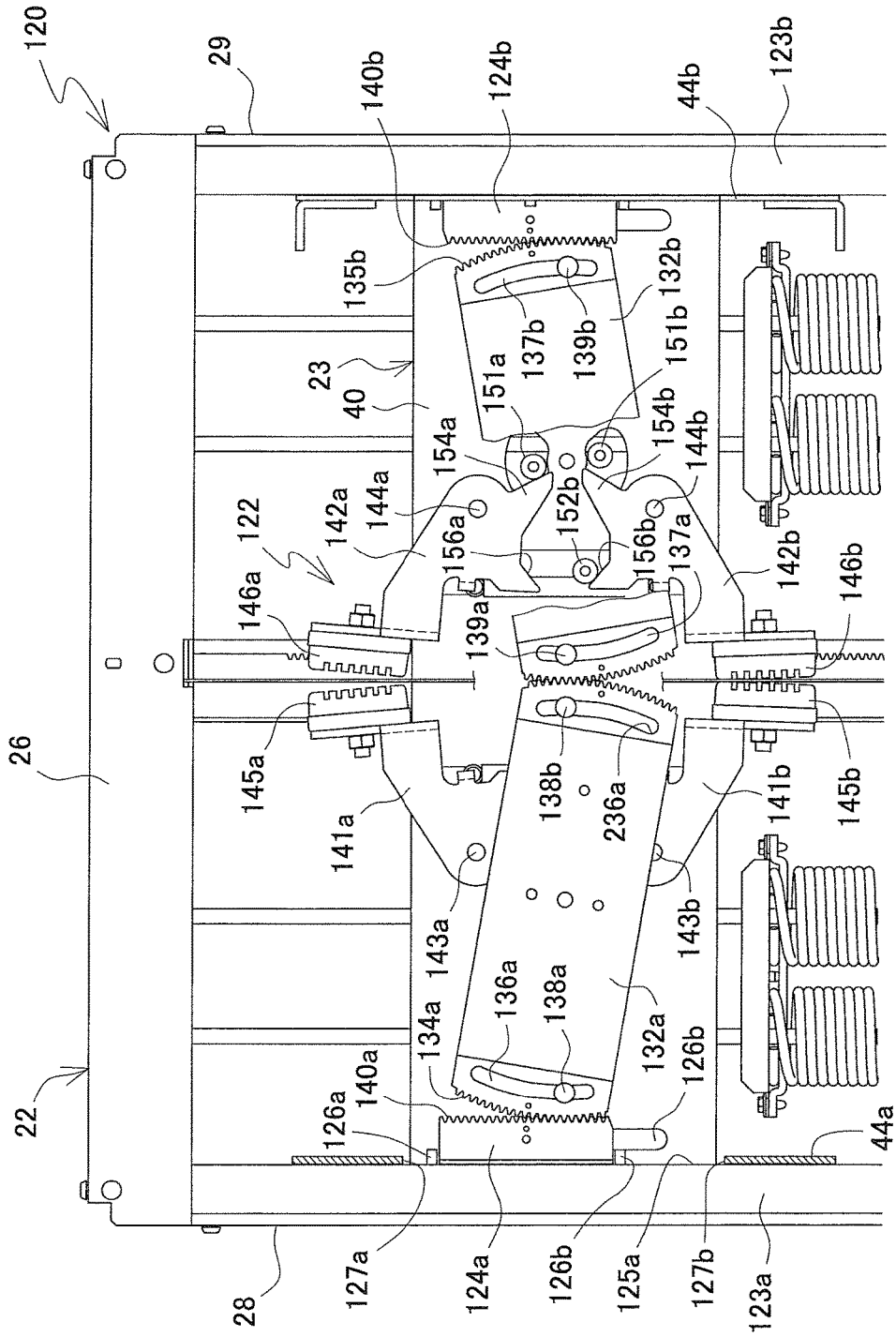
FIG. 33 is a front view showing a situation where only an upper side of a brake mechanism of FIG. 30 is released.

For example, when one transmission rode 123*a* is moved upward relative to the guide frame 38 of the support frame section 23, as shown in FIG. 33, the upward movement of the connection member 124*a* causes the connection plate 132*a* to turn clockwise through the rack section 140*a* and the gear section 134*a*. In response, the other connection plate 132*b* turns counterclockwise, causing the other transmission rod 123*b* to move upward in synchronization with the one transmission rod 123*a* through the gear section 135*a* and the rack section 140*b*.

As shown in FIG. 30, the brake device 122 includes brake arms 141*a*, 141*b*, 142*a*, and 142*b* that are paired in the up-down direction between the upper frame 40 of the support frame section 23 and the connection plates 132*a* and 132*b*; the brake arms 141*a*, 141*b*, 142*a*, and 142*b* are disposed on both sides of the first brake rail 31 in such a way as to be symmetrical in the left-right direction. At the base end portions of the brake arms 141*a*, 141*b*, 142*a*, and 142*b*, the brake arms 141*a*, 141*b*, 142*a*, and 142*b* are pivotally attached via support shafts 143*a*, 143*b*, 144*a*, and 144*b*, which protrude from the front surface of the upper frame 40, in such a way as to freely rotate along the plane of the upper frame 40.

To the tips of the brake arms, brake pads 145*a*, 145*b*, 146*a*, and 146*b* are attached. In the braking state of FIG. 32, the entire pressing surfaces of the upper brake pads 145*a* and 146*a* are engaged with the side surfaces of the first brake rail 31. The upper brake pads 145*a* and 146*a* are mounted obliquely, so that, as the braking action is gradually released, the gaps between the upper brake pads 145*a* and 146*a* and the side surfaces of the first brake rail gradually grow from the upper side. Similarly, in the braking state of FIG. 32, the entire pressing surfaces of the lower brake pads 145*b* and 146*b* are engaged with the side surfaces of the first brake rail 31. The lower brake pads 145*b* and 146*b* are mounted obliquely, so that, as the braking action is gradually released, the gaps between the lower brake pads 145*b* and 146*b* and the side surfaces of the first brake rail gradually grow from the lower side.

In general, along the displacement direction thereof, the rear end side of a brake pad exerts a larger braking force than the tip side. When the brake pads are disposed obliquely as described above, the upper brake pads 145*a* and 146*a* generate a large upward braking force for the engagement surface of the first brake rail 31, while the lower brake pads 145*b* and 146*b* generate a large downward braking force.

On the inner peripheral portions of the brake arms 141*a*, 141*b*, 142*a*, and 142*b* that are paired in the up-down direction, hook pieces 147*a*, 147*b*, 148*a*, and 148*b* are formed; between the hook pieces 147*a* and 147*b* and 148*a* and 148*b*, extension springs 149*a* and 149*b* are hooked up. Therefore, the brake arms that are paired in the up-down direction are pressed toward each other. That is, the brake pads are pressed against the side surfaces of the first brake rail 31. The spring strength of the extension springs 149*a* and 149*b* is set in such a way as to generate frictional resistance strong enough to make it difficult for the support frame section 23 on which the article is mounted to move from a stationary position, between the brake pads and the side surfaces of the first brake rail 31.

On the back surfaces of the connection plates 132*a* and 132*b*, first transmission pins 150*a*, 150*b*, 151*a*, and 151*b* are provided above and below the pivot shafts 133*a* and 133*b* in such a way as to protrude backward; the first transmission pins 150*a*, 150*b*, 151*a*, and 151*b*, which are paired in the up-down direction, are an equal distance away from the pivot shafts 133*a* and 133*b*. On the back surfaces of the connection plates, between the pivot shafts 133*a* and 133*b* and the first brake rail 31, second transmission pins 152*a* and 152*b* are provided in such a way as to protrude backward and to be symmetrical in the left-right direction.

At the outer peripheries of the base end portions of the brake arms, first engagement projections 154*a* and 154*b* are formed in such a way as to extend toward the side opposite to the brake pads. Furthermore, at the base end portions of the brake arms, second engagement projections 156*a* and 156*b* are formed in a direction that is roughly perpendicular to the first engagement projections. Incidentally, FIGS. 32 to 34 offer a partially crushed view of the connection plate 132*b* to only show the entire brake arms 142*a* and 142*b*, which are shown in the right sections of the diagrams.

In the braking state of FIG. 32, the first engagement projections 154*a* and 154*b* are provided in such a way that the side edges of the first engagement projections 154*a* and 154*b* are in contact with the corresponding first transmission pins 151*a* and 151*b*. After the braking state of FIG. 32, if the connection plate 132*a* shown in the left section of the diagram is rotated clockwise and if the right connection plate 132*b* is rotated counterclockwise, the upper first transmission pins 150*a* and 151*a* push the side edges of the first engagement projections 153*a* and 154*a* of the upper brake arms 141*a* and 142*a*, and the brake arms 141*a* and 142*a* are therefore rotated in the direction that makes the brake pads 145*a* and 146*a* move away from the first brake rail 31. After the braking state of FIG. 32, if the connection plate 132*a* shown in the left section of the diagram is rotated counterclockwise and if the right connection plate 132*b* is rotated clockwise, the lower first transmission pins 150*b* and 151*b* push the side edges of the first engagement projections 153*b* and 154*b* of the lower brake arms 141*b* and 142*b*, and the brake arms 141*b* and 142*b* are therefore rotated in the direction that makes the brake pads 145*b* and 146*b* move away from the first brake rail 31.

In the braking state of FIG. 32, the second engagement projections 155a, 155b, 156a, and 156b are placed an equal distance away from the corresponding second transmission pins 152a and 152b. When the left connection plate 132a is rotated clockwise by a certain angle or more and when the right connection plate 132b is rotated counterclockwise by a certain angle or more, the second transmission pins 152a and 152b come in contact with the side edges of the second engagement projections 155b and 156b of the lower brake arms and press the second engagement projections 155b and 156b, and the brake arms 141b and 142b are therefore rotated in the direction that make the brake pads 145b and 146b move away from the first brake rail 31. When the left connection plate 132a is rotated counterclockwise by a certain angle or more and when the right connection plate 132b is rotated clockwise by a certain angle or more, the second transmission pins 152a and 152b come in contact with the side edges of the second engagement projections 155a and 156a of the upper brake arms and press the second engagement projections 155a and 156a, and the brake arms 141a and 142a are therefore rotated in the direction that make the brake pads 145a and 146a move away from the first brake rail 31.

In the braking state shown in FIG. 32, the brake pads 145a, 145b, 146a, and 146b of the brake arms 141a, 141b, 142a, and 142b are engaged with the side surfaces of the first brake rail 31, thereby braking in such a way as to keep the support frame section 23 from moving from the stationary position. From this state, the handle lever 67 is lifted up to move the transmission rods 123a and 123b upward. Accordingly, as shown in FIG. 33, the connection plate 132a starts to rotate clockwise and the connection plate 132b starts to rotate counterclockwise via the rack sections 140a and 140b and the gear sections 134a and 135a.

Then, the upper first transmission pins 150a and 151a press the side edges of the first engagement projections 153a and 154a of the upper brake arms 141a and 142a, thereby rotating the brake arm 141a counterclockwise and the brake arm 142a clockwise and causing the brake pads 145a and 146a to move away from the first brake rail 31. In this manner, in the brake device 122, the upward braking force is released.

At this time, the lower brake pads 145b and 146b remain engaged with the side surfaces of the first brake rail 31. In this manner, the brake device 122 is keeping a fairly large downward braking force. Therefore, even if the force of lifting up the handle lever 67 is abruptly lost for some reason, the support frame section 23 does not immediately go down from the stationary position, thereby ensuring safety.

In this state, the stopper pieces 126a and 126b of the connection members 124a and 124b stay away from the upper engagement portions 127b of the guide holes 125a and 125b, and therefore can move in the guide holes without being restricted by the guide frames 38 and 39 of the support frame section 23. Therefore, since a load has yet to be applied to the handle lever 67 from the support frame section 23, the handle lever 67 can be lifted up with a relatively small force.

Figure 34:
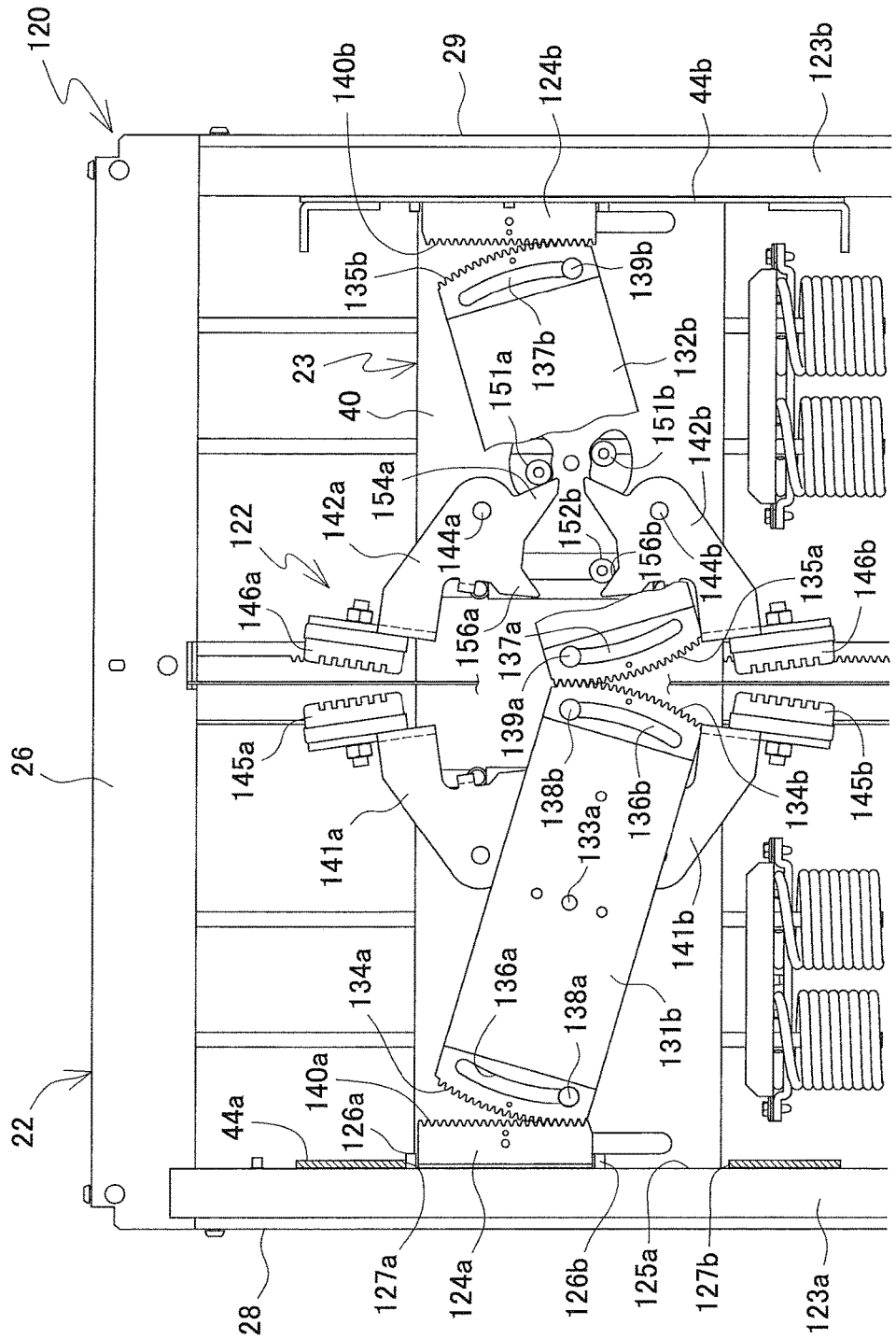
FIG. 34 is a front view showing a full release state of a brake mechanism of FIG. 30.

From this state, the handle lever 67 is further moved up, so that the transmission rods 123a and 123b go upward relative to the guide frames 38 and 39 of the support frame section 23. Then, as shown in FIG. 34, the stopper pieces 126a and 126b of the connection members 124a and 124b come in contact with the upper engagement portions 127a of the guide holes 125a and 125b and are stopped there in an engaged state. After that, the transmission rods 123a and 123b, together with the guide frames 38 and 39, can move the support frame section 23 upward.

At this time, the left connection plate 132a rotates clockwise and the right connection plate 132b rotates counterclockwise, and the second transmission pins 152a and 152b come in contact with the side edges of the second engagement projections 155b and 156b of the lower brake arms and press the side edges. As a result, the brake arm 141b rotates clockwise, and the brake arm 142b rotates counterclockwise, and the brake pads 145b and 146b move away from the first brake rail 31. In this manner, the braking force of the brake device 122 is completely released, allowing a user to continue to lift up the handle lever 67 and freely move the support frame section 23 upward.

In this example, as shown in FIG. 33, slightly before the stopper pieces 126a and 126b of the connection members 124a and 124b come in contact with the upper engagement portions 127a of the guide holes 125a and 125b, the second transmission pins 152a and 152b come in contact with the side edges of the second engagement projections 155b and 156b. Since there is a brief space of time from this state until the braking forces of the lower brake pads 145b and 146b are released, the support frame section 23 can start to move smoothly at a time when the transmission rods 123a and 123b begin to move together with the guide frames 38 and 39.

The operation of the article support device 120 of the present invention will be outlined with reference to FIG. 35, at a time when the end portions of the long handle lever 67 are grabbed by hands and lifted up. Incidentally, in the diagram, for ease of explanation, the transmission rods 123a and 123b of the operation handle section 121, and the guide frames 38 and 39 of the support frame section 23 are represented by single solid line.

As shown in FIG. 35A, when the support frame section 23 remains stationary relative to the fixed frame section 22, the left and right transmission rods 123a and 123b and the guide frames 38 and 39 stay at the same height, maintaining a predetermined rectangular frame structure. In this stationary state, an upward operation force F is applied to the left end portion of the handle lever 67 to move the support frame section 23 upward.

As shown in FIG. 35B, as the handle lever 67 is moved up from the stationary position of FIG. 35A to a certain height H, the handle lever 67 is bent upward as a joint with the transmission rod 123a on the side close to the position where the operation force F has been applied serves as a fulcrum. This means that a larger percentage of the operation force F from the handle lever 67 is being transmitted to the nearby transmission rod 123a than to the far-side transmission rod 123b.

In the article support device 120 of the present invention, as described above, when one transmission rod 123a is moved, part of the operation force is transmitted from the transmission rod 123a to the other transmission rod 123b via a gear train made up of the rack sections 140a and 140b of the connection members 124a and 124b and the gear sections 134a, 134b, 135a, and 135b of the connection plates 132a and 132b. Therefore, the other transmission rod 123b moves the same distance in the same direction in synchronization with the transmission rod 123a. Accordingly, even if the handle lever 67 is bent, the support frame section 23 can smoothly and reliably move along the side frames 28 and 29 of the fixed frame section 22 in such a way as to keep a predetermined rectangular frame structure.

FIG. 36 shows how an article support device moves; the article support device has left and right transmission rods 123a and 123b that are not connected via the above connection members and connection plates. Incidentally, the components that are the same as or similar to those in FIG. 34 are represented by the same reference symbols.

Figure 36A:
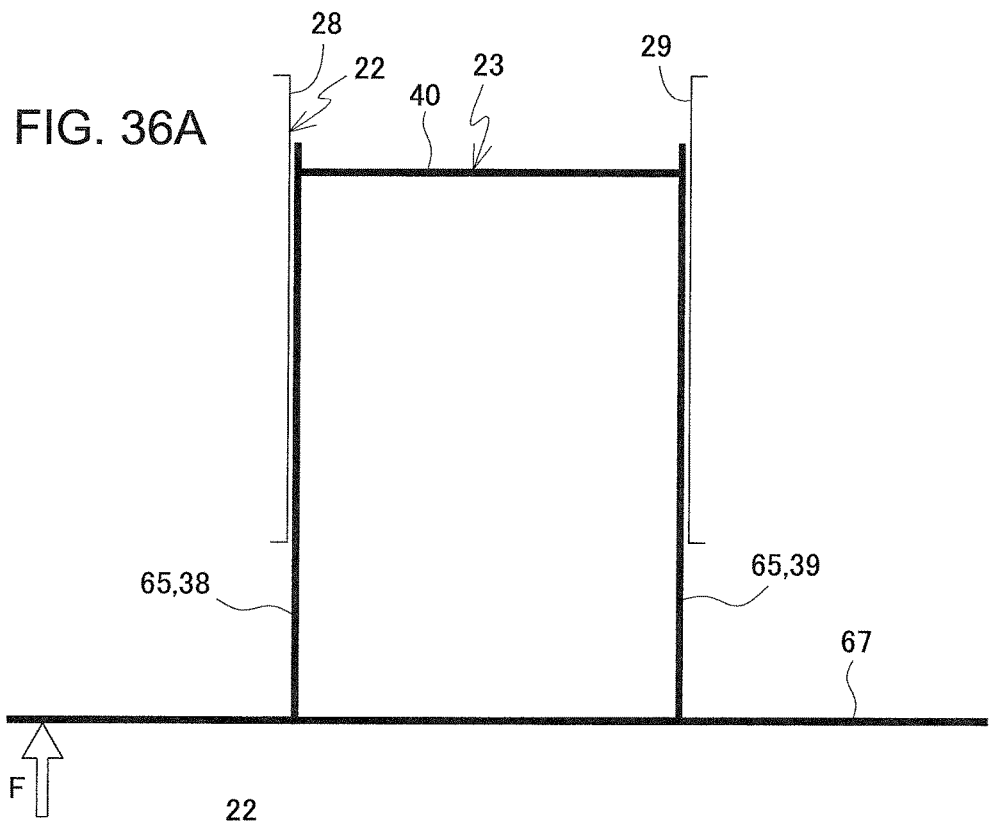
FIGS. 36A and 36B are diagrams illustrating an operation of an operation handle section of a conventional configuration, in comparison to FIG. 35.

As shown in FIG. 36A, when the support frame section 23 remains stationary relative to the fixed frame section 22, the left and right transmission rods 123a and 123b and the guide frames 38 and 39 stay at the same height, maintaining a predetermined rectangular frame structure. In this stationary state, an upward operation force F is similarly applied to the left end portion of the handle lever 67 to move the support frame section 23 upward.

Figure 36B:
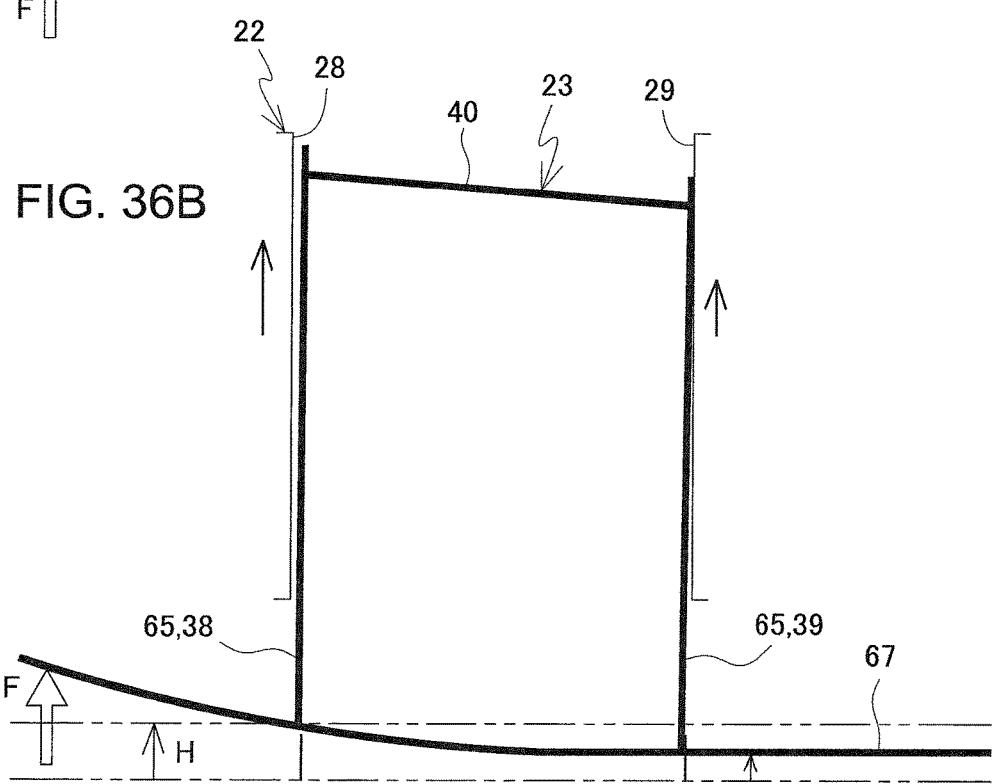

As shown in FIG. 36B, as the handle lever 67 is moved up from the stationary position of FIG. 36A to a certain height H, the handle lever 67 is significantly bent upward. In this case, not only does a joint with the transmission rod 123a on the side close to the position where the operation force F has been applied serve as a fulcrum, but a joint with the far-side transmission rod 123b does so. Therefore, even as the transmission rod 123a near the operation position is moved to a desired height H, the far-side transmission rode 123b is only moved up to a lower level.

As a result, the support frame section 23 could fail to maintain a predetermined rectangular frame structure and be warped or twisted. The warped or twisted support frame section 23 will likely lead to backlash between the support frame section 23 and the side frames 28 and 29 of the fixed frame section 22, making it difficult for the support frame section 23 to move upward smoothly and reliably.

Such a warping or twisting can be avoided to a certain extent by making the rectangular frame structure of the support frame section sufficiently rigid. However, the rigid rectangular frame structure is not necessarily preferred because such a structure could lead to an increase in size and/or weight. Moreover, if the article to be supported is heavy or large, it may be difficult to make the rigid rectangular frame structure.

In the article support device 120 of the second embodiment, regardless of the rigidity of the support frame section 23, the predetermined rectangular frame structure can be kept at anytime when moving. Even when a heavy or large article is to be supported, the higher-than-required rigidity of the rectangular frame structure of the support frame section 23 is unnecessary. When a relatively light or small article is to be supported, the predetermined rectangular frame structure can be kept at any time and moved smoothly even if the rigidity of the support frame section 23 is decreased accordingly.

While preferred embodiments of the present invention have been described, the present invention is not limited to the above embodiments. Various modifications or changes may be made within the technical scope thereof in carrying out the invention. For example, the left and right transmission rods of the operation handle section can be connected in a way that enables transmission of the operation force by using various gear trains other than those of the above embodiments. The brake mechanism may control the release of the braking force only in one of the two directions in which the section is supposed to move, while limiting the movement in the opposite direction. For example, in an article support device that is designed to support a heavy object, the release of the downward braking force may be delayed only when the object is moved upward. In this case, the article support device can prevent a more dangerous article from unexpectedly falling.

Incidentally, this application claims priority from Japanese Patent Application No. 2014-082358, the entire contents of which are incorporated herein by reference.

What is claimed is:

1. An operation handle mechanism comprising:
   a movable section that can move in a predetermined direction; and
   an operation section that includes a handle used to operate movement of the movable section, a first transmission member connected to the handle, and a second transmission member arranged facing the first transmission member and connected to the handle,
   wherein the first and second transmission members are provided in such a way as to be able to only move a predetermined distance in a movement direction thereof relative to the movable section and to start to move together with the movable section after going beyond the predetermined distance, and
   the movable section includes a connection member that connects the first and second transmission members in such a way as to transmit part of an operation force of the handle between the first and second transmission members in response to movement of the first or second transmission member at a time when the handle is operated.

2. The operation handle mechanism according to claim 1, further comprising a braking part that carries out braking of movement of the movable section,
   wherein the braking part can carry out and release the braking depending on movement of the connection member.

3. The operation handle mechanism according to claim 1, wherein: the first and second transmission members each include a rack section; and the connection member includes a gear train that meshes with the two rack sections in a way that enables transmission of the operation force.

4. The operation handle mechanism according to claim 2, wherein: the first and second transmission members each include a rack section; the connection member includes a gear train that meshes with the two rack sections in a way that enables transmission of the operation force; and one of the gears of the gear train is rotated to cause the braking part to carry out and release the braking part.

5. The operation handle mechanism according to claim 1, wherein the movable section includes a first and a second engagement portion that engage with the first and second transmission members at end portions that are the predetermined distance apart, in order to stop the first and second transmission members.

6. The operation handle mechanism according to claim 1, wherein the movable section can move in both directions along the predetermined direction; the handle can be operated in both directions along an operation direction thereof based on a direction in which the movable section is moved; and the first and second transmission members can move in both directions relative to the movable section based on a direction in which the handle is operated.

7. A load support mechanism comprising:
   a fixed support section;
   a movable support section that can move relative to the fixed support section and receives a load; and
   an operation handle section that is used to operate movement of the movable support section, wherein
   the movable support section and the operation handle section are the movable section and the operation section of the operation handle mechanism claimed in claim 1.

8. The operation handle mechanism according to claim 1, wherein the connection member is arranged in an area surrounded by the handle and the first and second transmission members.

9. The operation handle mechanism according to claim 1, wherein the connection member includes a first rotating member rotating in association with movement of the first transmission member pivotally supported on the movable section, and a second rotating member rotating in association with movement of the second transmission member pivotally supported on the movable section, the first rotating member and the second rotating member being connected.

* * * * *